US011627027B2

(12) United States Patent
Chen et al.

(10) Patent No.: US 11,627,027 B2
(45) Date of Patent: Apr. 11, 2023

(54) TRANSMISSION OF PUNCTURED NULL DATA PACKETS AND PARTIAL BANDWIDTH FEEDBACK

(71) Applicant: QUALCOMM Incorporated, San Diego, CA (US)

(72) Inventors: Jialing Li Chen, San Diego, CA (US); Bin Tian, San Diego, CA (US); Youhan Kim, Saratoga, CA (US); Cheng-Ming Chen, Hsinchu (TW)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/356,330

(22) Filed: Jun. 23, 2021

(65) Prior Publication Data

US 2021/0409249 A1 Dec. 30, 2021

Related U.S. Application Data

(60) Provisional application No. 63/043,775, filed on Jun. 24, 2020, provisional application No. 63/052,453, filed on Jul. 15, 2020.

(51) Int. Cl.
*H04L 27/26* (2006.01)
*H04L 5/00* (2006.01)
*H04L 1/00* (2006.01)

(52) U.S. Cl.
CPC ........ *H04L 27/2613* (2013.01); *H04L 1/0068* (2013.01); *H04L 5/0048* (2013.01); *H04L 27/2657* (2013.01)

(58) Field of Classification Search
CPC ............... H04L 1/0068; H04L 27/2613; H04L 27/2657; H04L 5/0048
See application file for complete search history.

(56) References Cited

U.S. PATENT DOCUMENTS

2013/0010889 A1\* 1/2013 Ponnampalam ....... H04B 7/066
375/267
2016/0301452 A1\* 10/2016 Kwon ................... H04B 7/0421
2019/0260553 A1 8/2019 Porat et al.
(Continued)

OTHER PUBLICATIONS

International Search Report and Written Opinion—PCT/US2021/038998—ISA/EPO—dated Oct. 11, 2021.
(Continued)

*Primary Examiner* — David B Lugo
(74) *Attorney, Agent, or Firm* — Loza & Loza, LLP

(57) ABSTRACT

A technique for wireless communication of a punctured null data packet with a long training field sequence is disclosed. The long training field (LTF) sequence is generated for the null data packet (NDP) for transmission over a channel having a bandwidth that is an integer multiple of 80 MHz. The LTF sequence is modulated onto a plurality of tones of the channel excluding tones within a punctured subchannel of a plurality of subchannels of the channel. The modulation may be based on a size and location of the punctured subchannel and a symbol duration associated with transmitting the LTF sequence. The NDP is transmitted including the LTF sequence to a second wireless communication device via the channel. A partial bandwidth feedback may be received in response to the LTF in the punctured NDP.

11 Claims, 22 Drawing Sheets

(56) References Cited

U.S. PATENT DOCUMENTS

2019/0289612 A1    9/2019  Chen et al.
2021/0176785 A1*   6/2021  Jang ..................... H04L 1/0068
2021/0250125 A1*   8/2021  Park ................... H04L 27/3872

OTHER PUBLICATIONS

LAN/MAN Standards Committee of The IEEE Computer Society: "Draft Standard for Information Technology—Tele-Communications and Information Exchange Between Systems Local and Metropolitan Area Networks-Specific Requirements, Part 11: Wireless LAN Medium Access Control (MAC) and Physical Layer (PHY) Specification, Amendment 1: Enhancements for High Efficiency", IEEE Draft, Draft P802.11AX_D6.1, IEEE-SA, Piscataway, NJ USA, vol. 802 .11ax drafts, No. D6.1, May 11, 2020 (May 11, 2020), pp. 1-784.

"IEEE P802.11be™/D1.5 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)", IEEE P802.11be/D1.5, Mar. 2022, pp. 1-831.

\* cited by examiner

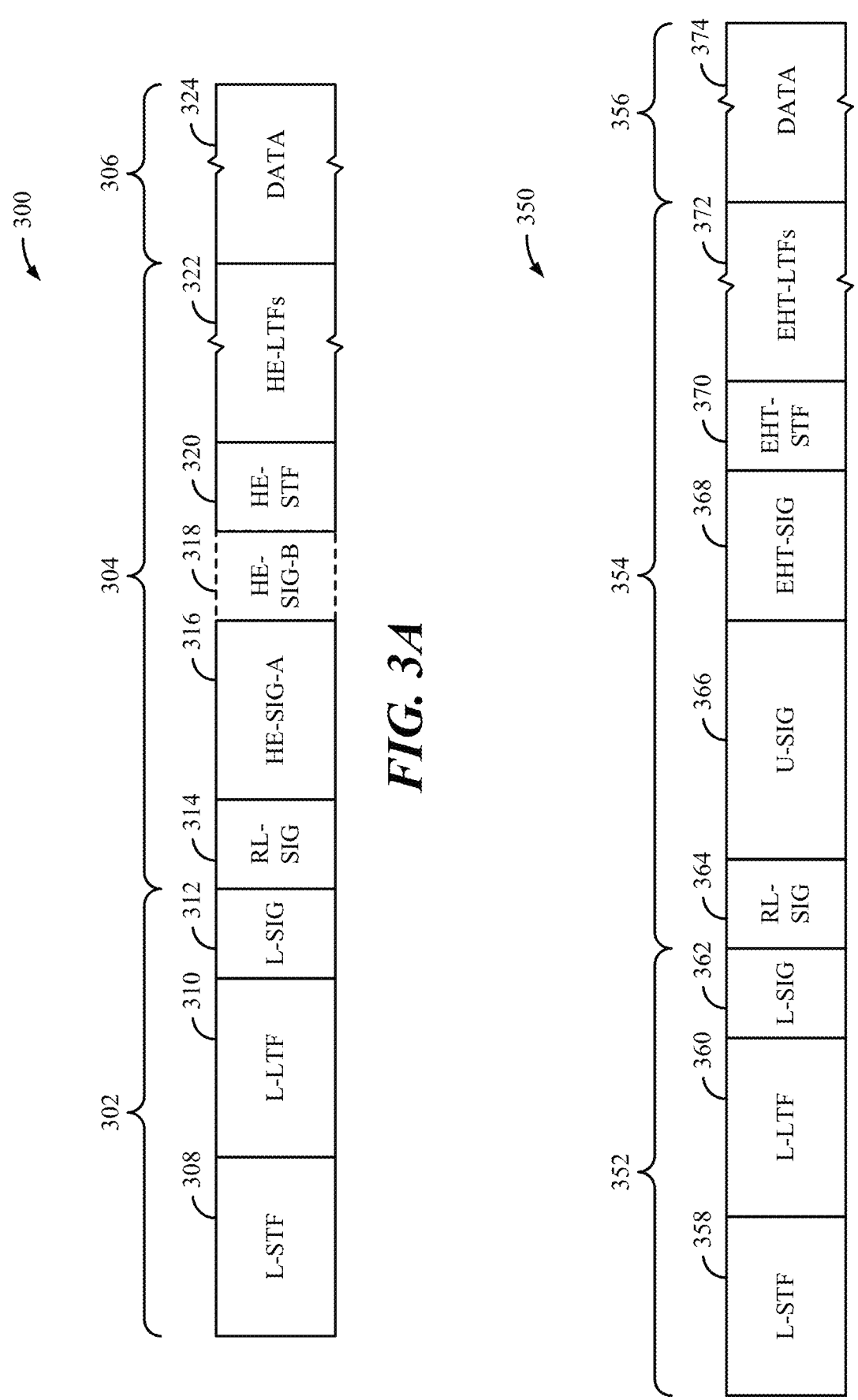

Option 1 Subcarrier Start/End Tone Indices Table for Ng=4

| Index | RU | S | E | Ng=4 Feedback Tones: [-500:4:-4, 4:4:500] | | | | | | | |
|---|---|---|---|---|---|---|---|---|---|---|---|
| 0 | [-499, -474] | -500 | -472 | -496 | -492 | -488 | -484 | -480 | -476 | -472 | |
| 1 | [-473, -448] | -476 | -448 | -472 | -468 | -464 | -460 | -456 | -452 | -448 | |
| 2 | [-445, -420] | -448 | -420 | -444 | -440 | -436 | -432 | -428 | -424 | -420 | |
| 3 | [-419, -394] | -420 | -392 | -416 | -412 | -408 | -404 | -400 | -396 | -392 | |
| 4 | [-392, -367] | -392 | -364 | -388 | -384 | -380 | -376 | -372 | -368 | -364 | |
| 5 | [-365, -340] | -368 | -340 | -364 | -360 | -356 | -352 | -348 | -344 | -340 | |
| 6 | [-339, -314] | -340 | -312 | -336 | -332 | -328 | -324 | -320 | -316 | -312 | |
| 7 | [-311, -286] | -312 | -284 | -308 | -304 | -300 | -296 | -292 | -288 | -284 | |
| 8 | [-285, -260] | -288 | -256 | -284 | -280 | -276 | -272 | -268 | -264 | -260 | -256 |
| 9 | [-252, -227] | -256 | -224 | -252 | -248 | -244 | -240 | -236 | -232 | -228 | -224 |
| 10 | [-226, -201] | -228 | -200 | -224 | -220 | -216 | -212 | -208 | -204 | -200 | |
| 11 | [-198, -173] | -200 | -172 | -196 | -192 | -188 | -184 | -180 | -176 | -172 | |
| 12 | [-172, -147] | -172 | -144 | -168 | -164 | -160 | -156 | -152 | -148 | -144 | |
| 13 | [-145, -120] | -148 | -120 | -144 | -140 | -136 | -132 | -128 | -124 | -120 | |
| 14 | [-118, -93] | -120 | -92 | -116 | -112 | -108 | -104 | -100 | -96 | -92 | |
| 15 | [-92, -67] | -92 | -64 | -88 | -84 | -80 | -76 | -72 | -68 | -64 | |
| 16 | [-64, -39] | -64 | -36 | -60 | -56 | -52 | -48 | -44 | -40 | -36 | |
| 17 | [-38, -13] | -40 | -4 | -36 | -32 | -28 | -24 | -20 | -16 | -12 | -8 |
| 18 | [-13, 38] | -4 | 40 | 8 | 12 | 16 | 20 | 24 | 28 | 32 | 36 |
| 19 | [39, 64] | 36 | 64 | 40 | 44 | 48 | 52 | 56 | 60 | 64 | |
| 20 | [67, 92] | 64 | 92 | 68 | 72 | 76 | 80 | 84 | 88 | 92 | |
| 21 | [93, 118] | 92 | 120 | 96 | 100 | 104 | 108 | 112 | 116 | 120 | |
| 22 | [120, 145] | 120 | 148 | 124 | 128 | 132 | 136 | 140 | 144 | 148 | |
| 23 | [147, 172] | 144 | 172 | 148 | 152 | 156 | 160 | 164 | 168 | 172 | |
| 24 | [173, 198] | 172 | 200 | 176 | 180 | 184 | 188 | 192 | 196 | 200 | |
| 25 | [201, 226] | 200 | 228 | 204 | 208 | 212 | 216 | 220 | 224 | 228 | |
| 26 | [227, 252] | 224 | 256 | 228 | 232 | 236 | 240 | 244 | 248 | 252 | 256 |
| 27 | [260, 285] | 256 | 288 | 260 | 264 | 268 | 272 | 276 | 280 | 284 | 288 |
| 28 | [286, 311] | 284 | 312 | 288 | 292 | 296 | 300 | 304 | 308 | 312 | |
| 29 | [314, 339] | 312 | 340 | 316 | 320 | 324 | 328 | 332 | 336 | 340 | |
| 30 | [340, 365] | 340 | 368 | 344 | 348 | 352 | 356 | 360 | 364 | 368 | |
| 31 | [367, 392] | 364 | 392 | 368 | 372 | 376 | 380 | 384 | 388 | 392 | |
| 32 | [394, 419] | 392 | 420 | 396 | 400 | 404 | 408 | 412 | 416 | 420 | |
| 33 | [420, 445] | 420 | 448 | 424 | 428 | 432 | 436 | 440 | 444 | 448 | |
| 34 | [448, 473] | 448 | 476 | 452 | 456 | 460 | 464 | 468 | 472 | 476 | |
| 35 | [474, 499] | 472 | 500 | 476 | 480 | 484 | 488 | 492 | 496 | 500 | |

- The new design is based on duplication of Ng=4 table of HE40, and let adjacent RUs add coverage of 6 feedback tones (±4, ±8, ±256)
- Changes to Table 9-93c in 11ax spec D6.0
  - RU indices due to removal of center RU26
  - S/E in the 2nd & 3rd 20MHz due to shifting of RUs
  - E=-256 in the 8th RU and S=256 in the 27th RU

FIG. 8

Option 2 Subcarrier Start/End Tone Indices Table for $N_g=4$

| Index | RU | S | E | [-244:4:-4] -256, ⋯, -4, [-244:4:-4]-256 | [-244:4:-4] | ⋯ | -4, [-244:4:-4] | ⋯ | -4, [-244:4:-4]+256 |
|---|---|---|---|---|---|---|---|---|---|
| 0 | [-499, -474] | -500 | -472 | -500 | -496 | -492 | -488 | -484 | -480 | -476 | -472 |
| 1 | [-473, -448] | -476 | -448 | -476 | -472 | -468 | -464 | -460 | -456 | -452 | -448 |
| 2 | [-445, -420] | -448 | -420 | -448 | -444 | -440 | -436 | -432 | -428 | -424 | -420 |
| 3 | [-419, -394] | -420 | -392 | -420 | -416 | -412 | -408 | -404 | -400 | -396 | -392 |
| 4 | [-392, -367] | -392 | -364 | -392 | -388 | -384 | -380 | -376 | -372 | -368 | -364 |
| 5 | [-365, -340] | -368 | -340 | -368 | -364 | -360 | -356 | -352 | -348 | -344 | -340 |
| 6 | [-339, -314] | -340 | -312 | -340 | -336 | -332 | -328 | -324 | -320 | -316 | -312 |
| 7 | [-311, -286] | -312 | -284 | -312 | -308 | -304 | -300 | -296 | -292 | -288 | -284 |
| 8 | [-285, -260] | -288 | -260 | -288 | -284 | -280 | -276 | -272 | -268 | -264 | -260 |
| 9 | [-258, -233] | -256 | -228 | -252 | -248 | -244 | -240 | -236 | -232 | -228 | -224 |
| 10 | [-230, -205] | -228 | -200 | -228 | -224 | -220 | -216 | -212 | -208 | -204 | -200 |
| 11 | [-204, -179] | -200 | -172 | -200 | -196 | -192 | -188 | -184 | -180 | -176 | -172 |
| 12 | [-172, -147] | -172 | -144 | -172 | -168 | -164 | -160 | -156 | -152 | -148 | -144 |
| 13 | [-145, -120] | -148 | -120 | -148 | -144 | -140 | -136 | -132 | -128 | -124 | -120 |
| 14 | [-118, -93] | -120 | -92 | -120 | -116 | -112 | -108 | -104 | -100 | -96 | -92 |
| 15 | [-92, -67] | -92 | -64 | -92 | -88 | -84 | -80 | -76 | -72 | -68 | -64 |
| 16 | [-64, -39] | -64 | -36 | -64 | -60 | -56 | -52 | -48 | -44 | -40 | -36 |
| 17 | [-38, -13] | -40 | -12 | -40 | -36 | -32 | -28 | -24 | -20 | -16 | -12 |
| 18 | [13, 38] | 12 | 40 | 12 | 16 | 20 | 24 | 28 | 32 | 36 | 40 |
| 19 | [39, 64] | 36 | 64 | 36 | 40 | 44 | 48 | 52 | 56 | 60 | 64 |
| 20 | [67, 92] | 64 | 92 | 64 | 68 | 72 | 76 | 80 | 84 | 88 | 92 |
| 21 | [93, 118] | 92 | 120 | 92 | 96 | 100 | 104 | 108 | 112 | 116 | 120 |
| 22 | [120, 145] | 120 | 148 | 120 | 124 | 128 | 132 | 136 | 140 | 144 | 148 |
| 23 | [147, 172] | 144 | 172 | 144 | 148 | 152 | 156 | 160 | 164 | 168 | 172 |
| 24 | [173, 198] | 172 | 200 | 172 | 176 | 180 | 184 | 188 | 192 | 196 | 200 |
| 25 | [201, 226] | 200 | 228 | 200 | 204 | 208 | 212 | 216 | 220 | 224 | 228 |
| 26 | [227, 252] | 228 | 256 | 224 | 228 | 232 | 236 | 240 | 244 | 248 | 252 |
| 27 | [260, 285] | 260 | 288 | 260 | 264 | 268 | 272 | 276 | 280 | 284 | 288 |
| 28 | [286, 311] | 284 | 312 | 284 | 288 | 292 | 296 | 300 | 304 | 308 | 312 |
| 29 | [314, 339] | 312 | 340 | 312 | 316 | 320 | 324 | 328 | 332 | 336 | 340 |
| 30 | [340, 365] | 340 | 368 | 340 | 344 | 348 | 352 | 356 | 360 | 364 | 368 |
| 31 | [367, 392] | 364 | 392 | 364 | 368 | 372 | 376 | 380 | 384 | 388 | 392 |
| 32 | [394, 419] | 392 | 420 | 392 | 396 | 400 | 404 | 408 | 412 | 416 | 420 |
| 33 | [420, 445] | 420 | 448 | 420 | 424 | 428 | 432 | 436 | 440 | 444 | 448 |
| 34 | [448, 473] | 448 | 476 | 448 | 452 | 456 | 460 | 464 | 468 | 472 | 476 |
| 35 | [474, 499] | 472 | 500 | 472 | 476 | 480 | 484 | 488 | 492 | 496 | 500 |

- The new design is based on duplication of $N_g=4$ table of HE40

* Changes to Table 9-93c in 11ax spec D6.0
  - RU indices due to removal of center RU26
  - S/E in the 2nd & 3rd 20MHz due to shifting of RUs

FIG. 9

Option 1 New Subcarrier Start/End Tone Indices Table for Ng=16

Changes to Table 9-93d in 11ax spec D6.0

- RU indices due to removal of center RU26
- Some of the S/E in the 2nd & 3rd 20MHz due to shifting of RUs

| Index | RU | S | E | Ng=16 Feedback Tones: [-500:16:-4, 4:16:500] | | |
|---|---|---|---|---|---|---|
| 0 | [-499, -474] | -500 | -468 | -500 | -484 | -468 |
| 1 | [-473, -448] | -484 | -436 | -484 | -468 | -452 |
| 2 | [-445, -420] | -452 | -420 | -452 | -436 | -420 |
| 3 | [-419, -394] | -420 | -388 | -420 | -404 | -388 |
| 4 | [-392, -367] | -404 | -356 | -404 | -388 | -372 |
| 5 | [-365, -340] | -372 | -340 | -372 | -356 | -340 |
| 6 | [-339, -314] | -340 | -308 | -340 | -324 | -308 |
| 7 | [-311, -286] | -324 | -276 | -324 | -308 | -292 |
| 8 | [-285, -260] | -292 | -260 | -292 | -276 | -260 |
| 9 | [-252, -227] | -260 | -212 | -260 | -244 | -228 |
| 10 | [-226, -201] | -228 | -196 | -228 | -212 | -196 |
| 11 | [-198, -173] | -212 | -164 | -212 | -196 | -180 |
| 12 | [-172, -147] | -180 | -132 | -180 | -164 | -148 |
| 13 | [-145, -120] | -148 | -116 | -148 | -132 | -116 |
| 14 | [-118, -93] | -132 | -84 | -132 | -116 | -100 |
| 15 | [-92, -67] | -100 | -52 | -100 | -84 | -68 |
| 16 | [-64, -39] | -68 | -36 | -68 | -52 | -36 |
| 17 | [-38, -13] | -52 | -4 | -52 | -36 | -20 |
| 18 | [13, 38] | 4 | 52 | 4 | 20 | 36 |
| 19 | [39, 64] | 36 | 68 | 36 | 52 | 68 |
| 20 | [67, 92] | 52 | 100 | 52 | 68 | 84 |
| 21 | [93, 118] | 84 | 132 | 84 | 100 | 116 |
| 22 | [120, 145] | 116 | 148 | 116 | 132 | 148 |
| 23 | [147, 172] | 132 | 180 | 132 | 148 | 164 |
| 24 | [173, 198] | 164 | 212 | 164 | 180 | 196 |
| 25 | [201, 226] | 196 | 228 | 196 | 212 | 228 |
| 26 | [227, 252] | 212 | 260 | 212 | 228 | 244 |
| 27 | [260, 285] | 260 | 292 | 260 | 276 | 292 |
| 28 | [286, 311] | 276 | 324 | 276 | 292 | 308 |
| 29 | [314, 339] | 308 | 340 | 308 | 324 | 340 |
| 30 | [340, 365] | 340 | 372 | 340 | 356 | 372 |
| 31 | [367, 392] | 356 | 404 | 356 | 372 | 388 |
| 32 | [394, 419] | 388 | 420 | 388 | 404 | 420 |
| 33 | [420, 445] | 420 | 452 | 420 | 436 | 452 |
| 34 | [448, 473] | 436 | 484 | 436 | 452 | 468 |
| 35 | [474, 499] | 468 | 500 | 468 | 484 | 500 |

FIG. 10

Option 1B Subcarrier Start/End Tone Indices Table for Ng=16

| Index | RU | S | E | Ng=16 | Ng=16 Feedback Tones: [-500:16:-4, 4:16:500] |
|---|---|---|---|---|---|
| 0 | [-499, -474] | -500 | -468 | -500 | -484 | -468 |
| 1 | [-473, -448] | -484 | -436 | -484 | -468 | -452 | -436 |
| 2 | [-445, -420] | -452 | -420 | -452 | -436 | -420 |
| 3 | [-419, -394] | -420 | -388 | -420 | -404 | -388 |
| 4 | [-392, -367] | -404 | -356 | -404 | -388 | -372 | -356 |
| 5 | [-365, -340] | -372 | -340 | -372 | -356 | -340 |
| 6 | [-339, -314] | -340 | -308 | -340 | -324 | -308 |
| 7 | [-311, -286] | -324 | -276 | -324 | -308 | -292 | -276 |
| 8 | [-285, -260] | -292 | -260 | -292 | -276 | -260 |
| 9 | [-252, -227] | -252 | -212 | -252 | -244 | -228 | -212 |
| 10 | [-226, -201] | -228 | -196 | -228 | -212 | -196 |
| 11 | [-198, -173] | -212 | -164 | -212 | -196 | -180 | -164 |
| 12 | [-172, -147] | -180 | -132 | -180 | -164 | -148 | -132 |
| 13 | [-145, -120] | -148 | -116 | -148 | -132 | -116 |
| 14 | [-118, -93] | -132 | -84 | -132 | -116 | -100 | -84 |
| 15 | [-92, -67] | -100 | -52 | -100 | -84 | -68 | -52 |
| 16 | [-64, -39] | -68 | -36 | -68 | -52 | -36 |
| 17 | [-38, -13] | -52 | -4 | -52 | -36 | -20 | -4 |
| 18 | [13, 38] | 4 | 52 | 4 | 20 | 36 | 52 |
| 19 | [39, 64] | 36 | 68 | 36 | 52 | 68 |
| 20 | [67, 92] | 52 | 100 | 52 | 68 | 84 | 100 |
| 21 | [93, 118] | 84 | 132 | 84 | 100 | 116 | 132 |
| 22 | [120, 145] | 116 | 148 | 116 | 132 | 148 |
| 23 | [147, 172] | 132 | 180 | 132 | 148 | 164 | 180 |
| 24 | [173, 198] | 164 | 212 | 164 | 180 | 196 | 212 |
| 25 | [201, 226] | 196 | 228 | 196 | 212 | 228 |
| 26 | [227, 252] | 212 | 252 | 212 | 228 | 244 | 252 |
| 27 | [260, 285] | 260 | 292 | 260 | 276 | 292 |
| 28 | [286, 311] | 276 | 324 | 276 | 292 | 308 | 324 |
| 29 | [314, 339] | 308 | 340 | 308 | 324 | 340 |
| 30 | [340, 365] | 340 | 372 | 340 | 356 | 372 |
| 31 | [367, 392] | 356 | 404 | 356 | 372 | 388 | 404 |
| 32 | [394, 419] | 388 | 420 | 388 | 404 | 420 |
| 33 | [420, 445] | 420 | 452 | 420 | 436 | 452 |
| 34 | [448, 473] | 436 | 484 | 436 | 452 | 468 | 484 |
| 35 | [474, 499] | 468 | 500 | 468 | 484 | 500 |

- Changes to Table 9-93d in 11ax spec D6.0
  - RU indices due to removal of center RU26
  - Some of the S/E in the 2nd & 3rd 20MHz due to shifting of RUs
  - Define feedback tones -252 to replace tone -260 in the 9th RU26 and feedback tone 252 to replace tone 260 in the 26th RU26 even though they do not belong to the set [-500:Ng:-4, 4:Ng:500]

FIG. 11

Option 2 Subcarrier Start/End Tone Indices Table for Ng=16

| Index | RU | S | E | [-244:16:-4, 4:16:244]-256 | [-244:16:-4, 4:16:244] | [-244:16:-4, 4:16:244]+256 |
|---|---|---|---|---|---|---|
| 0 | [-499, -474] | -500 | -468 | -500 | -484 | -468 |
| 1 | [-473, -448] | -484 | -436 | -484 | -468 | -452 | -436 |
| 2 | [-445, -420] | -452 | -420 | -452 | -436 | -420 |
| 3 | [-419, -394] | -420 | -388 | -420 | -404 | -388 | -356 |
| 4 | [-392, -367] | -404 | -356 | -404 | -388 | -372 |
| 5 | [-365, -340] | -372 | -340 | -372 | -356 | -340 |
| 6 | [-339, -314] | -340 | -308 | -340 | -324 | -308 | -276 |
| 7 | [-311, -286] | -324 | -276 | -324 | -308 | -292 |
| 8 | [-285, -260] | -292 | -260 | -292 | -276 | -260 |
| 9 | [-252, -227] | -252 | -220 | -252 | -236 | -220 | -188 |
| 10 | [-226, -201] | -236 | -188 | -236 | -220 | -204 |
| 11 | [-198, -173] | -204 | -172 | -204 | -188 | -172 |
| 12 | [-172, -147] | -172 | -140 | -172 | -156 | -140 | -108 |
| 13 | [-145, -120] | -156 | -108 | -156 | -140 | -124 |
| 14 | [-118, -93] | -124 | -92 | -124 | -108 | -92 |
| 15 | [-92, -67] | -92 | -60 | -92 | -76 | -60 | -28 |
| 16 | [-64, -39] | -76 | -28 | -76 | -60 | -44 |
| 17 | [-38, -13] | -44 | -12 | -44 | -28 | -12 |
| 18 | [-13, 28] | 12 | 44 | 12 | 28 | 44 |
| 19 | [39, 64] | 28 | 76 | 28 | 44 | 60 | 76 |
| 20 | [67, 92] | 60 | 92 | 60 | 76 | 92 |
| 21 | [93, 118] | 92 | 124 | 92 | 108 | 124 |
| 22 | [120, 145] | 108 | 156 | 108 | 124 | 140 | 156 |
| 23 | [147, 172] | 140 | 172 | 140 | 156 | 172 |
| 24 | [173, 198] | 172 | 204 | 172 | 188 | 204 |
| 25 | [201, 226] | 188 | 236 | 188 | 204 | 220 | 236 |
| 26 | [227, 252] | 220 | 252 | 220 | 236 | 252 |
| 27 | [260, 285] | 260 | 292 | 260 | 276 | 292 |
| 28 | [286, 311] | 276 | 324 | 276 | 292 | 308 | 324 |
| 29 | [314, 339] | 308 | 340 | 308 | 324 | 340 |
| 30 | [340, 365] | 340 | 372 | 340 | 356 | 372 |
| 31 | [367, 392] | 356 | 404 | 356 | 372 | 388 | 404 |
| 32 | [394, 419] | 388 | 420 | 388 | 404 | 420 |
| 33 | [420, 445] | 420 | 452 | 420 | 436 | 452 |
| 34 | [448, 473] | 436 | 484 | 436 | 452 | 468 | 484 |
| 35 | [474, 499] | 468 | 500 | 468 | 484 | 500 |

- The new design is based on duplication of Ng=16 table of HE40
- Changes to Table 9-93d in 11ax spec D6.0
  - RU indices due to removal of center RU26
  - Some of the S/E in the 2nd & 3rd 20MHz due to shifting of RUs

FIG. 12

Option 2a New Subcarrier Start/End Tone Indices Table for Ng=16

| Index | RU | S | E | Ng=16 Feedback Tones [-500:16:-260, -252:16:-12, -4, 4, 12:16:252, 260:500] | | |
|---|---|---|---|---|---|---|
| 0 | [-499, -474] | -500 | -468 | -500 | -484 | -468 |
| 1 | [-473, -448] | -484 | -436 | -484 | -468 | -452 | -436 |
| 2 | [-445, -420] | -452 | -420 | -452 | -436 | -420 |
| 3 | [-419, -394] | -420 | -388 | -420 | -404 | -388 | -356 |
| 4 | [-392, -367] | -404 | -356 | -404 | -388 | -372 |
| 5 | [-365, -340] | -372 | -340 | -372 | -356 | -340 | -276 |
| 6 | [-339, -314] | -340 | -308 | -340 | -324 | -308 |
| 7 | [-311, -286] | -324 | -276 | -324 | -308 | -292 | -188 |
| 8 | [-285, -260] | -292 | -260 | -292 | -276 | -260 |
| 9 | [-253, -227] | -252 | -220 | -252 | -236 | -220 | -108 |
| 10 | [-226, -201] | -236 | -188 | -236 | -220 | -204 |
| 11 | [-198, -173] | -204 | -172 | -204 | -188 | -172 | -28 |
| 12 | [-172, -147] | -172 | -140 | -172 | -156 | -140 |
| 13 | [-145, -120] | -156 | -108 | -156 | -140 | -124 | 44 |
| 14 | [-118, -93] | -124 | -92 | -124 | -108 | -92 |
| 15 | [-92, -67] | -92 | -60 | -92 | -76 | -60 | 76 |
| 16 | [-64, -39] | -76 | -28 | -76 | -60 | -44 |
| 17 | [-38, -13] | -44 | -4 | -44 | -28 | -12 | 156 |
| 18 | [13, 38] | -4 | 44 | 4 | 12 | 28 |
| 19 | [39, 64] | 28 | 76 | 28 | 44 | 60 | 236 |
| 20 | [67, 92] | 60 | 92 | 60 | 76 | 92 |
| 21 | [93, 118] | 92 | 124 | 92 | 108 | 124 | 324 |
| 22 | [120, 145] | 108 | 156 | 108 | 124 | 140 |
| 23 | [147, 172] | 140 | 172 | 140 | 156 | 172 | 404 |
| 24 | [173, 198] | 172 | 204 | 172 | 188 | 204 |
| 25 | [201, 226] | 188 | 236 | 188 | 204 | 220 | 484 |
| 26 | [227, 252] | 220 | 252 | 220 | 236 | 252 |
| 27 | [260, 285] | 260 | 292 | 260 | 276 | 292 |
| 28 | [286, 311] | 276 | 324 | 276 | 292 | 308 |
| 29 | [314, 339] | 308 | 340 | 308 | 324 | 340 |
| 30 | [340, 365] | 340 | 372 | 340 | 356 | 372 |
| 31 | [367, 392] | 356 | 404 | 356 | 372 | 388 |
| 32 | [394, 419] | 388 | 420 | 388 | 404 | 420 |
| 33 | [420, 445] | 420 | 452 | 420 | 436 | 452 |
| 34 | [448, 473] | 436 | 484 | 436 | 452 | 468 |
| 35 | [474, 499] | 468 | 500 | 468 | 484 | 500 |

- The new design is based on duplication of Ng=4 table of HE40, and let adjacent RUs add coverage of 2 feedback tones (±4)
- Changes to Table 9-93d in 11ax spec D6.0
  - RU indices due to removal of center RU26
  - Some of the S/E in the 2$^{nd}$ & 3$^{rd}$ 20MHz due to shifting of RUs

FIG. 13

| RU/PPDU index | RU | Nc=1 | | | Nc=0 | | |
|---|---|---|---|---|---|---|---|
| | | S | E | FeedbackTones | S | E | FeedbackTones |
| 0 | [-500, -259] | -500 | -260 | -500:4:-260 | -500 | -260 | -500:16:-260 |
| 1 | [-253, -12] | -252 | -12 | -252:4:-12 | -252 | -12 | -252:16:-12 |
| 2 | [12, 253] | 12 | 252 | 12:4:252 | 12 | 252 | 12:16:252 |
| 3 | [259, 500] | 260 | 500 | 260:4:500 | 260 | 500 | 260:16:500 |

FIG. 14

Option 2a: Subcarrier Start/End Tone Indices Table for Ng=4

| Index | RU | S | E | [-244:-4, -4:244]-256 | [-244:-4, 4:244]-256 | [-244:-4, 0, 4:244]-256 | [-244:-4, 0, 4:244]-256 | [-244:-4, 0, 4:244]+256 | [-244:-4, 0, 4:244]+256 |
|---|---|---|---|---|---|---|---|---|---|
| 0 | [-499, -474] | -500 | -472 | -500 | -496 | -492 | -488 | -484 | -480 | -476 | -472 |
| 1 | [-473, -448] | -476 | -448 | -476 | -472 | -468 | -464 | -460 | -456 | -452 | -448 |
| 2 | [-445, -420] | -448 | -420 | -448 | -444 | -440 | -436 | -432 | -428 | -424 | -420 |
| 3 | [-419, -394] | -420 | -392 | -420 | -416 | -412 | -408 | -404 | -400 | -396 | -392 |
| 4 | [-392, -367] | -392 | -364 | -392 | -388 | -384 | -380 | -376 | -372 | -368 | -364 |
| 5 | [-365, -340] | -368 | -340 | -368 | -364 | -360 | -356 | -352 | -348 | -344 | -340 |
| 6 | [-339, -314] | -340 | -312 | -340 | -336 | -332 | -328 | -324 | -320 | -316 | -312 |
| 7 | [-311, -286] | -312 | -284 | -312 | -308 | -304 | -300 | -296 | -292 | -288 | -284 |
| 8 | [-285, -260] | -288 | -260 | -288 | -284 | -280 | -276 | -272 | -268 | -264 | -260 |
| 9 | [-252, -227] | -252 | -224 | -252 | -248 | -244 | -240 | -236 | -232 | -228 | -224 |
| 10 | [-226, -201] | -228 | -200 | -228 | -224 | -220 | -216 | -212 | -208 | -204 | -200 |
| 11 | [-198, -173] | -200 | -172 | -200 | -196 | -192 | -188 | -184 | -180 | -176 | -172 |
| 12 | [-172, -147] | -172 | -144 | -172 | -168 | -164 | -160 | -156 | -152 | -148 | -144 |
| 13 | [-145, -120] | -148 | -120 | -148 | -144 | -140 | -136 | -132 | -128 | -124 | -120 |
| 14 | [-118, -93] | -120 | -92 | -120 | -116 | -112 | -108 | -104 | -100 | -96 | -92 |
| 15 | [-92, -67] | -92 | -64 | -92 | -88 | -84 | -80 | -76 | -72 | -68 | -64 |
| 16 | [-64, -39] | -64 | -36 | -64 | -60 | -56 | -52 | -48 | -44 | -40 | -36 |
| 17 | [-38, -13] | -40 | -12 | -40 | -36 | -32 | -28 | -24 | -20 | -16 | -12 |
| 18 | | | | | | | | | | | |
| 19 | [13, 38] | 12 | 40 | 12 | 16 | 20 | 24 | 28 | 32 | 36 | 40 |
| 20 | [39, 64] | 36 | 64 | 36 | 40 | 44 | 48 | 52 | 56 | 60 | 64 |
| 21 | [67, 92] | 64 | 92 | 64 | 68 | 72 | 76 | 80 | 84 | 88 | 92 |
| 22 | [93, 118] | 92 | 120 | 92 | 96 | 100 | 104 | 108 | 112 | 116 | 120 |
| 23 | [120, 145] | 120 | 148 | 120 | 124 | 128 | 132 | 136 | 140 | 144 | 148 |
| 24 | [147, 172] | 144 | 172 | 144 | 148 | 152 | 156 | 160 | 164 | 168 | 172 |
| 25 | [173, 198] | 172 | 200 | 172 | 176 | 180 | 184 | 188 | 192 | 196 | 200 |
| 26 | [201, 226] | 200 | 228 | 200 | 204 | 208 | 212 | 216 | 220 | 224 | 228 |
| 27 | [227, 252] | 224 | 252 | 224 | 228 | 232 | 236 | 240 | 244 | 248 | 252 |
| 28 | [260, 285] | 260 | 288 | 260 | 264 | 268 | 272 | 276 | 280 | 284 | 288 |
| 29 | [286, 311] | 284 | 312 | 284 | 288 | 292 | 296 | 300 | 304 | 308 | 312 |
| 30 | [314, 339] | 312 | 340 | 312 | 316 | 320 | 324 | 328 | 332 | 336 | 340 |
| 31 | [340, 365] | 340 | 368 | 340 | 344 | 348 | 352 | 356 | 360 | 364 | 368 |
| 32 | [367, 392] | 364 | 392 | 364 | 368 | 372 | 376 | 380 | 384 | 388 | 392 |
| 33 | [394, 419] | 392 | 420 | 392 | 396 | 400 | 404 | 408 | 412 | 416 | 420 |
| 34 | [420, 445] | 420 | 448 | 420 | 424 | 428 | 432 | 436 | 440 | 444 | 448 |
| 35 | [448, 473] | 448 | 476 | 448 | 452 | 456 | 460 | 464 | 468 | 472 | 476 |
| 36 | [474, 499] | 472 | 500 | 472 | 476 | 480 | 484 | 488 | 492 | 496 | 500 |

- The new design is based on duplication of Ng=4 table of HE40
- Note that this table is a variation of option 2 for Ng=4
- Changes to Table 9-93c in 11ax spec D6.0
  - The 18$^{th}$ RU26 is an empty entry
  - S/E in the 2$^{nd}$ & 3$^{rd}$ 20MHz due to shifting of RUs

FIG. 17

| Index | RU | S | E | [-244:16:-4, 4:16:244]-256 | [-244:16:-4, 4:16:244] | [-244:16:-4, 4:16:244]+256 |
|---|---|---|---|---|---|---|
| 0 | [-499,-474] | -500 | -468 | -500 | -484 | -468 | |
| 1 | [-473,-448] | -484 | -436 | -484 | -468 | -452 | -436 |
| 2 | [-445,-420] | -452 | -420 | -452 | -436 | -420 | |
| 3 | [-419,-394] | -420 | -388 | -420 | -404 | -388 | -356 |
| 4 | [-392,-367] | -404 | -356 | -404 | -388 | -372 | |
| 5 | [-365,-340] | -372 | -340 | -372 | -356 | -340 | |
| 6 | [-339,-314] | -340 | -308 | -340 | -324 | -308 | -276 |
| 7 | [-311,-286] | -324 | -276 | -324 | -308 | -292 | |
| 8 | [-285,-260] | -292 | -260 | -292 | -276 | -260 | |
| 9 | [-252,-227] | -252 | -220 | -252 | -236 | -220 | -188 |
| 10 | [-226,-201] | -236 | -188 | -236 | -220 | -204 | |
| 11 | [-198,-173] | -204 | -172 | -204 | -188 | -172 | |
| 12 | [-172,-147] | -172 | -140 | -172 | -156 | -140 | -108 |
| 13 | [-145,-120] | -156 | -108 | -156 | -140 | -124 | |
| 14 | [-118,-93] | -124 | -92 | -124 | -108 | -92 | |
| 15 | [-92,-67] | -92 | -60 | -92 | -76 | -60 | -28 |
| 16 | [-64,-39] | -76 | -28 | -76 | -60 | -44 | |
| 17 | [-38,-13] | -44 | -12 | -44 | -28 | -12 | |
| 18 | | | | | | | |
| 19 | [13,38] | 12 | 44 | 12 | 28 | 44 | 76 |
| 20 | [39,64] | 28 | 76 | 28 | 44 | 60 | |
| 21 | [67,92] | 60 | 92 | 60 | 76 | 92 | |
| 22 | [93,118] | 92 | 124 | 92 | 108 | 124 | 156 |
| 23 | [120,145] | 108 | 156 | 108 | 124 | 140 | |
| 24 | [147,172] | 140 | 172 | 140 | 156 | 172 | |
| 25 | [173,198] | 172 | 204 | 172 | 188 | 204 | 236 |
| 26 | [201,226] | 188 | 236 | 188 | 204 | 220 | |
| 27 | [227,252] | 220 | 252 | 220 | 236 | 252 | |
| 28 | [260,285] | 260 | 292 | 260 | 276 | 292 | 324 |
| 29 | [286,311] | 276 | 324 | 276 | 292 | 308 | |
| 30 | [314,339] | 308 | 340 | 308 | 324 | 340 | |
| 31 | [340,365] | 340 | 372 | 340 | 356 | 372 | 404 |
| 32 | [367,392] | 356 | 404 | 356 | 372 | 388 | |
| 33 | [394,419] | 388 | 420 | 388 | 404 | 420 | |
| 34 | [420,445] | 420 | 452 | 420 | 436 | 452 | 484 |
| 35 | [448,473] | 436 | 484 | 436 | 452 | 468 | |
| 35 | [474,499] | 468 | 500 | 468 | 484 | 500 | |

- Option 2b: Subcarrier Start/End Tone Indices Table for Ng=16
- The new design is based on duplication of Ng=16 table of HE40
- Note that this table is a variation of option 2 for Ng=4
- Changes to Table 9-93d in 11ax spec D6.0
  - The 18th RU26 is an empty entry
  - Some of the S/E in the 2nd & 3rd 20MHz due to shifting of RUs

FIG. 18

| RU242 index | 80 MHz | 160 MHz | 320 MHz |
|---|---|---|---|
| 1 | [−500:Ng:−260] | [−1012:Ng:−772] | [−2036:Ng:−1796] |
| 2 | [−252:Ng:−12] | [−764:Ng:−524] | [−1788:Ng:−1548] |
| 3 | [12:Ng:252] | [−500:Ng:−260] | [−1524:Ng:−1284] |
| 4 | [260:Ng:500] | [−252:Ng:−12] | [−1276:Ng:−1036] |
| 5 | | [12:Ng:252] | [−1012:Ng:−772] |
| 6 | | [260:Ng:500] | [−764:Ng:−524] |
| 7 | | [524:Ng:764] | [−500:Ng:−260] |
| 8 | | [772:Ng:1012] | [−252:Ng:−12] |
| 9 | | | [12:Ng:252] |
| 10 | | | [260:Ng:500] |
| 11 | | | [524:Ng:764] |
| 12 | | | [772:Ng:1012] |
| 13 | | | [1036:Ng:1276] |
| 14 | | | [1284:Ng:1524] |
| 15 | | | [1548:Ng:1788] |
| 16 | | | [1796:Ng:2036] |

FIG. 19

| RU996 index | 80 MHz | 160 MHz | 320 MHz |
|---|---|---|---|
| 1 | [−500:4:−4, 4:4:500] | [−1012:4:−516, −508:4:−12] | [−2036:4:−1540, −1532:4:−1036] |
| 2 | | [12:4:508, 516:4:1012] | [−1012:4:−516, −508:4:−12] |
| 3 | | | [12:4:508, 516:4:1012] |
| 4 | | | [1036:4:1532, 1540:4:2036] |

FIG. 20

| RU996 index | 80 MHz | 160 MHz | 320 MHz |
|---|---|---|---|
| 1 | [−500:16:−260, −252:16:−12, −4, 4, 12:16:252, 260:16:500] | [−1012:16:−772, −764:16:−524, −516, −508, −500:16:−260, −252:16:−12] | [−2036:16:−1796, −1788:16:−1548, −1540, −1532, −1524:16:−1284, −1276:16:−1036] |
| 2 | | [12:16:252, 260:16:500, 508, 516, 524:16:764, 772:16:1012] | [−1012:16:−772, −764:16:−524, −516, −508, −500:16:−260, −252:16:−12] |
| 3 | | | [12:16:252, 260:16:500, 508, 516, 524:16:764, 772:16:1012] |
| 4 | | | [1036:16:1276, 1284:16:1524, 1532, 1540, 1548:16:1788, 1796:16:2036] |

FIG. 21

TRANSMISSION OF PUNCTURED NULL DATA PACKETS AND PARTIAL BANDWIDTH FEEDBACK

CROSS-REFERENCE TO RELATED APPLICATIONS

The application claims priority to and the benefit of U.S. provisional patent application No. 63/043,775 filed on Jun. 24, 2020, U.S. provisional patent application No. 63/052,453 filed on Jul. 15, 2020, the entire content of which is incorporated herein by reference as if fully set forth below in its entirety and for all applicable purposes.

TECHNICAL FIELD

The present disclosure relates generally to wireless communication, and more particularly, to transmission of punctured null data packets and partial bandwidth feedback in wireless communication systems.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP.

As wireless communications have been evolving toward ever increasing data rates, the IEEE 802.11 standard has also evolved to provide increased throughput. Recently, IEEE 802.11be is being developed, which defines Extreme High Throughput (EHT) wireless communications using large bandwidth channels (for example, having a bandwidth of 240 MHz, 320 MHz, or larger). The total channel bandwidth may be comprised of a combination of subchannels (potentially having different sizes) in one or more frequency bands (such as the 5 GHz or 6 GHz frequency bands).

IEEE 802.11be proposes to transmit signals using orthogonal frequency-division multiple access (OFDMA) which is a multi-user version of the orthogonal frequency-division multiplexing (OFDM) digital modulation scheme. OFDM employs multi-carrier modulation where a plurality of carriers (such as, parallel subcarriers), each carrying low bit rate data, are orthogonal to each other.

In some cases, an AP may communicate with one or more STAs using multiple-input multiple-output (MIMO) techniques. For instance, the AP may use beamforming to steer MIMO transmissions to the one or more STAs and reduce signaling interference on the channel for beamformed signaling targeted to each STA of the one or more STAs. To send beamformed MIMO transmissions, the AP may determine channel information according to an explicit sounding procedure that involves a number of packet exchanges between the AP and the one or more STAs (for example, target STAs). Such sounding procedure includes the transmission of a Long Training Field (LTF) over one or more subchannels. Channel puncturing is a technique by which a narrow subchannel of a larger channel is used for a transmission. However, in some cases, such explicit sounding procedure and acquisition of channel information may be affected by puncturing of subchannels used for such sounding procedure.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Some aspects provide a method and device for wireless communication by a wireless communication device using a long training field (LTF) sequence. The long training field (LTF) sequence for a null data packet (NDP) may be obtained or generated for transmission over a channel having a bandwidth that is an integer multiple of 80 MHz. The LTF sequence may be modulated onto a plurality of tones of the channel excluding tones within a punctured subchannel of a plurality of subchannels of the channel, the modulation being based on a size and a location of the punctured subchannel and a symbol duration associated with transmitting the LTF sequence. A null data packet announcement (NDPA) for transmission over the channel may also be obtained or generated. The NDPA including a partial bandwidth information subfield that includes an 8-bit subfield for identifying a 242-tone resource unit (RU) start index and an end index, the partial bandwidth information subfield identifying an indexed range of feedback tones for channel state information (CSI). The NDP, including the LTF sequence, may then be transmitted to a second wireless communication device via the channel. The NDPA may also be transmitted to the second wireless communication device via the channel.

In one aspect, the modulation of the LTF sequence onto the plurality of tones is based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz. The symbol duration associated with the LTF sequence may be one of: 12.8 µs plus a guard interval, 6.4 µs plus the guard interval, or 3.2 µs plus the guard interval, and wherein the guard interval is one of 0.8 µs, 1.6 µs, or 3.2 µs.

In one example, the symbol duration associated with the LTF sequence is 12.8 µs plus the guard interval, and wherein the LTF sequence is modulated onto each tone within a plurality of tone ranges of the OFDMA data tone plan, and the channel includes an 80 MHz bandwidth portion that includes the punctured subchannel; the punctured subchannel has a 20 MHz bandwidth within the 80 MHz bandwidth portion; the 80 MHz bandwidth portion comprises 1001 tones; and the plurality of tone ranges include: tones [−253:−12, 12:253, 259:500] based on the punctured subchannel being a first 20 MHz subchannel; tones [−500: −259, 12:253, 259:500] based on the punctured subchannel being a second 20 MHz subchannel adjacent the first 20 MHz subchannel; tones [−500:−259, −253:−12, 259:500] based on the punctured subchannel being a third 20 MHz subchannel adjacent the second 20 MHz subchannel; or tones [−500:−259, −253:−12, 12:253] based on the punctured subchannel being a fourth 20 MHz subchannel adjacent the third 20 MHz subchannel.

In another example, the symbol duration associated with the LTF sequence is 12.8 µs plus the guard interval, and wherein the LTF sequence is modulated onto each tone within a plurality of tone ranges of the OFDMA data tone plan, the channel includes an 80 MHz bandwidth portion that includes the punctured subchannel; the punctured subchannel has a 40 MHz bandwidth within the 80 MHz bandwidth portion; the 80 MHz bandwidth portion comprises 1001 tones; and the plurality of tone ranges include: tones [12:253, 259:500] based on the punctured subchannel being a first 40 MHz subchannel; or tones [−500:−259, −253:42] based on the punctured subchannel being a second 40 MHz subchannel adjacent the first 40 MHz subchannel.

In yet another example, the symbol duration associated with the LTF sequence is 6.4 μs plus the guard interval, and the LTF sequence is modulated onto every other tone within a plurality of tones ranges of the OFDMA data tone plan, and the channel includes an 80 MHz bandwidth portion that includes the punctured subchannel; the punctured subchannel has a 20 MHz bandwidth within the 80 MHz bandwidth portion; the 80 MHz bandwidth portion comprises 1001 tones; and the plurality of tone ranges include: tones [−252:2:−12, 12:2:252, 260:2:500] based on the punctured subchannel being a first 20 MHz subchannel; tones [−500:2:−260, 12:2:252, 260:2:500] based on the punctured subchannel being a second 20 MHz subchannel adjacent the first 20 MHz subchannel; tones [−500:2:−260, −252:2:−12, 260:2:500] based on the punctured subchannel being a third 20 MHz subchannel adjacent the second 20 MHz subchannel; or tones [−500:2:−260, −252:2:−12, 12:2:252] based on the punctured subchannel being a fourth 20 MHz subchannel adjacent the third 20 MHz subchannel.

According to another aspect, the symbol duration associated with the LTF sequence is 6.4 μs plus the guard interval, and the LTF sequence is modulated onto every other tone within a plurality of tones ranges of the OFDMA data tone plan, and the channel includes an 80 MHz bandwidth portion that includes the punctured subchannel; the punctured subchannel has a 40 MHz bandwidth within the 80 MHz bandwidth portion; the 80 MHz bandwidth portion comprises 1001 tones; and the plurality of tone ranges include: tones [12:2:252, 260:2:500] based on the punctured subchannel being a first 40 MHz subchannel; or tones [−500:2:−260, −252:2:−12] based on the punctured subchannel being a second 40 MHz subchannel adjacent the first 40 MHz subchannel.

In yet another aspect, the symbol duration associated with the LTF sequence is 3.2 μs plus a guard interval, and the LTF sequence is modulated onto every fourth tone within a plurality of tones ranges of the OFDMA data tone plan is, and the channel includes an 80 MHz bandwidth portion that includes the punctured subchannel; the punctured subchannel has a 20 MHz bandwidth within the 80 MHz bandwidth portion; the 80 MHz bandwidth portion comprises 1001 tones; and the plurality of tone ranges include: tones [−252:4:−12, 12:4:252, 260:4:500] based on the punctured subchannel being a first 20 MHz subchannel; tones [−500:4:−260, 12:4:252, 260:4:500] based on the punctured subchannel being a second 20 MHz subchannel adjacent the first 20 MHz subchannel; tones [−500:4:−260, −252:4:−12, 260:4:500] based on the punctured subchannel being a third 20 MHz subchannel adjacent the second 20 MHz subchannel; or tones [−500:4:−260, −252:4:−12, 12:4:252] based on the punctured subchannel being a fourth 20 MHz subchannel adjacent the third 20 MHz subchannel.

In yet another aspect, the symbol duration associated with the LTF sequence is 3.2 μs plus a guard interval, and the LTF sequence is modulated onto every fourth tone within a plurality of tones ranges of the OFDMA data tone plan is, and the channel includes an 80 MHz bandwidth portion that includes the punctured subchannel; the punctured subchannel has a 40 MHz bandwidth within the 80 MHz bandwidth portion; the 80 MHz bandwidth portion comprises 1001 tones; and the plurality of tone ranges include: tones [12:4:252, 260:4:500] based on the punctured subchannel being a first 40 MHz subchannel; or tones [−5 00:4: −260, −252:4:−12] based on the punctured subchannel being a second 40 MHz subchannel adjacent the first 20 MHz subchannel.

Additionally, according to some aspects, the method and device may further include receiving channel state information (CSI) for the channel in response to transmitting the NDP with a partial feedback request, the partial feedback request covering less than an 80 MHz bandwidth channel or less than an 80 MHz bandwidth portion of a 160 MHz bandwidth channel or a 320 MHz bandwidth channel, the CSI including one feedback tone for every n grouped tones of the plurality of tones of the channel where n=4 or 16, and wherein the CSI is received in an indexed range of feedback tones within a 242-tone resource unit (RU).

For the 242-tone RU of n=4 or n=16 feedback tone spacing, the feedback start/end tone indices for the 80 MHz bandwidth channel include the start/end tone indices: (a) indexed tones [−500, −260] that provide feedback for a first 20 MHz subchannel of the 80 MHz bandwidth channel, (b) indexed tones [−252, −12] that provide feedback for a second 20 MHz subchannel of the 80 MHz bandwidth channel, (c) indexed tones [12, 252] that provide feedback for a third 20 MHz subchannel of the 80 MHz bandwidth channel, and (d) indexed tones [260, 500] that provide feedback for a fourth 20 MHz subchannel of the 80 MHz bandwidth channel.

For the 242-tone RU of n=4 or n=16 feedback tone spacing, the feedback start/end tone indices for the 80 MHz bandwidth portion of the 160 MHz bandwidth channel include the start/end tone indices: [−1012, −772] for a 1st indexed RU, [−764, −524] for a 2nd indexed RU, [−500, −260] for a 3rd indexed RU, [−252, −12] for a 4th indexed RU, [12, 252] for a 5th indexed RU, [260, 500] for a 6th indexed RU, [524, 764] for a 7th indexed RU, and [772, 1012] for an 8th indexed RU.

For the 242-tone RU of n=4 or n=16 feedback tone spacing, the feedback start/end tone indices for the 80 MHz bandwidth portion of the 320 MHz bandwidth channel includes the start/end tone indices: [−2036, −1796] for a 1st indexed RU, [−1788, −1548] for a 2nd indexed RU, [−1524, −1284] for a 3rd indexed RU, [−1276, −1036] for a 4th indexed RU, [−1012, −772] for a 5th indexed RU, [−764, −524] for a 6th indexed RU, [−500, −260] for a 7th indexed RU, [−252, −12] for an 8th indexed RU, [12, 252] for an 9th indexed RU, [260, 500] for a 10th indexed RU, [524, 764] for a 11th indexed RU, [772, 1012] for a 12th indexed RU, [1036, 1276] for a 13th indexed RU, [1284, 1524] for a 14th indexed RU, [1548, 1788] for a 15th indexed RU, and [1796, 2036] for a 16th indexed RU.

Additionally, according to some aspects, the method and device may further include receiving channel state information (CSI) for the channel in response to the transmitting the NDP with a feedback request for the entire channel bandwidth, the feedback request covering an entire 80 MHz bandwidth channel or an entire 80 MHz bandwidth portion of a 160 MHz bandwidth channel or a 320 MHz bandwidth channel, the CSI including one feedback tone for every n grouped tones of the plurality of tones of the channel, where n=4 or 16, and the CSI is received in an indexed range of feedback tones within a 996-tone resource unit (RU). In one example, a feedback tone set for the entire 80 MHz bandwidth channel within the 996-tone RU for n=4 feedback tone spacing is defined as [−500:4:−4, 4:4:500], spanning a region of 1001 tones [−500 to +500], every 4 tones, and with a DC tone region between (−4, 4).

In another example, a feedback tone set for the entire 160 MHz bandwidth channel within the 996-tone RU for n=4 feedback tone spacing is indicated by feedback start and end tone indices tables for each 996-tone RU that include: (a) indexed tones [−1012:4:−516, −508:4:42] that provide feedback for a first 80 MHz subchannel of the 160 MHz bandwidth channel, and (b) indexed tones [12:4:508, 516:4:1012] that provide feedback for a second 80 MHz subchannel of the 160 MHz bandwidth channel.

In yet another example, a feedback tone set for the entire 320 MHz bandwidth channel within the 996-tone RU for n=4 feedback tone spacing is indicated by feedback start and end tone indices tables for each 996-tone RU that include: (a) indexed tones [−2036:4:4540,−1532:4:4036] that provide feedback for a first 80 MHz subchannel of the 320 MHz bandwidth channel, (b) indexed tones [−1012:4:−516, −508:4:−12] that provide feedback for a second 80 MHz subchannel of the 320 MHz bandwidth channel, (c) indexed tones [12:4:508, 516:4:1012] that provide feedback for a first 80 MHz subchannel of the 320 MHz bandwidth channel, and (d) indexed tones [1036:4:1532, 1540:4:2036] that provide feedback for a second 80 MHz subchannel of the 320 MHz bandwidth channel.

In yet another example, a feedback tone set for the entire 80 MHz bandwidth channel within the 996-tone RU for n=16 feedback tone spacing is indicated by feedback start and end tone indices tables for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4).

In yet another example, a feedback tone set for the entire 160 MHz bandwidth channel within the 996-tone RU for n=16 feedback tone spacing is indicated by feedback start and end tone indices tables for each 996-tone RU that include: (a) indexed tones [−1012:16:−772, −764:16:−524, −516, −508, −500:16:−260, −252:16:42] that provide feedback for a first 80 MHz subchannel of the 160 MHz bandwidth channel, and (b) indexed tones [12:16:252, 260:16:500, 508, 516, 524:16:764, 772:16:1012] that provide feedback for a second 80 MHz subchannel of the 160 MHz bandwidth channel.

In yet another example, a feedback tone set for the entire 320 MHz bandwidth channel within the 996-tone RU for n=16 feedback tone spacing is indicated by feedback start and end tone indices tables for each 996-tone RU that include: (a) indexed tones [−2036:16:−1796, −1788:16:−1548, −1540, −1532, −1524:16:−1284, −1276:16:1036] that provide feedback for a first 80 MHz subchannel of the 320 MHz bandwidth channel, (b) indexed tones [−1012: 16: −772, −764:16:−524, −516, −508, −500:16:−260, −252:16:−12] that provide feedback for a second 80 MHz subchannel of the 320 MHz bandwidth channel, (c) indexed tones [12:16:252, 260:Ng=16:500, 508, 516, 524:16:764, 772:16:1012] that provide feedback for a first 80 MHz subchannel of the 320 MHz bandwidth channel, and (d) indexed tones [1036:16:1276, 1284:16:1524, 1532, 1540, 1548:16:1788, 1796:16:2036] that provide feedback for a second 80 MHz subchannel of the 320 MHz bandwidth channel.

Some other aspects provide a method and device for wireless communication by a wireless communication device for providing channel state information in the presence of channel puncturing. A null data packet (NDP) may be received over a channel having a bandwidth that is an integer multiple of 80 MHz, the NDP including a long training field (LTF) that is modulated onto a plurality of tones of the channel excluding tones within a punctured subchannel of a plurality of subchannels of the channel, the modulation being based on a size and a location of the punctured subchannel and a symbol duration associated with transmission of the LTF sequence. A channel state information (CSI) for the channel is generated in response to receiving the NDP with a feedback request for at least a portion of the channel bandwidth, the feedback request covering at least part of an 80 MHz bandwidth channel or at least part of an 80 MHz bandwidth portion of a 160 MHz bandwidth channel or a 320 MHz bandwidth channel, the CSI including one feedback tone for every n grouped tones of the plurality of tones of the channel, where n=4 or 16, and the CSI is modulated in an indexed range of feedback tones within a 242-tone resource unit (RU) or a 996-tone resource unit (RU). A null data packet announcement (NDPA) may also be received over the channel, the NDPA including a partial bandwidth information subfield that includes an 8-bit subfield for identifying a 242-tone resource unit (RU) start index and an end index, the partial bandwidth information subfield identifying an indexed range of feedback tones for the channel state information (CSI). The CSI is then transmitted to the first wireless device. According to some aspects, the LTF sequence may be modulated onto the plurality of tones based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz.

In some aspects, the feedback request is a partial feedback request for less than the 80 MHz bandwidth channel or less than the 80 MHz bandwidth portion of the 160 MHz bandwidth channel or the 320 MHz bandwidth channel, the CSI including one feedback tone for every n grouped tones of the plurality of tones of the channel where n=4 or 16, and wherein the CSI is modulated in an indexed range of feedback tones within the 242-tone resource unit (RU).

In one example, for the 242-tone RU of n=4 or n=16 feedback tone spacing, the feedback start/end tone indices for the 80 MHz bandwidth channel include the start/end tone indices: (a) indexed tones [−500, −260] that provide feedback for a first 20 MHz subchannel of the 80 MHz bandwidth channel, (b) indexed tones [252, −12] that provide feedback for a second 20 MHz subchannel of the 80 MHz bandwidth channel, (c) indexed tones [12, 252] that provide feedback for a third 20 MHz subchannel of the 80 MHz bandwidth channel, and (d) indexed tones [260, 500] that provide feedback for a fourth 20 MHz subchannel of the 80 MHz bandwidth channel.

In yet another example, for the 242-tone RU of n=4 or n=16 feedback tone spacing, the feedback start/end tone indices for the 80 MHz bandwidth portion of the 160 MHz bandwidth channel include the start/end tone indices: [−1012, −772] for a 1st indexed RU, [−764, −524] for a 2nd indexed RU, [−500, −260] for a 3rd indexed RU, [−252, −12] for a 4th indexed RU, [12, 252] for a 5th indexed RU, [260, 500] for a 6th indexed RU, [524, 764] for a 7th indexed RU, and [772, 1012] for an 8th indexed RU.

In yet another example, for the 242-tone RU of n=4 or n=16 feedback tone spacing, the feedback start/end tone indices for the 80 MHz bandwidth portion of the 320 MHz bandwidth channel includes the start/end tone indices: [−2036, −1796] for a 1st indexed RU, [−1788, −1548] for a 2nd indexed RU, [−1524, −1284] for a 3rd indexed RU, [−1276, −1036] for a 4th indexed RU, [−1012, −772] for a 5th indexed RU, [−764, −524] for a 6th indexed RU, [−500, −260] for a 7th indexed RU, [−252, −12] for an 8th indexed RU, [12, 252] for an 9th indexed RU, [260, 500] for a 10th indexed RU, [524, 764] for a 11th indexed RU, [772, 1012] for a 12th indexed RU, [1036, 1276] for a 13th indexed RU, [1284, 1524] for a 14th indexed RU, [1548, 1788] for a 15th indexed RU, and [1796, 2036] for a 16th indexed RU.

In one aspect, the feedback request is an entire feedback request covering the entire 80 MHz bandwidth channel or the entire 80 MHz bandwidth portion of the 160 MHz bandwidth channel or the 320 MHz bandwidth channel, the CSI including one feedback tone for every n grouped tones of the plurality of tones of the channel where n=4 or 16, and wherein the CSI is modulated in an indexed range of feedback tones within the 996-tone resource unit (RU).

In one example, a feedback tone set for the entire 80 MHz bandwidth channel within the 996-tone RU for n=4 feedback tone spacing is defined as [−500:4:−4, 4:4:500], spanning a region of 1001 tones [−500 to +500], every 4 tones, and with a DC tone region between (−4, 4).

In another example, a feedback tone set for the entire 160 MHz bandwidth channel within the 996-tone RU for n=4 feedback tone spacing is indicated by feedback start and end tone indices tables for each 996-tone RU that include: (a) indexed tones [−1012:4:−516, −508:4:42] that provide feedback for a first 80 MHz subchannel of the 160 MHz bandwidth channel, and (b) indexed tones [12:4:508, 516:4:1012] that provide feedback for a second 80 MHz subchannel of the 160 MHz bandwidth channel.

In yet another example, a feedback tone set for the entire 320 MHz bandwidth channel within the 996-tone RU for n=4 feedback tone spacing is indicated by feedback start and end tone indices tables for each 996-tone RU that include: (a) indexed tones [−2036:4:−1540,−1532:4:−1036] that provide feedback for a first 80 MHz subchannel of the 320 MHz bandwidth channel, (b) indexed tones [−1012:4:−516, −508:4:−12] that provide feedback for a second 80 MHz subchannel of the 320 MHz bandwidth channel, (c) indexed tones [12:4:508, 516:4:1012] that provide feedback for a first 80 MHz subchannel of the 320 MHz bandwidth channel, and (d) indexed tones [1036:4:1532, 1540:4:2036] that provide feedback for a second 80 MHz subchannel of the 320 MHz bandwidth channel.

In yet another example, a feedback tone set for the entire 80 MHz bandwidth channel within the 996-tone RU for n=16 feedback tone spacing is indicated by feedback start and end tone indices tables for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4).

In yet another example, a feedback tone set for the entire 160 MHz bandwidth channel within the 996-tone RU for n=16 feedback tone spacing is indicated by feedback start and end tone indices tables for each 996-tone RU that include: (a) indexed tones [−1012:16:−772, −764:16:−524, −516, −508, −500:16:−260, −252:16:42] that provide feedback for a first 80 MHz subchannel of the 160 MHz bandwidth channel, and (b) indexed tones [12:16:252, 260:16:500, 508, 516, 524:16:764, 772:16:1012] that provide feedback for a second 80 MHz subchannel of the 160 MHz bandwidth channel.

In yet another example, a feedback tone set for the entire 320 MHz bandwidth channel within the 996-tone RU for n=16 feedback tone spacing is indicated by feedback start and end tone indices tables for each 996-tone RU that include: (a) indexed tones [−2036:16:−1796, −1788:16:−1548, −1540, −1532, −1524:16:−1284, −1276:16:1036] that provide feedback for a first 80 MHz subchannel of the 320 MHz bandwidth channel, (b) indexed tones [−1012: 16: −772, −764:16:−524, −516, −508, −500:16:−260, −252:16:4 2] that provide feedback for a second 80 MHz subchannel of the 320 MHz bandwidth channel, (c) indexed tones [12:16: 252, 260:Ng=16:500, 508, 516, 524:16:764, 772:16:1012] that provide feedback for a first 80 MHz subchannel of the 320 MHz bandwidth channel, and (d) indexed tones [1036: 16:1276, 1284:16:1524, 1532, 1540, 1548:16:1788, 1796: 16:2036] that provide feedback for a second 80 MHz subchannel of the 320 MHz bandwidth channel.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 3A shows an example physical layer convergence protocol (PLCP) protocol data unit (PPDU) usable for wireless communication between an AP and one or more STAs.

FIG. 3B shows another example PPDU usable for wireless communication between an AP and one or more STAs.

FIG. 8 illustrates an example of a feedback start/end tone indices table.

FIG. 9 illustrates another example of a feedback start/end tone indices table.

FIG. 10 illustrates an example of a feedback start/end tone indices table.

FIG. 11 illustrates another example of a feedback start/ end tone indices table.

FIG. 12 illustrates yet another example of a feedback start/end tone indices table.

FIG. 13 illustrates yet another option of a feedback start/end tone indices table.

FIG. 14 illustrates an OFDMA feedback start/end tone indices table for an 80 MHz bandwidth channel that may have a 20 MHz granularity.

FIG. 17 illustrates another example of a feedback start/end tone indices table.

FIG. 18 illustrates yet another option of a feedback start/end tone indices table.

FIG. 19 is a table illustrating specific examples of OFDMA feedback start/end tone indices for a partial 80 MHz bandwidth channel for RU242 granularity, where the feedback does not cover the entire 80 MHz bandwidth channel.

FIG. 20 is a table illustrating specific examples of OFDMA feedback start/end tone indices for an entire 80 MHz bandwidth channel for RU996 granularity using n grouped tones Ng=4, where the feedback covers the entire 80 MHz bandwidth channel.

FIG. 21 is a table illustrating specific examples of OFDMA feedback start/end tone indices for an entire 80 MHz bandwidth channel for RU996 granularity using n grouped tones Ng=16, where the feedback covers the entire 80 MHz bandwidth channel.

Like reference numbers and designations in the various drawings indicate like elements.

DETAILED DESCRIPTION

Figure 1:
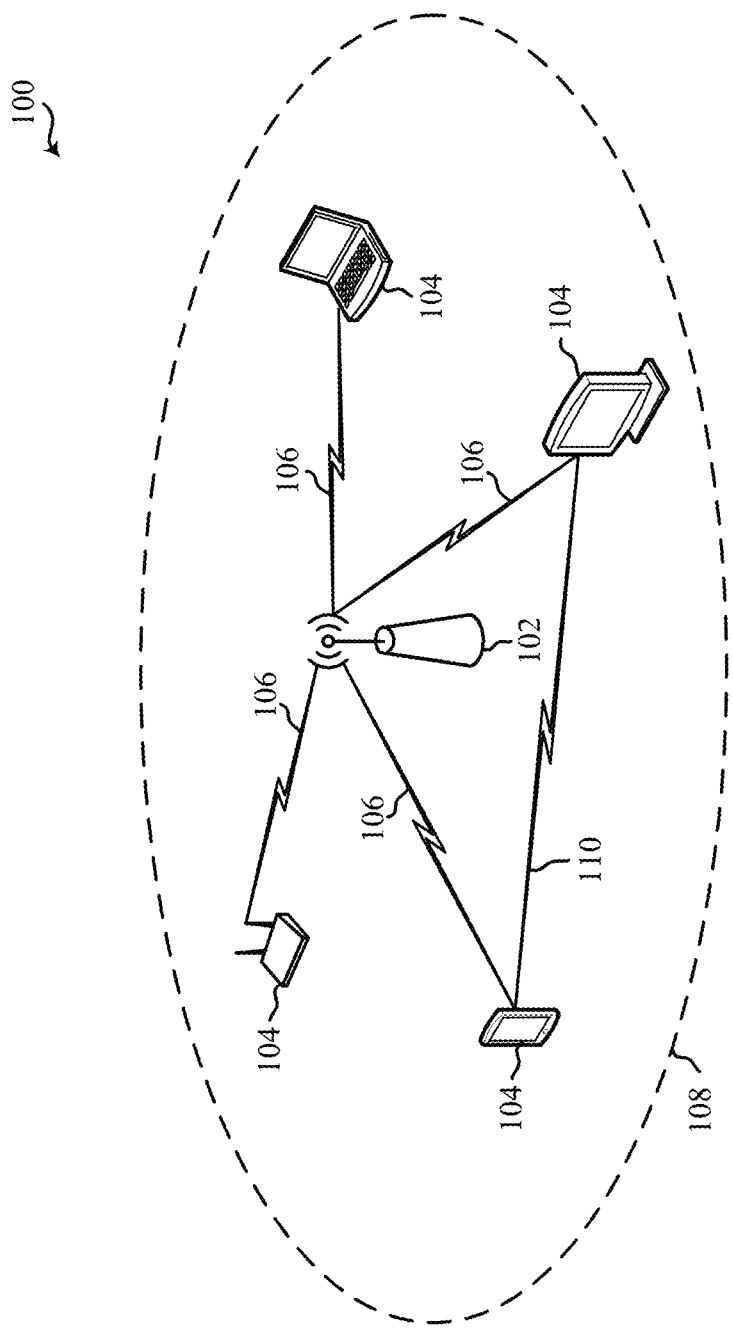
FIG. 1 shows a block diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

In some cases, an AP may communicate with one or more STAs using multiple-input multiple-output (MIMO) techniques. For instance, the AP may use beamforming to steer MIMO transmissions to the one or more STAs and reduce signaling interference on the channel for beamformed signaling targeted to each STA of the one or more STAs. To send beamformed MIMO transmissions, the AP may determine channel information according to an explicit sounding procedure that involves a number of packet exchanges between the AP and the one or more STAs (for example, target STAs). Such sounding procedure includes the transmission of a Long Training Field (LTF) over one or more subchannels. Channel puncturing is a technique by which a narrow subchannel is used for a transmission to avoid interference. However, in some cases, such explicit sounding procedure and acquisition of channel information may be affected by puncturing of subchannels used for such sounding procedure.

Various aspects relate generally to transmission of a punctured null data packet (NDP) as part of a sounding procedure to obtain channel information. Some aspects more specifically relate to using an OFDMA data tone plan as the basis to modulate a long training field (LTF) sequence in a preamble of the punctured NDP. The tone plan is used to modulate the LTF sequence onto a plurality of tones of a channel excluding tones within a punctured subchannel of a plurality of subchannels of the channel In various implementations, the modulation may be based on a size or location of the punctured subchannel as well as a symbol duration associated with transmitting the LTF sequence.

An advantage of this approach is that partial channel feedback can be obtained for a channel despite the presence of channel puncturing of a subchannel.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
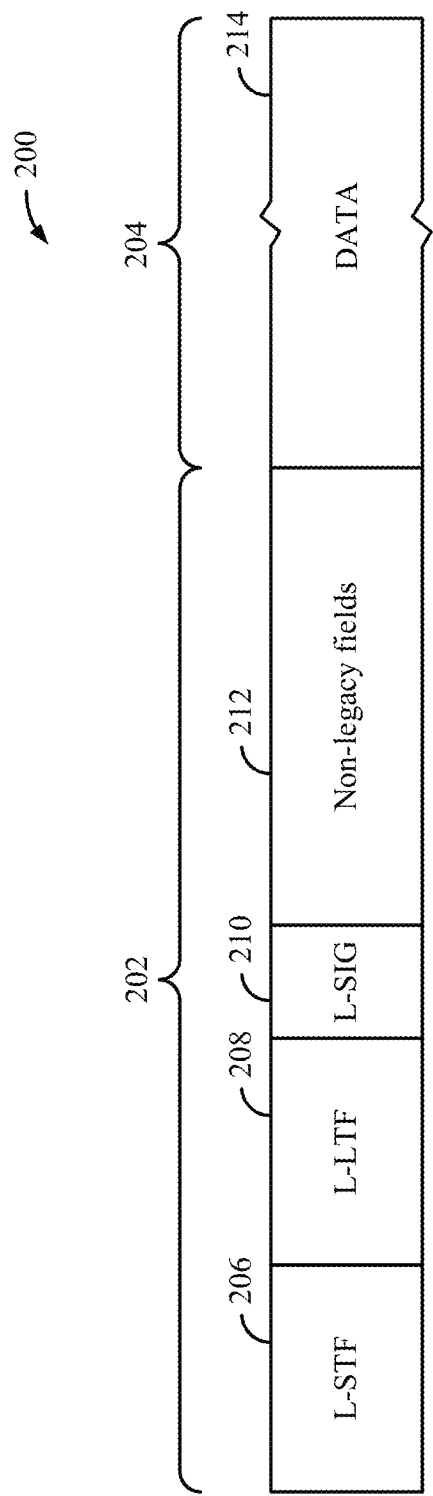
FIG. 2A shows an example protocol data unit (PDU) usable for wireless communication between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
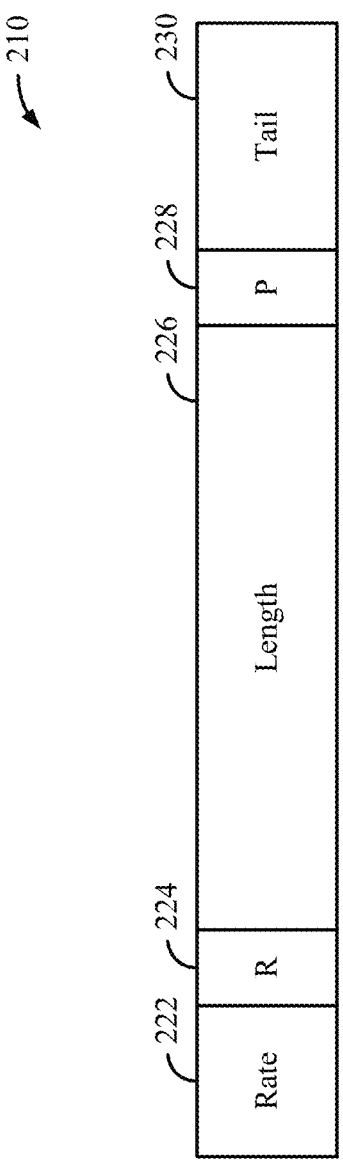
FIG. 2B shows an example legacy signal field (L-SIG) in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, a HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Figure 4:
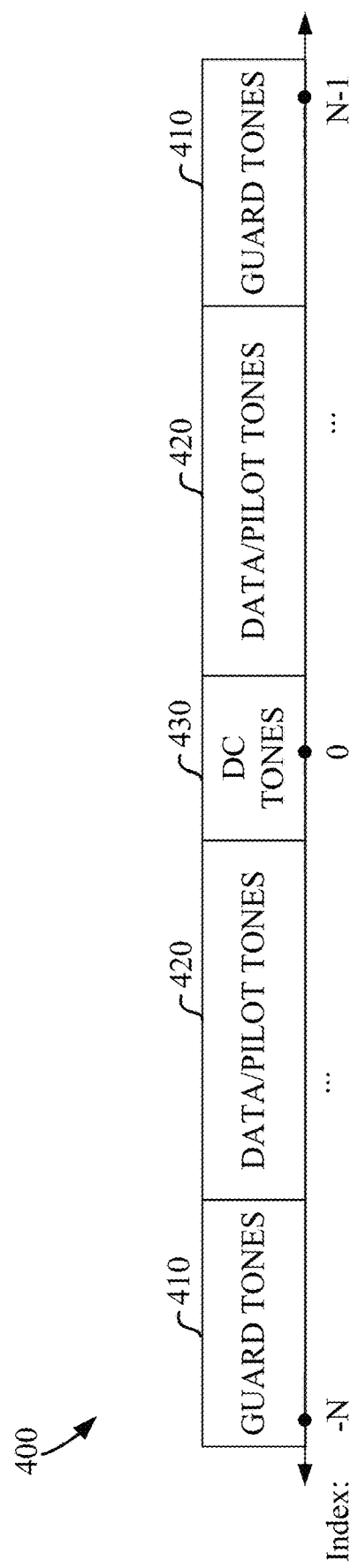
FIG. 4 shows an example 2N-tone plan.

FIG. 4 shows an example 2N-tone plan 400. In some implementations, the tone plan 400 may correspond to OFDM tones, in the frequency domain, generated using a 2N-point fast Fourier transform (FFT). The tone plan 400 includes 2N OFDM tones indexed −N to N−1. The tone plan 400 includes two sets of edge or guard tones 410, two sets of data/pilot tones 420, and a set of direct current (DC) tones 430. In some implementations, the edge or guard tones 410 and DC tones 430 can be null. In some implementations, the tone plan 400 may include another suitable number of pilot tones or may include pilot tones at other suitable tone locations.

In some aspects, OFDMA tone plans may be provided for transmission using a 4× symbol duration, as compared to various IEEE 802.11 protocols. For example, 4× symbol duration may use a number of symbols which can each be 12.8 μs in duration (different from symbols in certain other IEEE 802.11 protocols which may be 3.2 μs in duration).

In some aspects, OFDMA tone plans may be provided for transmission using a 2× symbol duration, as compared to various IEEE 802.11 protocols. For example, the 2× symbol duration may use a number of symbols which can be each 6.4 μs in duration (different from symbols in certain other IEEE 802.11 protocols which may be 3.2 μs or 12.8 μs in duration).

In some aspects, the data/pilot tones 420 of a transmission 400 may be divided among any number of different users. For example, the data/pilot tones 420 may be divided among between one and eight users. In order to divide the data/pilot tones 420, an AP 104 or another device may signal to the various devices, indicating which devices may transmit or receive on which tones (of the data/pilot tones 420) in a particular transmission. Accordingly, systems and methods for dividing the data/pilot tones 420 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, 80, 160, 240, or 320 MHz (or a combination thereof), and it may be desirable to use a tone plan that can be used for any of these bandwidths. Further, a tone plan may be simple in that it uses a smaller number of building block sizes. For example, a tone plan may contain a unit which may be referred to as resource unit (RU). This unit may be used to assign a particular amount of wireless resources (for example, bandwidth or particular tones) to a particular user. For example, one user may be assigned bandwidth as a number of RUs, and the data/pilot tones 420 of a transmission may be broken up into a number of RUs.

As previously described, APs and STAs can support multi-user (MU) communications; that is, concurrent transmissions from one device to each of multiple devices (for example, multiple simultaneous downlink (DL) communications from an AP to corresponding STAs), or concurrent transmissions from multiple devices to a single device (for example, multiple simultaneous uplink (UL) transmissions from corresponding STAs to an AP). To support the MU transmissions, the APs and STAs may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz bandwidth channel, up to 9 RUs (such as 2 MHz, 26-tone RUs) may be allocated (because some tones are reserved for other purposes). Similarly, in a 160 MHz bandwidth channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

A tone plan also may be chosen based on efficiency. For example, transmissions of different bandwidths (for example, 20, 40, 80, 160, 240, or 320 MHz, or a combination thereof) may have different numbers of tones. Reducing the number of leftover tones may be beneficial. Further, it may be beneficial if a tone plan is configured to preserve 20, 40, 80, 160, 240, or 320 MHz boundaries in some implementations. For example, it may be desirable to have a tone plan which allows each 20, 40, 80, 160, 240, or 320 MHz portion to be decoded separately from each other, rather than having allocations which can be on the boundary between two different 20, 40, 80, 160, 240, or 320 MHz portions of the bandwidth. For example, it may be beneficial for interference patterns to be aligned with 20, 40, 80, 160, 240, or 320 MHz channels. Further, it may be beneficial to have channel bonding, which also may be known as preamble puncturing, such that when a 20 MHz transmission and a 40 MHz transmission can be transmitted, to create a 20 MHz "hole" in the transmission when transmitted over 80, 160, 240, or 320 MHz. This may allow, for example, a legacy packet to be transmitted in this unused portion of the bandwidth. This puncturing may apply to any transmission (for example, 20, 40, 80, 160, 240, or 320 MHz transmissions) and may create "holes" of at least 20 MHz in the transmission regardless of the channel or bandwidth being used. Finally, it also may be advantageous to use a tone plan which provides for fixed pilot tone locations in various transmissions, such as in different bandwidths.

As data transmission rate demands increase with additional devices joining networks or additional data being added for transmission over networks, larger channel bandwidths may be introduced, for example for orthogonal frequency-division multiple access (OFDMA) transmissions. In one example, tone plans for a 320 MHz total channel bandwidth may be introduced to assist in increasing peak system transmission data rates and to more efficiently utilize available channels. For example, as new frequencies are available for use (for example, 6 GHz), these new tone plans for the larger total channel bandwidths may more efficiently utilize the newly available channels. Moreover, an increased total bandwidth which may be provided by these new tone plans may allow for better rate vs range tradeoff. In this case, the same or a similar transmission rate may be used to provide larger coverage if a larger total bandwidth is used. Additionally, the larger total channel bandwidths also may increase tone plan efficiency (for example, for a particular BW, how many tones could be used for data transmission) and also may increase a number of guard bands. As with any total channel bandwidth being used, different modes may be available depending on channel availability. For example, current 80 MHz channel bandwidths may be separated into 20 MHz, 40 MHz, or 80 MHz modes.

Figure 5:
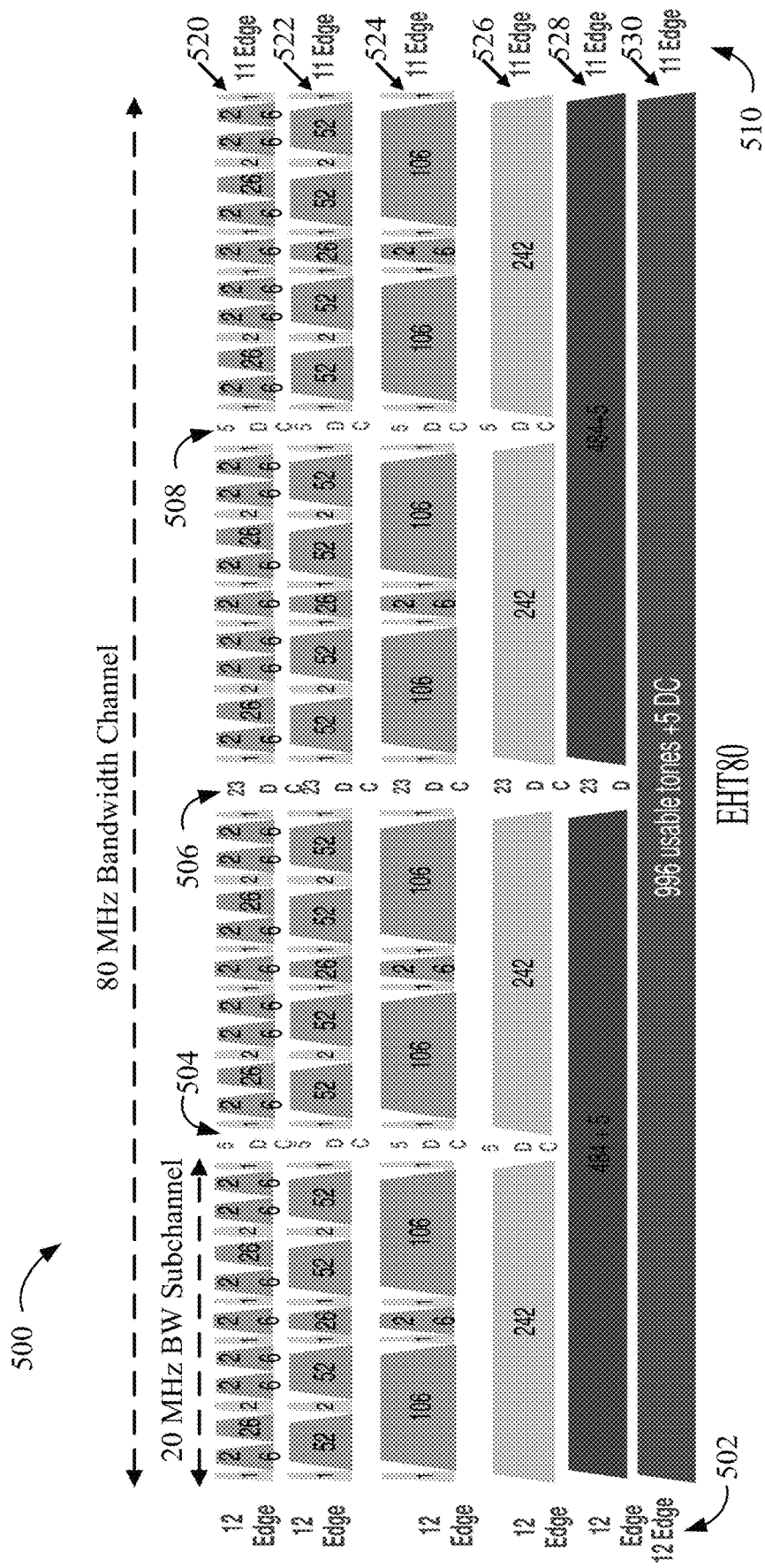
FIG. 5 illustrates an example of a tone plan for an extreme high throughput (EHT) 80 MHz bandwidth channel.

FIG. 5 illustrates an example of a tone plan for an extreme high throughput (EHT) 80 MHz bandwidth channel The tone plan 500 has 12 left edge tones 502, 5 DC tones 504, 23 DC tones 506, 5 DC tones 508, and 11 right edge tones 510, and a total of 996 usable tones for OFDMA. FIG. 5 shows six example transmissions 520, 522, 524, 526, 528, and 530 using various combinations of 26-, 52-, 106-, 242-, 484- and 996 tone blocks. However, allocations within any given transmission can include multiple tone blocks of different sizes or having different arrangements. For instance, one transmission may include four 20 MHz bandwidth channels, for a total bandwidth of 80 MHz. In second example, another transmission may include two 40 MHz bandwidth channels, for a total bandwidth of 80 MHz. Yet other transmissions may include multiple subchannels of different bandwidths, but having a total bandwidth that is an integer multiple of 80 MHz.

The sixth transmission 530 includes a single-user tone plan having 5 DC tones. Accordingly, the SU tone plan can include 996 usable tones.

In some implementations, larger bandwidth (BW) transmissions (for example, 160 MHz, 240 MHz or 320 MHz) may be generated based on 20, 40, or 80 MHz tone plans. For example, the 40 MHz transmissions and the 80 MHz transmissions may be duplicated (for example, four times each) to create the 160 MHz and 320 MHz transmissions, respectively.

However, a tone plan is needed for non-data null data packets (NDP) transmissions in which at least one subchannel is punctured. Such punctured NDP may include an LTF sequence which is transmitted, for example, by an AP to obtain channel feedback from one or more STAs. The tone plan used to modulate the LTF sequence should be capable of accounting for the punctured subchannel in a plurality of channels used to transmit the NDP.

Figure 6:
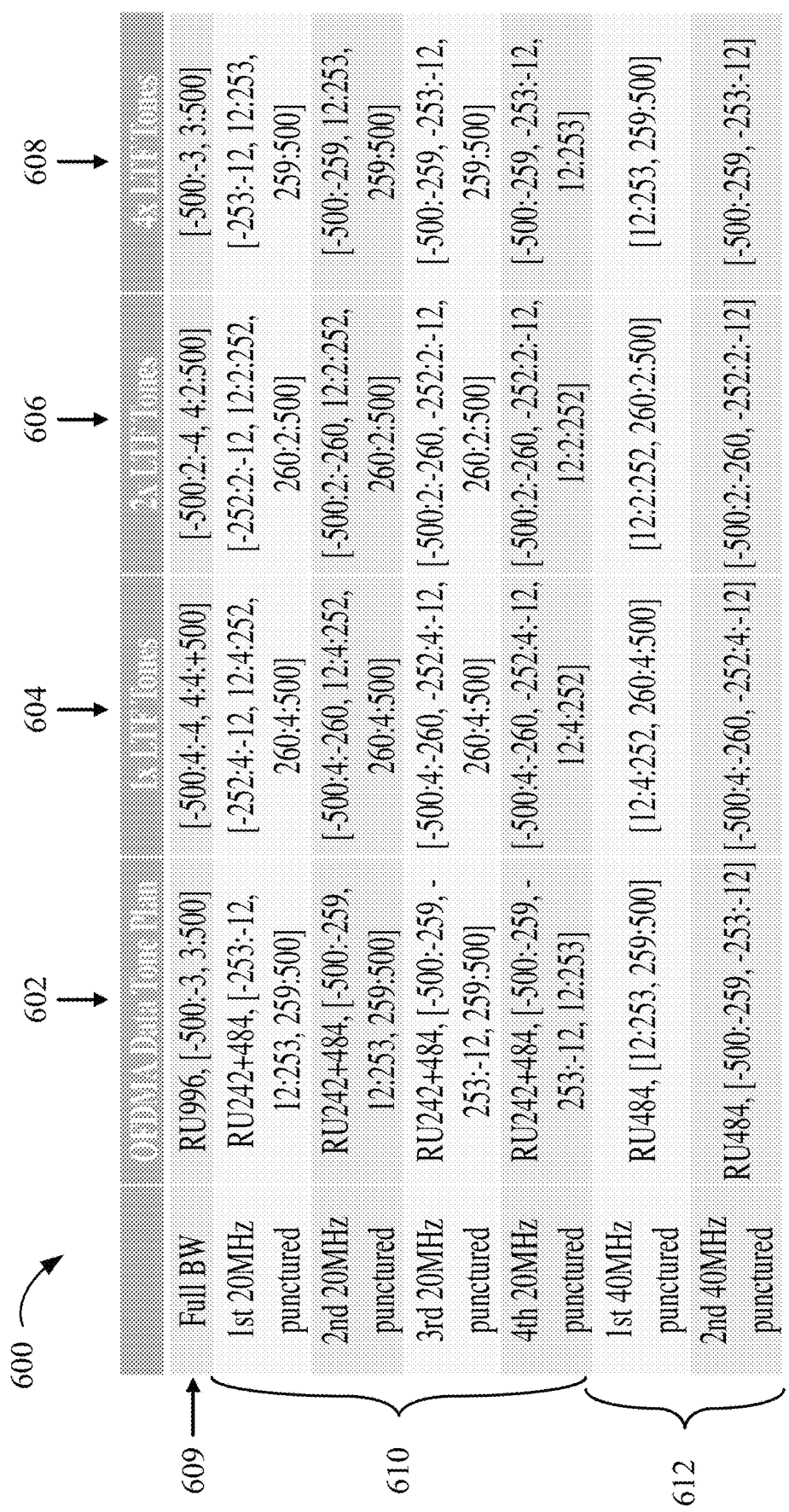
FIG. 6 is a table illustrating an orthogonal frequency-division multiple access (OFDMA) data tone plan for an 80 MHz bandwidth channel that may be the basis for a long training field (LTF) tone plan for transmission of punctured null data packets (NDPs).

FIG. 6 is a table illustrating an OFDMA data tone plan for an 80 MHz bandwidth channel that may be the basis for a long training field (LTF) tone plan for transmission of punctured NDPs. In this example, a data may be transmitted according to the OFDMA data tone plan 602 for a complete 80 MHz bandwidth channel 609, where the data tones span a region of span 1001 tones [−500: 500], a every 4 tones, and with a 7 tone direct current (DC) gap/region between [−3: 3]. For full bandwidth non-data transmission (such as LTF sequence over NDP), the tone plan 608 may span a tone region [−500:−3, 3:500], with every tone used for 4×LTF tones (symbol duration of 12.8 μs plus a guard interval). Similarly, for the full bandwidth non-data transmission, the tone plan 606 may span a tone region [−500:−4, 4:500], with every two tones used for 2×LTF tones (with symbol duration of 6.4 μs plus a guard interval). Likewise, for the full bandwidth non-data transmission, the tone plan 604 may span a tone region [−500:−4, 4:500], with every 4 tones used for 1×LTF tones (with symbol duration of 3.2 μs plus a guard interval).

In the case of a punctured 80 MHz bandwidth channel 610 comprising four (4) 20 MHz subchannels, or two 40 Mhz subchannels, (such that one of the subchannels is punctured), the LTF sequence within the NDP may be transmitted using a non-data tone plan that depends on which of the four 20 MHz subchannels (or two 40 MHz subchannel) is punctured and the symbol duration of the LTF sequence (1×, 2×, or 4×). Here for 4×LTF, the table 600 shows that the non-data tone plan is the same as for the OFDMA data tone plan. However, for 1×LTF and 2×LTF, the table 600 shows that the tone plans 604 and 606, respectively, vary depending on the symbol duration for the LFT sequence as well as the relative position of the punctured subchannel within the plurality of subchannels.

Figure 7:
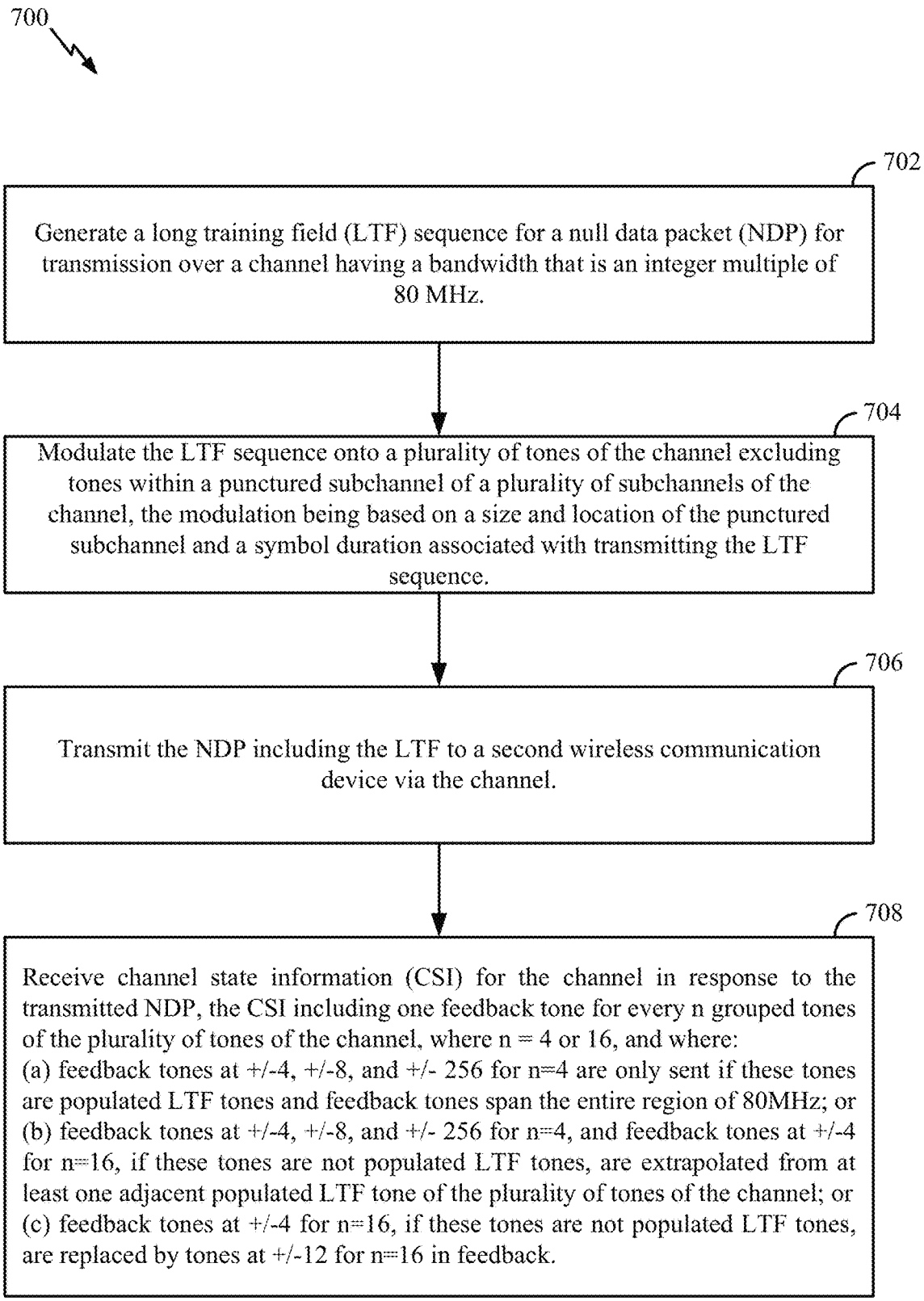
FIG. 7 shows a flowchart illustrating an example method for wireless communication including generating and transmitting a long training field sequence for a null data packet according to one aspect.

FIG. 7 is an example method for wireless communication including generating and transmitting a long training field sequence for a null data packet according to some aspects. At step 702, a long training field (LTF) sequence for a null data packet (NDP) may be generated for transmission over a channel having a bandwidth that is an integer multiple of 80 MHz.

At step 704, the LTF sequence may be modulated onto a plurality of tones of the channel excluding tones within a punctured subchannel of a plurality of subchannels of the channel, the modulation being based on a size and location of the punctured subchannel and a symbol duration associated with transmitting the LTF sequence. For instance, modulation of the LTF sequence onto the plurality of tones may be based on an orthogonal frequency division multiple access (OFDMA) data tone plan for an 80 MHz bandwidth channel or each 80 MHz segment of a wireless channel where the total channel bandwidth is an integer multiple of 80 MHz. The non-data tones illustrated in FIG. 6 (1× LTF, 2×, LTF, or 4×LTF) may be used for modulation depending on the position of the punctured subchannel. In various examples, the punctured subchannel may have a bandwidth of 20 MHz or 40 MHz. According to some implementations, the channel may be a contiguous 80 MHz wireless channel, a contiguous 160 MHz wireless channel, a non-contiguous 80 MHz+80 MHz wireless channel, a contiguous 240 MHz wireless channel, a non-contiguous 160 MHz+80 MHz channel, a contiguous 320 MHz wireless channel, or a non-contiguous 160 MHz+160 MHz wireless channel.

In one example, the symbol duration associated with the LTF sequence is one of: 12.8 μs plus a guard interval (4×LTF), 6.4 μs plus the guard interval (2×LTF), or 3.2 μs plus the guard interval (1×LTF), and the guard interval is one of 0.8 μs, 1.6 μs, or 3.2 μs.

According to some aspects, the symbol duration associated with the LTF sequence may be 12.8 μs plus a guard interval (4×LTF). In that case, every tone in the OFDMA data tone plan is used for modulation of the LTF sequence. In one specific example, when the punctured subchannel is 20 MHz in bandwidth (within an 80 MHz bandwidth channel or each 80 MHz segment of a wireless channel where the total channel bandwidth is an integer multiple of 80 MHz) and the plurality of tones span a tone region of 1001 tones within the particular 80 MHz channel or segment, the plurality of tones used for modulating the LTF sequence (as illustrated in FIG. 6) may be:
(a) every tone in the [−253:−12, 12:253, 259:500] tone region if the punctured subchannel is a first positioned subchannel;
(b) every tone in the [−500:−259, 12:253, 259:500] tone region if the punctured subchannel is a second positioned subchannel;
(c) every tone in the [−500:−259, −253:−12, 259:500] tone region if the punctured subchannel is a third positioned subchannel; or
(d) every tone in the [−500:−259, −253:−12, 12:253] tone region if the punctured subchannel is a fourth positioned subchannel.

In another specific example, when the punctured subchannel has a 40 MHz bandwidth (within an 80 MHz bandwidth channel or each 80 MHz segment of a wireless channel where the total channel bandwidth is an integer multiple of 80 MHz) and the plurality of tones span a tone region of 1001 tones within the particular 80 MHz channel or segment, the plurality of tones used for modulating the LTF sequence (as illustrated in FIG. 6) may be:
(a) every tone in the [12:253, 259:500] tone region if the punctured subchannel is a first positioned subchannel; or
(b) every tone in the [−500:−259, −253:42] tone region if the punctured subchannel is a second positioned subchannel.

According to another aspect, the symbol duration associated with the LTF sequence may be 6.4 μs plus a guard interval (2×LTF). In that case, every other tone (that is, every even indexed tone) within a subset of tones of the OFDMA data tone plan is used for modulation of the LTF sequence. In one specific example, when the punctured subchannel is 20 MHz in bandwidth (within an 80 MHz bandwidth channel or each 80 MHz segment of a wireless channel where the total channel bandwidth is an integer multiple of 80 MHz) and the plurality of tones span a tone region of 1001 tones within the particular 80 MHz channel or segment, the plurality of tones used for modulating the LTF sequence (as illustrated in FIG. 6) may be:
(a) every tone in the [−252:2:−12, 12:2:252, 260:2:500] tone region (that is, (that is, every other tone in the tone region [−252:−12, 12:252, 260:500]) if the punctured subchannel is a first positioned subchannel;
(b) every tone in the [−500:2:−260, 12:2:252, 260:2:500] tone region (that is, every other tone in the tone region [−500:−260, 12:252, 260:500]) if the punctured subchannel is a second positioned subchannel;
(c) every tone in the [−500:2:−260, −252:2:−12, 260:2:500] tone region (that is every other tone in the tone region [−500:−260, −252:−12, 260:500]) if the punctured subchannel is a third positioned subchannel; or
(d) every tone in the [−500:2:−260, −252:2:−12, 12:2:252] tone region (that is every other tone in the tone region [−500:−260, −252:−12, 12:252]) if the punctured subchannel is a fourth positioned subchannel.

In another specific example, when the punctured subchannel has a 40 MHz bandwidth (within an 80 MHz bandwidth channel or each 80 MHz segment of a wireless channel where the total channel bandwidth is an integer multiple of 80 MHz) and the plurality of tones span a tone region of 1001 tones within the particular 80 MHz channel or segment, the plurality of tones used for modulating the LTF sequence (as illustrated in FIG. 6) may be: (a) every tone in the [12:2:252, 260:2:500] tone region (that is every even-indexed tone in the tone region [12:252, 260:500]) if the punctured subchannel is a first positioned subchannel; or (b) every tone in the [−500:2:−260, −252:2:42] tone region (that is every even-indexed tone in the tone region [−500:−260, −252:42]) if the punctured subchannel is a second positioned subchannel.

According yet to another aspect, when the symbol duration associated with the LTF sequence is 3.2 μs plus a guard interval (1×LTF), every fourth tone within a subset of tones of the OFDMA tone plan may be used for modulation of the LTF sequence. In one specific example, wherein the punctured subchannel is 20 MHz in bandwidth (within an 80 MHz bandwidth channel or each 80 MHz segment of a wireless channel where the total channel bandwidth is an integer multiple of 80 MHz) and the plurality of tones span a tone region of 1001 tones within the particular 80 MHz channel or segment, the plurality of tones used for modulating the LTF sequence (as illustrated in FIG. 6) may be:
(a) every tone in the [−252:4:−12, 12:4:252, 260:4:500] tone region (that is every fourth tone in the tone region [−252:−12, 12:252, 260:500]) if the punctured subchannel is a first positioned subchannel;

(b) every tone in the [−500:4:−260, −252:4:−12, 260:4:500] tone region (that is every fourth tone in the tone region [−500:−260, 12:252, 260:500]) if the punctured subchannel is a second positioned subchannel;

(c) every tone in the [−500:4:−260, −252:4:−12, 260:4:500] tone region (that is every fourth tone in the tone region [−500:−260, −252:−12, 260:500]) if the punctured subchannel is a third positioned subchannel; or (d) every tone in [−500:4:−260, −252:4:−12, 12:4:252] tone region (that is every fourth tone in the tone region [−500:−260, −252:−12, 12:252]) if the punctured subchannel is a fourth positioned subchannel.

In another specific example, when the punctured subchannel has a 40 MHz bandwidth (within an 80 MHz bandwidth channel or each 80 MHz segment of a wireless channel where the total channel bandwidth is an integer multiple of 80 MHz) and the plurality of tones span a tone region of 1001 tones within the particular 80 MHz channel or segment, the plurality of tones used for modulating the LTF sequence are: (a) every tone in the [12:4:252, 260:4:500] tone region (that is every fourth tone in the tone region [12:252, 260:500]) if the punctured subchannel is a first positioned subchannel; or (b) every tone in the [−500:4:−260, −252:4:42] tone region (that is every fourth tone in the tone region[−500:−260, −252:42]) if the punctured subchannel is a second positioned subchannel.

At step 706, the NDP including the LTF sequence is transmitted to a second wireless communication device via the channel.

Once the NDP is transmitted, channel state information (CSI) may be received in response to such transmission. However, a feedback tone set is needed to define the grouping of subcarriers in CSI feedback. Note that while IEEE 802.11ax defines a partial bandwidth CSI start/end tone indices table for RU26 (resource units with 26 tones) and provides coverage for an entire RU996 (996 tones) within an 80 MHz PPDU or each 80 MHz segment of a wireless channel where the total channel bandwidth is an integer multiple of 80 MHz, it does not align with RU26 in the second and third 20 MHz in the IEEE 802.11be EHT80 tone plan. Also, the indices are different since 802.11ax defines 37 RU26 while IEEE 802.11be has 36 RU26.

According to some aspects, the same IEEE 802.11ax feedback tones definition for Ng=4 for IEEE 802.11be may be reused. The entire feedback tones set of Ng=4 is [−500:4:−4, 4:4:500], but may be rewritten as [[−244:4:−4, 0, 4:4:244]−256, −8, −4, 4, 8, [−244:4:−4, 0, 4:4:244]+256], where [−244:4:−4, 4:4:244] are feedback tones of Ng=4 for HE40.

For partial bandwidth CSI feedback, where only CSI of a subset of RU26 are included in the CSI feedback, need to define an Ng=4 CSI feedback start/end tone indices table for 802.11be. One option, illustrated in FIG. 8 provides an example of feedback start/end tone indices table for Ng=4 for IEEE 802.11be. The table in FIG. 8 may use duplication of the Ng=4 table for HE40 in two 40 MHz subbands with tone shifting of −256 for the lower 40 MHz and tone shifting of +256 for the upper 40 MHz, and let adjacent RUs add coverage of 6 feedback tones (±4, ±8, ±256). For instance, these 6 feedback tones may not be populated in punctured NDP, and CSI feedback may be extrapolated for these tones in response to punctured NDP. In another instance, these tones are only required to be sent in case of full 80 MHz PPDU (or full 80 MHz segment) CSI feedback without puncturing, and not required to be sent otherwise.

In another option, illustrated in an example of feedback start/end tone indices table for Ng=4 for IEEE 802.11be of FIG. 9, duplication of the Ng=4 table of HE40 may be employed where 6 feedback tones (±4, ±8, ±256) are defined in the feedback tone set but not in the Ng=4 table. These tones are only required to be sent in case of full 80 MHz PPDU (or full 80 MHz segment) CSI feedback without puncturing, and not required to be sent otherwise.

FIG. 17 illustrates yet another option of feedback start/end tone indices table for Ng=4 in IEEE 802.11be. This table is a slight variation on the approach illustrated in FIG. 9. In particular, the 18$^{th}$ RU26 is empty and the start and end tones for the second and third 20 MHz have been changed due to shifting of the RUs.

In a general approach, the tones in the feedback tone set should be feedback if they are in the range of an RU start/end tone indices. Note that puncturing of subchannel in the punctured NDP is RU242 based, and the tones that are defined in the feedback tone set but in the punctured RU242 should not be sent. For 6 feedback tones (±4, ±8, ±256) for Ng=4, if these tones are not populated in NDP (that is, in the punctured NDP case), they are not required to be sent. These tones are only required to be sent in case of full 80 MHz PPDU (or full 80 MHz segment) CSI feedback without puncturing, and not required to be sent otherwise. A full 80 MHz PPDU (or full 80 MHz segment) CSI feedback without puncturing is defined as when RUs from the 0$^{th}$ to the 35$^{th}$ are requested for an 80 MHz non-punctured NDP, or when all RUs within one 80 MHz segment (without puncturing in the 80 MHz segment) are requested for a >80 MHz NDP.

Yet another aspect may provide for defining an Ng=16 CSI feedback start/end tone indices table for 802.11be. In one option, a feedback tone set for IEEE 802.11ax may be reused, feedback tones of Ng=16, for IEEE 802.11be. The feedback tones of Ng=16 for HE80 are [−500:16:−4, 4:16:500]. According to one option, illustrated in an example of the feedback start/end tone indices table for Ng=16 for IEEE 802.11be of FIG. 10, the Ng=16 feedback tones for HE80 are kept and the table is revised/modified by making changes for RUs in 2$^{nd}$ & 3$^{rd}$ 20 MHz as shown.

In one approach, in order to provide feedback tones ±4 for Ng=16, if these tones are not populated in the punctured NDP, extrapolation may be used to get CSI feedback for these tones. In another approach, if these tones are not populated in the punctured NDP, feedback tones ±4 may be replaced by ±12 tones (which are populated tones in 1×/2×/4×LTFs, not in the Ng=16 feedback tones set, but edge tones of adjacent RUs) in case of a partial bandwidth CSI feedback with punctured NDP.

In another approach, in order to provide feedback tones ±260 for Ng=16, there may be special treatment depending on the scenario. For instance, if the first 20 MHz subchannel is punctured within an 80 MHz bandwidth channel (or 80 MHz segment), the feedback tone −260 may be replaced for the 9$^{th}$ RU26 ([−252:−227] in the second 20 MHz subchannel) by −252 (which is a populated tone in 1×/2×/4×LTFs, not in the Ng=16 feedback tones set, but an edge tone of the 9$^{th}$ RU26). Additionally, if the fourth 20 MHz subchannel is punctured within the 80 MHz bandwidth channel (or 80 MHz segment), the feedback tone +260 may be replaced for the 26$^{th}$ RU26 ([227:252] in the third 20 MHz subchannel) by +252 (which is a populated tone in 1×/2×/4×LTFs, not in the Ng=16 feedback tones set, but an edge tone of the 26$^{th}$ RU26).

In another approach, these two feedback tones ±260 may be replaced in the Ng=16 table as illustrated in FIG. 11. FIG. 11 illustrates another example of feedback start/end tone indices table for Ng=16 for IEEE 802.11be.

FIG. 12 illustrates yet another example of feedback start/end tone indices table for Ng=16 for IEEE 802.11be. In one approach, the feedback tone set may redefine the feedback tones of Ng=16 for IEEE 802.11be. In IEEE 802.11ax the feedback tones of Ng=16 are [−500:16:−4, 4:16:500]. In IEEE 802.11be, the feedback tones of Ng=16 may be redefined based on duplication of feedback tones set of Ng=16 for HE40 in IEEE 802.11ax, in each 40 MHz subband, with tone shifting of −256 in the lower 40 MHz and tone shifting of +256 in the upper 40 MHz. The resulting feedback tones set of Ng=16 for IEEE 802.11be is [[−244:16:−4, 4:16:244]−256, −4, 4, [−244:16:−4, 4:16:244]+256]=[−500:16:−260, −252:16:−12, −4, 4, 12:16:252, 260:500], where [−244:16:−4, 4:16:244] are feedback tones of Ng=16 for HE40.

According to an example, the Ng=16 feedback start/end tone indices table for feedback tones may be based on duplication of the Ng=16 feedback start/end tone indices table of HE40. Two feedback tones (±4) are defined in the feedback tone set but not in the Ng=16 table. These tones may only be required to be sent in case of full 80 MHz PPDU (or full 80 MHz segment) CSI feedback, and not required to be sent otherwise.

FIG. 13 illustrates yet another option of feedback start/end tone indices table for Ng=16 in IEEE 802.11be. This table is a slight variation on the approach illustrated in FIG. 12. In particular, the Ng=16 feedback start/end tone indices table of HE40 is duplicated in each 40 MHz subband, with tone shifting of −256 in the lower 40 MHz and tone shifting of +256 in the upper 40 MHz, and adjacent RUs provide coverage of two feedback tones (±4). These two feedback tones may not be populated in the LTF of the punctured NDP. In the case of feedback tones ±4 in response to punctured NDP, one solution may be to extrapolate to get CSI feedback for these tones. Another solution may be to replace these tones by ±12 (which are populated tones in 1×/2×/4×LTFs, not in the Ng=16 feedback tones set, but edge tones of adjacent RUs) in case of partial BW CSI feedback with punctured NDP.

FIG. 18 illustrates yet another option of feedback start/end tone indices table for Ng=4 in IEEE 802.11be. This table is a slight variation on the approach illustrated in FIG. 13. In particular, the $18^{th}$ RU26 is empty and the start and end tones for the second and third 20 MHz have been changed due to shifting of the RUs.

In general approach, the tones in the feedback tone set are feedback if they are in the range of RU start/end tone indices. Puncturing of subchannel is RU242 based, and the tones are defined in the feedback tone set, but in the case of a punctured RU242 these tones should not be sent. For instance, for two feedback tones (±4) for Ng=16, if these tones are not populated in the LTF of the NDP (that is, in the punctured NDP case), they are not required to be sent. These tones are only required to be sent in case of full 80 MHz PPDU (or full 80 MHz segment) CSI feedback without puncturing, and not required to be sent otherwise. A full 80 MHz PPDU (or full 80 MHz segment) CSI feedback without puncturing is defined as when RUs from the $0^{th}$ to the $35^{th}$ are requested for an 80 MHz non-punctured NDP, or when all RUs within one 80 MHz segment (without puncturing in the 80 MHz segment) are requested for a >80 MHz NDP.

To accommodate PPDUs greater than 80 MHz in bandwidth (such as, 160/80+80/240/160+80/320/160+160 MHz PPDUs), the tone plan may be duplicates of the EHT80 tone plan. The LTF tones in a punctured NDP and feedback start/end tone indices for Ng=4 and Ng=16 could be generalized in the following way. The 80 MHz segments in 80+80/160+80 MHz use same tone indices. The 160 MHz PPDU and 160 MHz segments in 160+80/160+160 MHz use [tone indices −512, tone indices +512]. The 320 MHz PPDU uses [tone indices −1536, tone indices −512, tone indices +512, tone indices +1536]. Lastly, the 240 MHz PPDU uses either [tone indices −1536, tone indices −512, tone indices +512] or [tone indices −512, tone indices +512, tone indices +1536].

The RU26 indices in the start/end tone indices table for the 80 MHz PPDU is from $0^{th}$ to $35^{th}$. And they could be generalized in the following way: (i) the RU26 indices for the 160/80+80 MHz PPDUs are from $0^{th}$ to $71^{st}$, (ii) the RU26 indices for the 240/160+80 MHz PPDUs are from $0^{th}$ to $107^{th}$, and (iii) the RU26 indices for the 320/160+160 MHz PPDUs are from $0^{th}$ to $143^{rd}$.

Referring again to FIG. 7, at step 708, channel state information (CSI) for the channel may be received in response to the transmitted NDP, the CSI including one feedback tone for every n grouped tones of the plurality of tones of the channel, where n=4 or 16, and where:

(a) feedback tones at +/−4, +/−8, and +/−256 for n=4 are only sent if these tones are populated LTF tones and feedback tones span the entire region of 80 MHz; or (b) feedback tones at +/−4, +/−8, and +/−256 for n=4, and feedback tones at +/−4 for n=16, if these tones are not populated LTF tones, are extrapolated from at least one adjacent populated LTF tone of the plurality of tones of the channel; or (c) feedback tones at +/−4 for n=16, if these tones are not populated LTF tones, are replaced by tones at +/−12 for n=16 in feedback.

In one example, a feedback tone set for n=4 is defined as [−500:4:−4, 4:4:500], spanning a region of 1001 tones [−500:500], every 4 tones, and with a DC gap between [−2:2].

In one example, a feedback tone set for n=4 may be defined as [−500:4:−4, 4:4:500], spanning a region of 1001 tones [−500:500], every 4 tones, and with a DC gap between [−2:2]. The feedback tones at +/−4, +/−8, and +/−256 are not sent when corresponding tones in the NDP are not populated.

In another example, a feedback tone set for n=16 is defined as [−500:16:−4, 4:16:500], spanning a region of 1001 tones [−500:500], every 16 tones, and with a DC tone region between [−2:2].

In yet another example, a feedback tone set for n=16 is defined as [−500:16:−260, −252:16:−12, −4, 4, 12:16:252, 260:500], spanning a region of 1001 tones [−500:−260, −252:−12, −4, 4, 12:252, 260:500], every 16 tones, and with a DC tone region between [−2:].

In some implementations, the feedback tones at +/−4 are not sent when corresponding tones in the NDP are not populated.

A null data packet announcement (NDPA) is typically sent by a base station to identify intended recipients and a format of the forthcoming sounding frame, and is followed by a sounding NDP. In IEEE 802.11ax, the NDPA has a 14-bit partial bandwidth info subfield, which includes a 7-bit RU Start Index subfield and a 7-bit RU End Index subfield.

IEEE 802.11be may use partial bandwidth CSI feedback with same RU26 granularity as in 802.11ax. Alternatively, 802.11be may restrict partial bandwidth CSI feedback with a 20 MHz granularity (RU242).

In some aspects for IEEE 802.11be, RU26 granularity may be used for partial bandwidth channel state information (CSI) feedback. Consequently, there are total 36×4=144 RU26 in a 320 MHz PPDU, 8 bits are needed to represent the RU start index and 8 bits are needed for the RU end index (a total 16 bits for the partial bandwidth info subfield in NDPA).

In another aspect for IEEE 802.11be, RU242 granularity may be used for partial bandwidth CSI feedback. In such case, there are total 4×4=16 RU242 in a 320 MHz PPDU, 4 bits are needed for the RU start index and 4 bits for the RU end index (a total 8 bits for the partial bandwidth info subfield in NDPA). In order to reduce the size of the info subfield in NDPA, if the partial bandwidth CSI feedback request has 20 MHz granularity, some aspects propose to use RU242 start/end indices in the 802.11be NDPA.

FIG. 14 illustrates an OFDMA feedback start/end tone indices table for an 80 MHz bandwidth channel (or an 80 MHz segment of a larger bandwidth channel that is a multiple of 80 MHz) that may have a 20 MHz granularity. In this example, the table defines the feedback start/end tone indices 1400 for channel state information (CSI) where the CSI includes one feedback tone for every n grouped tones of the plurality of tones of the channel, where n=4 or 16.

A general approach may be designed to accommodate channels having various bandwidth portions. Channel state information (CSI) for the channel may be received in response to the transmitted NDP, the CSI including one feedback tone for every n grouped tones of the plurality of tones of the channel, where n=4 or 16. The CSI may be indicated by feedback start and end tone indices tables for each 26-tone RU that: (a) duplicates a High Efficiency (HE) feedback start/end tone indices table for 40 MHz bandwidth channels to form an entire table of an 80 MHz physical layer convergence protocol (PLCP) protocol data unit (PPDU), (b) the feedback start/end tone indices of RU26 in the first 40 MHz is based on start/end tone indices for the HE feedback start/end tone indices table for 40 MHz that are shifted by −256 tones, and (c) the feedback start/end tone indices of RU26 in the second 40 MHz is based on start/end tone indices for the HE feedback start/end tone indices table for 40 MHz that are shifted by +256 tones. For the channel having bandwidth portions in 80 MHz segments within 80+80 MHz or 160+80 MHz PPDUs, this same feedback start/end tone indices table is used. For the channel having bandwidth portions in 160 MHz segments within 160 MHz, 160+80 MHz, or 160+160 MHz PPDUs, the feedback start/end tone indices table is a duplication of two tables for 80 MHz, with tone indices shifted by −512 tones for the RU26 in a lower 80 MHz and +512 tones for the RU26 in an upper 80 MHz, respectively. For the channel having bandwidth portions in a 320 MHz PPDU, the feedback start/end tone indices table is a duplication of four tables for 80 MHz, with tone indices shifted by −1536 tones for an RU26 in a first 80 MHz, −512 tones for an RU26 in a second 80 MHz, +512 tones for an RU26 in a third 80 MHz, and +1536 tones for an RU26 in a fourth 80 MHz, respectively. For the channel having bandwidth portions in 240 MHz segments, the feedback start/end tone indices table is a duplication of three tables for 80 MHz, with tone indices shifted by: (a) −1536 tones for an RU26 in a first 80 MHz, −512 tones for an RU26 in a second 80 MHz, and +512 tones for an RU26 in a third 80 MHz, respectively, or (b) −512 tones for an RU26 in a first 80 MHz, +512 tones for an RU26 in a second 80 MHz, and +1536 tones for an RU26 in a third 80 MHz, respectively.

FIG. 19 illustrates specific examples of OFDMA feedback start/end tone indices table for a partial 80 MHz bandwidth channel (or an 80 MHz segment of a larger bandwidth channel that is a multiple of 80 MHz) for RU242 granularity, where the feedback does not cover the entire 80 MHz bandwidth channel or segment. In this table, the start/end indices for n grouped tones Ng=4 or Ng=16 of FIG. 14 are illustrated in more detail. Note that for 160 MHz bandwidth channel and 320 MHz bandwidth channel, the feedback tone set of 80 MHz bandwidth channel is duplicated in each 80 MHz segment. Within the entire 80 MHz bandwidth channel or each 80 MHz segment of a 160 MHz or 320 MHz bandwidth channel, if certain RU242 is not within the range of a feedback request, only the feedback tones of the remaining RU242 in that 80 MHz bandwidth channel or segment that are within the range of feedback request are sent.

Specifically, for feedback of a portion or segment of an 80 MHz bandwidth channel, RU242 index 1 is [−500:Ng:−260], index 2 is [−252:Ng:−12], index 3 is [12:Ng:252], and index 4 is [260:Ng:500].

Similarly, for feedback of a portion or segment of an 160 MHz bandwidth channel, RU242 index 1 is [−1012:Ng:−772], index 2 is [−764:Ng:−524], index 3 is [−500:Ng:−260], index 4 is [−252:Ng:−12], index 5 is [12:Ng:252], index 6 is [260:Ng:500], index 7 is [524:Ng:764], and index 8 is [772:Ng:1012].

Likewise, for feedback of a portion or segment of an 320 MHz bandwidth channel, RU242 index 1 is [−2036:Ng:−1796], index 2 is [−1788:Ng:−1548], index 3 is [−1524:Ng:−1284], index 4 is [−1276:Ng:−1036], index 5 is [−1012:Ng:−722], index 6 is [−764:Ng:−524], index 7 is [−500:Ng:−260], index 8 is [−252:Ng:−12], index 9 is [12:Ng:252], index 10 is [260:Ng:500], index 11 is [524:Ng:764], index 12 is [772:Ng:1012], index 13 is [1036:Ng:1276], index 14 is [1284:Ng:1524], index 15 is [1548:Ng:1788], and index 16 is [1796:Ng:2036].

FIG. 20 is a table illustrating specific examples of OFDMA feedback start/end tone indices for an entire 80 MHz bandwidth channel for RU996 granularity using n grouped tones Ng=4, where the feedback covers the entire 80 MHz bandwidth channel Note that for 160 MHz bandwidth channel and 320 MHz bandwidth channel, the feedback tone set of 80 MHz bandwidth channel is duplicated in each 80 MHz segment. If the entire 80 MHz bandwidth channel or each 80 MHz segment of a 160 MHz or 320 MHz bandwidth channel is within the range of feedback request, the feedback tones of the RU996 corresponding to that 80 MHz are sent.

Specifically, for feedback of an entire 80 MHz bandwidth channel, RU996 index 1 is [−500:4:−4, 4:4:500].

Similarly, for feedback of an entire 80 MHz segment within a 160 MHz bandwidth channel, RU996 index 1 is [−1012:4:−516, −508:4:−12], and index 2 is [12:4:508, 516:4:1012].

Likewise, for feedback of an entire 80 MHz segment within a 320 MHz bandwidth channel, RU996 index 1 is [−2036:4:−1540,−1532:4:−1036], index 2 is [−1012:4:−516, −508:4:42], index 3 is [12:4:508, 516:4:1012], and index 4 is [1036:4:1532, 1540:4:2036].

FIG. 21 is a table illustrating specific examples of OFDMA feedback start/end tone indices for an entire 80 MHz bandwidth channel for RU996 granularity using n grouped tones Ng=16, where the feedback covers the entire 80 MHz bandwidth channel.

Note that for 160 MHz bandwidth channel and 320 MHz bandwidth channel, the feedback tone set of 80 MHz bandwidth channel is duplicated in each 80 MHz segment. If the entire 80 MHz bandwidth channel or each 80 MHz segment of a 160 MHz or 320 MHz bandwidth channel is within the range of feedback request, the feedback tones of the RU996 corresponding to that 80 MHz are sent.

Specifically, for feedback of an entire 80 MHz bandwidth channel, RU996 index 1 is [−500:16:−260, −252:16:−12, −4, 4, 12:16:252, 260:16:500].

Similarly, for feedback of an entire 80 MHz segment within a 160 MHz bandwidth channel, RU996 index 1 is [−1012:16:−772, −764:16:−524, −516, −508, −500: 16:−260, −252:16:−12], and index 2 is [12:16:252, 260:16:500, 508, 516, 524: 16:764, 772:16:1012].

Likewise, for feedback of an entire 80 MHz segment within a 320 MHz bandwidth channel, RU996 index 1 is [−2036:16:−1796, −1788:16:−1548,−1540, −1532, −1524: 16:−1284, −1276:16:1036], index 2 is [−1012:16:−772, −764:16:−524, −516, −508, −500:16:−260, −252:16−12], index 3 is [12:16:252, 260:16:500, 508, 516, 524:16:764, 772:16:1012], and index 4 is [1036:16:1276, 1284:16:1524, 1532, 1540, 1548:16:1788, 1796:16:2036].

Figure 15:
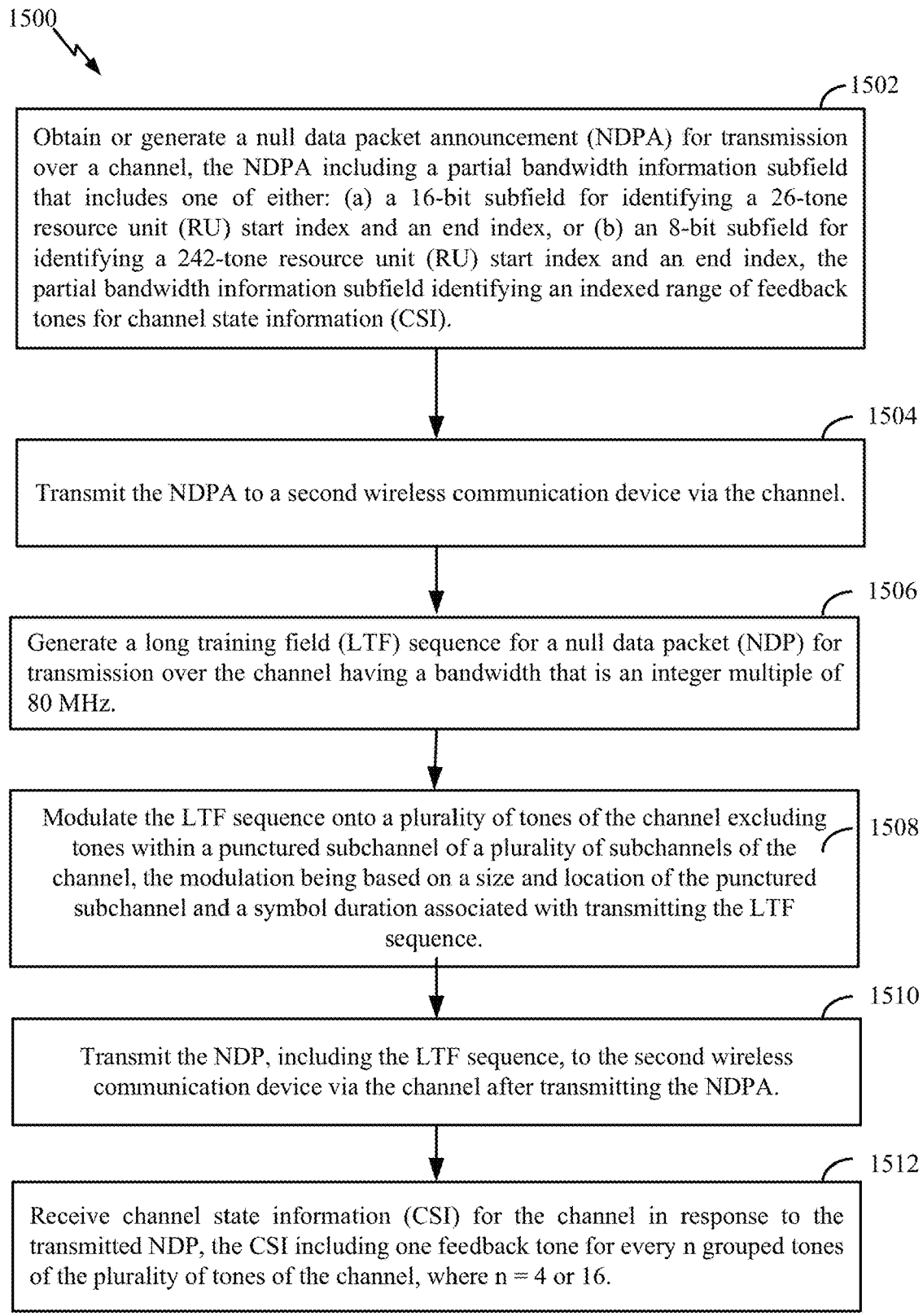
FIG. 15 shows a flowchart illustrating an example method for wireless communication including generating and transmitting a null data packet announcement (NDPA) according to some aspects.

FIG. 15 is an example method 1500 for wireless communication including generating and transmitting a null data packet announcement (NDPA) according to some aspects. At step 1502, the null data packet announcement (NDPA) may be obtained generated for transmission over the channel, the NDPA including a partial bandwidth information subfield that includes one of either: (a) a 16-bit subfield for identifying a 26-tone resource unit (RU) start index and an end index, or (b) an 8-bit subfield for identifying a 242-tone resource unit (RU) start index and an end index, the partial bandwidth information subfield identifying an indexed range of feedback tones for channel state information (CSI).

At step 1504, a long training field (LTF) sequence may be generated for a null data packet (NDP) for transmission over a channel having a bandwidth that is an integer multiple of 80 MHz.

At step 1506, the LTF sequence may be modulated onto a plurality of tones of the channel excluding tones within a punctured subchannel of a plurality of subchannels of the channel, the modulation being based on a size and a location of the punctured subchannel and a symbol duration associated with transmitting the LTF sequence.

At step 1508, the NDPA may be transmitted to a second wireless communication device via the channel.

At step 1510, the NDP, including the LTF sequence, may also be transmitted to the second wireless communication device via the channel.

In one example, 26-tone RUs may be used for CSI feedback granularity, and the 16-bit subfield includes an 8-bit start index and an 8-bit end index.

At step 1512, channel state information (CSI) may be received for the channel in response to the transmitted NDP, the CSI including one feedback tone for every n grouped tones of the plurality of tones of the channel, where n=4 or 16.

In one implementation, where n=4, the CSI is indicated by feedback start and end tone indices tables for each 26-tone RU that duplicates a High Efficiency (HE) feedback start/end tone indices table for 40 MHz bandwidth channels to form an entire table of an 80 MHz physical layer convergence protocol (PLCP) protocol data unit (PPDU). The feedback start/end tone indices of RU26 in a first 40 MHz is based on start/end tone indices for the HE feedback start/end tone indices table for 40 MHz that are shifted by −256 tones. The feedback start/end tone indices of RU26 in a second 40 MHz is based on start/end tone indices for the HE feedback start/end tone indices table for 40 MHz that are shifted by +256 tones. The feedback start and end tone indices tables for each 26-tone RU may further provide coverage of extra feedback tones by using adjacent RUs, where the extra feedback tones are (±4, ±8, ±256).

In the example illustrated in FIG. 8 for n=4, the feedback start/end tone indices for 80 MHz bandwidth channels includes the start/end tone indices:

[−500, −472] for an 0th indexed RU,
[−476, −448] for an 1th indexed RU,
[−448, −420] for an 2th indexed RU,
[−420, −392] for an 3th indexed RU,
[−392, −364] for an 4th indexed RU,
[−368, −340] for an 5th indexed RU,
[−340, −312] for an 6th indexed RU,
[−312, −284] for an 7th indexed RU,
[−288, −256] for an 8th indexed RU,
[−256, −224] for an 9th indexed RU,
[−228, −200] for an 10th indexed RU,
[−200, −172] for an 11th indexed RU,
[−172, −144] for an 12th indexed RU,
[−148, −120] for an 13th indexed RU,
[−120, −92] for an 14th indexed RU,
[−92, −64] for an 15th indexed RU,
[−64, −36] for an 16th indexed RU,
[−40, −4] for an 17th indexed RU,
[4, 40] for an 18th indexed RU,
[36, 64] for an 19th indexed RU,
[64, 92] for an 20th indexed RU,
[92, 120] for an 21th indexed RU,
[120, 148] for an 22th indexed RU,
[144, 172] for an 23th indexed RU,
[172, 200] for an 24th indexed RU,
[200, 228] for an 25th indexed RU,
[224, 256] for an 26th indexed RU,
[256, 288] for an 27th indexed RU,
[284, 312] for an 28th indexed RU,
[312, 340] for an 29th indexed RU,
[340, 368] for an 30th indexed RU,
[364, 392] for an 31th indexed RU,
[392, 420] for an 32th indexed RU,
[420, 448] for an 33th indexed RU,
[448, 476] for an 34th indexed RU, and
[472, 500] for an 35th indexed RU.

In the example illustrated in FIG. 9 for n=4, the feedback start/end tone indices for 80 MHz bandwidth channels includes the start/end tone indices:

[−500, −472] for an 0th indexed RU,
[−476, −448] for an 1th indexed RU,
[−448, −420] for an 2th indexed RU,
[−420, −392] for an 3th indexed RU,
[−392, −364] for an 4th indexed RU,
[−368, −340] for an 5th indexed RU,
[−340, −312] for an 6th indexed RU,
[−312, −284] for an 7th indexed RU,
[−288, −256] for an 8th indexed RU,
[−252, −224] for an 9th indexed RU,
[−228, −200] for an 10th indexed RU,
[−200, −172] for an 11th indexed RU,
[−172, −144] for an 12th indexed RU,
[−148, −120] for an 13th indexed RU,
[−120, −92] for an 14th indexed RU,
[−92, −64] for an 15th indexed RU,
[−64, −36] for an 16th indexed RU,
[−40, −12] for an 17th indexed RU,
[12, 40] for an 18th indexed RU,
[36, 64] for an 19th indexed RU,
[64, 92] for an 20th indexed RU,
[92, 120] for an 21th indexed RU,
[120, 148] for an 22th indexed RU,
[144, 172] for an 23th indexed RU,
[172, 200] for an 24th indexed RU,

[200, 228] for an 25th indexed RU,
[224, 252] for an 26th indexed RU,
[260, 288] for an 27th indexed RU,
[284, 312] for an 28th indexed RU,
[312, 340] for an 29th indexed RU,
[340, 368] for an 30th indexed RU,
[364, 392] for an 31th indexed RU,
[392, 420] for an 32th indexed RU,
[420, 448] for an 33th indexed RU,
[448, 476] for an 34th indexed RU, and
[472, 500] for an 35th indexed RU.

In another implementation, where n=16, the CSI may be indicated by feedback start and end tone indices tables for each 26-tone RU that are defined based on a High Efficiency (HE) feedback start/end tone indices table for 80 MHz bandwidth channels.

In a first example illustrated in FIG. 10 for n=16, the feedback start/end tone indices for 80 MHz bandwidth channels includes the start/end tone indices:
[−500, −468] for an 0th indexed RU,
[−484, −436] for an 1th indexed RU,
[−452, −420] for an 2th indexed RU,
[−420, −388] for an 3th indexed RU,
[−404, −356] for an 4th indexed RU,
[−372, −340] for an 5th indexed RU,
[−340, −308] for an 6th indexed RU,
[−324, −276] for an 7th indexed RU,
[−292, −260] for an 8th indexed RU,
[−260, −212] for an 9th indexed RU,
[−228, −196] for an 10th indexed RU,
[−212, −164] for an 11th indexed RU,
[−180, −132] for an 12th indexed RU,
[−148, −116] for an 13th indexed RU,
[−132, −84] for an 14th indexed RU,
[−100, −52] for an 15th indexed RU,
[−68, −36] for an 16th indexed RU,
[−52, −4] for an 17th indexed RU,
[4, 52] for an 18th indexed RU,
[36, 68] for an 19th indexed RU,
[52, 100] for an 20th indexed RU,
[84, 132] for an 21th indexed RU,
[116, 148] for an 22th indexed RU,
[132, 180] for an 23th indexed RU,
[164, 212] for an 24th indexed RU,
[196, 228] for an 25th indexed RU,
[212, 260] for an 26th indexed RU,
[260, 292] for an 27th indexed RU,
[276, 324] for an 28th indexed RU,
[308, 340] for an 29th indexed RU,
[340, 372] for an 30th indexed RU,
[356, 404] for an 31th indexed RU,
[388, 420] for an 32th indexed RU,
[420, 452] for an 33th indexed RU,
[436, 484] for an 34th indexed RU, and
[468, 500] for an 35th indexed RU.

In a second example illustrated in FIG. 11 for n=16, the feedback start/end tone indices for 80 MHz bandwidth channels includes the start/end tone indices:
[−500, −468] for an 0th indexed RU,
[−484, −436] for an 1th indexed RU,
[−452, −420] for an 2th indexed RU,
[−420, −388] for an 3th indexed RU,
[−404, −356] for an 4th indexed RU,
[−372, −340] for an 5th indexed RU,
[−340, −308] for an 6th indexed RU,
[−324, −276] for an 7th indexed RU,
[−292, −260] for an 8th indexed RU,
[−252, −212] for an 9th indexed RU,
[−228, −196] for an 10th indexed RU,
[−212, −164] for an 11th indexed RU,
[−180, −132] for an 12th indexed RU,
[−148, −116] for an 13th indexed RU,
[−132, −84] for an 14th indexed RU,
[−100, −52] for an 15th indexed RU,
[−68, −36] for an 16th indexed RU,
[−52, −4] for an 17th indexed RU,
[4, 52] for an 18th indexed RU,
[36, 68] for an 19th indexed RU,
[52, 100] for an 20th indexed RU,
[84, 132] for an 21th indexed RU,
[116, 148] for an 22th indexed RU,
[132, 180] for an 23th indexed RU,
[164, 212] for an 24th indexed RU,
[196, 228] for an 25th indexed RU,
[212, 252] for an 26th indexed RU,
[260, 292] for an 27th indexed RU,
[276, 324] for an 28th indexed RU,
[308, 340] for an 29th indexed RU,
[340, 372] for an 30th indexed RU,
[356, 404] for an 31th indexed RU,
[388, 420] for an 32th indexed RU,
[420, 452] for an 33th indexed RU,
[436, 484] for an 34th indexed RU, and
[468, 500] for an 35th indexed RU.

In a third example illustrated in FIG. 12 for n=16, the feedback start/end tone indices for 80 MHz bandwidth channels includes the start/end tone indices:
[−500, −468] for an $0^{th}$ indexed RU,
[−484, −436] for an $1^{th}$ indexed RU,
[−452, −420] for an $2^{th}$ indexed RU,
[−420, −388] for an $3^{th}$ indexed RU,
[−404, −356] for an $4^{th}$ indexed RU,
[−372, −340] for an $5^{th}$ indexed RU,
[−340, −308] for an $6^{th}$ indexed RU,
[−324, −276] for an $7^{th}$ indexed RU,
[−292, −260] for an $8^{th}$ indexed RU,
[−252, −220] for an $9^{th}$ indexed RU,
[−236, −188] for an $10^{th}$ indexed RU,
[−204, −172] for an $11^{th}$ indexed RU,
[−172, −140] for an $12^{th}$ indexed RU,
[−156, −108] for an $13^{th}$ indexed RU,
[−124, −92] for an $14^{th}$ indexed RU,
[−92, −60] for an $15^{th}$ indexed RU,
[−76, −28] for an $16^{th}$ indexed RU,
[−44, −12] for an $17^{th}$ indexed RU,
[12, 44] for an $18^{th}$ indexed RU,
[28, 76] for an $19^{th}$ indexed RU,
[60, 92] for an $20^{th}$ indexed RU,
[92, 124] for an $21^{th}$ indexed RU,
[108, 156] for an $22^{th}$ indexed RU,
[140, 172] for an $23^{th}$ indexed RU,
[172, 204] for an $24^{th}$ indexed RU,
[188, 236] for an $25^{th}$ indexed RU,
[220, 252] for an $26^{th}$ indexed RU,
[260, 292] for an $27^{th}$ indexed RU,
[276, 324] for an $28^{th}$ indexed RU,
[308, 340] for an $29^{th}$ indexed RU,
[340, 372] for an $30^{th}$ indexed RU,
[356, 404] for an $31^{th}$ indexed RU,
[388, 420] for an $32^{th}$ indexed RU,
[420, 452] for an $33^{th}$ indexed RU,
[436, 484] for an $34^{th}$ indexed RU, and
[468, 500] for an $35^{th}$ indexed RU.

In a fourth example illustrated in FIG. 13 for n=16, the feedback start/end tone indices for 80 MHz bandwidth channels includes the start/end tone indices:
[−500, −468] for an 0th indexed RU,
[−484, −436] for an 1th indexed RU,
[−452, −420] for an 2th indexed RU,
[−420, −388] for an 3th indexed RU,
[−404, −356] for an 4th indexed RU,
[−372, −340] for an 5th indexed RU,
[−340, −308] for an 6th indexed RU,
[−324, −276] for an 7th indexed RU,
[−292, −260] for an 8th indexed RU,
[−252, −220] for an 9th indexed RU,
[−236, −188] for an 10th indexed RU,
[−204, −172] for an 11th indexed RU,
[−172, −140] for an 12th indexed RU,
[−156, −108] for an 13th indexed RU,
[−124, −92] for an 14th indexed RU,
[−92, −60] for an 15th indexed RU,
[−76, −28] for an 16th indexed RU,
[−44, −4] for an 17th indexed RU,
[4, 44] for an 18th indexed RU,
[28, 76] for an 19th indexed RU,
[60, 92] for an 20th indexed RU,
[92, 124] for an 21th indexed RU,
[108, 156] for an 22th indexed RU,
[140, 172] for an 23th indexed RU.
[172, 204] for an 24th indexed RU,
[188, 236] for an 25th indexed RU,
[220, 252] for an 26th indexed RU,
[260, 292] for an 27th indexed RU,
[276, 324] for an 28th indexed RU,
[308, 340] for an 29th indexed RU,
[340, 372] for an 30th indexed RU,
[356, 404] for an 31th indexed RU,
[388, 420] for an 32th indexed RU,
[420, 452] for an 33th indexed RU,
[436, 484] for an 34th indexed RU, and
[468, 500] for an 35th indexed RU.

In some implementations, 242-tone RUs may be used for CSI feedback granularity, and the 8-bit subfield includes a 4-bit start index and a 4-bit end index. Channel state information (CSI) for the channel may be received in response to the transmitted NDP, the CSI including one feedback tone for every n grouped tones of the plurality of tones of the channel, where n=4 or 16.

In one example illustrated in FIG. 14, where n=4, the CSI may be indicated by feedback start and end tone indices tables for each 242-tone RU that includes:
(a) indexed tones [−500:4:−260] that provide feedback for a first 20 MHz subchannel,
(b) indexed tones [−252:4:−12] that provide feedback for a second 20 MHz subchannel,
(c) indexed tones [12:4:252] that provide feedback for a third 20 MHz subchannel, and
(d) indexed tones [260:4:500] that provide feedback for a fourth 20 MHz subchannel In another example also illustrated in FIG. 14, where n=16, the CSI may be indicated by feedback start and end tone indices tables for each 242-tone RU that includes:
(a) indexed tones [−500:16:−260] that provide feedback for a first 20 MHz subchannel,
(b) indexed tones [−252:16:−12] that provide feedback for a second 20 MHz subchannel,
(c) indexed tones [12:16:252] that provide feedback for a third 20 MHz subchannel, and (d) indexed tones [260:16:500] that provide feedback for a fourth 20 MHz subchannel.

In the example illustrated in FIG. 19 for a 242-tone RU of n=4 or n=16 feedback tone spacing, the feedback start/end tone indices for 80 MHz bandwidth channels includes the start/end tone indices:
[−500, −260] for a 1st indexed RU,
[−252, −12] for a 2nd indexed RU,
[12, 252] for a 3rd indexed RU, and
[260, 500] for a 4th indexed RU.

Likewise, in the example illustrated in FIG. 19 for a 242-tone RU of n=4 or n=16 feedback tone spacing, the feedback start/end tone indices for 160 MHz bandwidth channels includes the start/end tone indices:
[−1012, −772] for a 1st indexed RU,
[−764, −524] for a 2nd indexed RU,
[−500, −260] for a 3rd indexed RU,
[−252, −12] for a 4th indexed RU,
[12, 252] for a 5th indexed RU,
[260, 500] for a 6th indexed RU,
[524, 764] for a 7th indexed RU, and
[772, 1012] for an 8th indexed RU.

Similarly, in the example illustrated in FIG. 19 for a 242-tone RU of n=4 or n=16 feedback tone spacing, the feedback start/end tone indices for 320 MHz bandwidth channels includes the start/end tone indices:
[−2036, −1796] for a 1st indexed RU,
[−1788, −1548] for a 2nd indexed RU,
[−1524, −1284] for a 3rd indexed RU,
[−1276, −1036] for a 4th indexed RU,
[−1012, −772] for a 5th indexed RU,
[−764, −524] for a 6th indexed RU,
[−500, −260] for a 7th indexed RU,
[−252, −12] for an 8th indexed RU,
[12, 252] for an 9th indexed RU.
[260, 500] for a 10th indexed RU,
[524, 764] for a 11th indexed RU,
[772, 1012] for a 12th indexed RU,
[1036, 1276] for a 13th indexed RU,
[1284, 1524] for a 14th indexed RU,
[1548, 1788] for a 15th indexed RU, and
[1796, 2036] for a 16th indexed RU.

Within the entire 80 MHz bandwidth channel or each 80 MHz segment of a 160 MHz or 320 MHz bandwidth channel, if certain RU242 is not within the range of feedback request, only the feedback tones of the remaining RU242 in that 80 MHz that are within the range of feedback request are sent. Otherwise, if the entire 80 MHz bandwidth channel or each 80 MHz segment of a 160 MHz or 320 MHz bandwidth channel is within the range of feedback request, the feedback tones of the RU996 corresponding to that 80 MHz are sent.

In an example illustrated in FIG. 20 for a 996-tone RU of n=4 feedback tone spacing, the feedback tone indices set for 80 MHz bandwidth channels is:
[−500:4:−4, 4:4:500] for a 1st indexed RU.

In another example illustrated in FIG. 20 for a 996-tone RU of n=4 feedback tone spacing, the feedback tone indices set for an entire 80 MHz segment within a 160 MHz bandwidth channels is:
[−1012:4:−516, −508:4:42] for a 1st indexed RU, and
[12:4:508, 516:4:1012] for a 2nd indexed RU.

Likewise, in another example illustrated in FIG. 20 for a 996-tone RU of n=4 feedback tone spacing, the feedback tone indices set for an entire 80 MHz segment within a 320 MHz bandwidth channels is:

[−2036:4:4540,−1532:4:4036] for a 1st indexed RU,
[−1012:4:−516, −508:4:42] for a 2nd indexed RU,
[12:4:508, 516:4:1012] for a 3rd indexed RU, and
[1036:4:1532, 1540:4:2036] for a 4th indexed RU.

In an example illustrated in FIG. 21 for a 996-tone RU of n=16 feedback tone spacing, the feedback tone indices set for 80 MHz bandwidth channels is:

[−500:16:−260, −252:16:−12, −4, 4, 12:16:252, 260:16:500] for a 1st indexed RU.

In another example illustrated in FIG. 21 for a 996-tone RU of n=16 feedback tone spacing, the feedback tone indices set for an entire 80 MHz segment within a 160 MHz bandwidth channels is:

[−1012:16:−772, −764:16:−524, −516, −508, −500: 16:−260, −252:16−12] for a 1st indexed RU, and

[12:16:252, 260:16:500, 508, 516, 524: 16:764, 772:16:1012] for a 2nd indexed RU.

Likewise, in another example illustrated in FIG. 21 for a 996-tone RU of n=16 feedback tone spacing, the feedback tone indices set for an entire 80 MHz segment within a 320 MHz bandwidth channels is:

[−2036:16:−1796, −1788:16:−1548,−1540, −1532, −1524:16:−1284, −1276:16:1036] for a 1st indexed RU,

[−1012:16:−772, −764:16:−524, −516, −508, −500:16:−260, −252:16−12] for a 2nd indexed RU,

[1036:16:1276, 1284:16:1524, 1532, 1540, 1548:16:1788, 1796:16:2036] for a 4th indexed RU.

Figure 22:
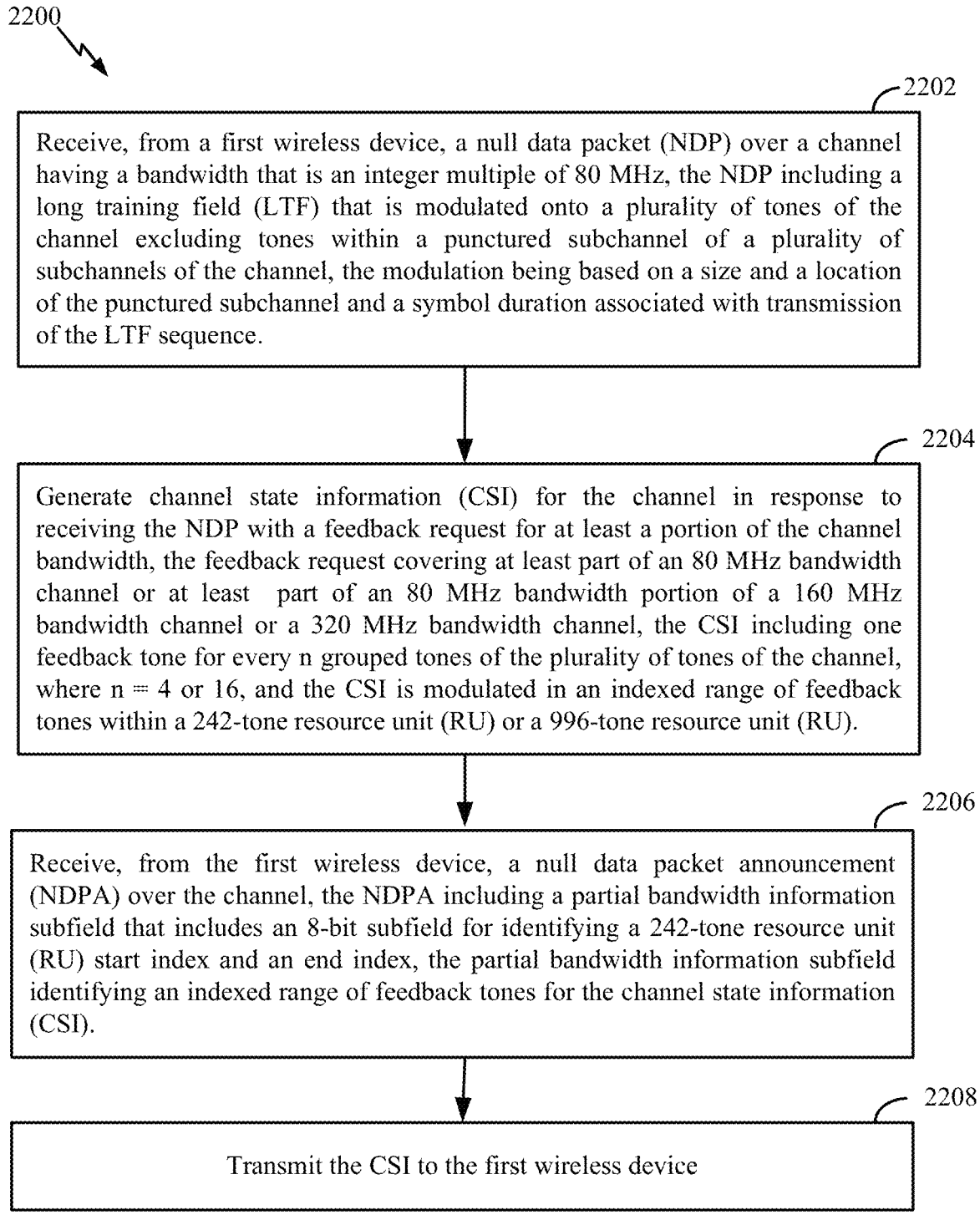
FIG. 22 is an example method for wireless communication that provides partial bandwidth feedback in response to receiving a punctured null data packet.

FIG. 22 is an example method 2200 for wireless communication that provides partial bandwidth feedback in response to receiving a punctured null data packet.

At step 2202 a wireless communication device may receive, from a first wireless device, a null data packet (NDP) over a channel having a bandwidth that is an integer multiple of 80 MHz, the NDP including a long training field (LTF) that is modulated onto a plurality of tones of the channel excluding tones within a punctured subchannel of a plurality of subchannels of the channel, the modulation being based on a size and a location of the punctured subchannel and a symbol duration associated with transmission of the LTF sequence.

At step 2204, the wireless device may obtain and/or generate channel state information (CSI) for the channel in response to receiving the NDP with a feedback request for at least a portion of the channel bandwidth, the feedback request covering at least part of an 80 MHz bandwidth channel or at least part of an 80 MHz bandwidth portion of a 160 MHz bandwidth channel or a 320 MHz bandwidth channel, the CSI including one feedback tone for every n grouped tones of the plurality of tones of the channel, where n=4 or 16, and the CSI is modulated in an indexed range of feedback tones within a 242-tone resource unit (RU) or a 996-tone resource unit (RU).

At step 2206, the wireless device may also receive, from the first wireless device, a null data packet announcement (NDPA) over the channel, the NDPA including a partial bandwidth information subfield that includes an 8-bit subfield for identifying a 242-tone resource unit (RU) start index and an end index, the partial bandwidth information subfield identifying an indexed range of feedback tones for the channel state information (CSI).

At step 2208, the wireless device may transmit the CSI to the first wireless device.

The LTF sequence may be modulated onto the plurality of tones based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz.

Figure 16:
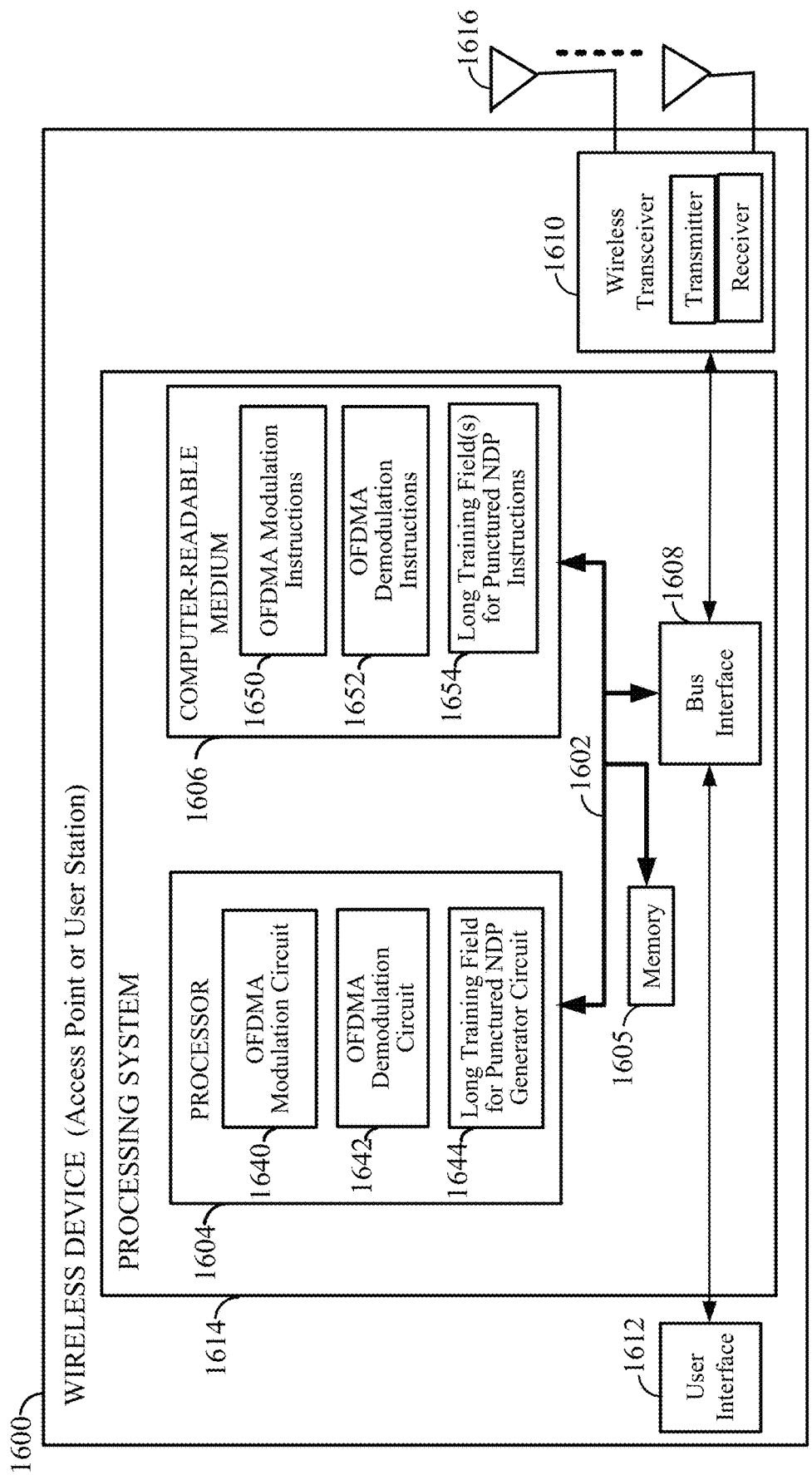
FIG. 16 is a block diagram illustrating an example of a wireless device adapted to facilitate communications of punctured null data packets and partial bandwidth feedback using an 80 MHz channel bandwidth.

FIG. 16 is a block diagram illustrating an example of a wireless device adapted to facilitate communications of punctured null data packets and partial bandwidth feedback using a channel greater than 80 MHz bandwidth. The wireless device 1600 may be, for example, an access point or a user station, and may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the AP 1600 may be configured to perform any one or more of the functions described herein. That is, the processor 1604, as utilized in the AP 1600, may be used to implement any one or more of the processes, procedures, and tables further illustrated in the flow diagram of FIGS. 6, 7, 8, 9, 10, 11, 12, 13, 14, 15, 17, 18, 19, 20 and 21.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a wireless transceiver 1610 (comprising a transmitter and a receiver). The wireless transceiver 1610 provides a communication interface or means for communicating with various other apparatus over a transmission medium. For instance, the wireless transceiver 1610 may transmit and receive to and from one or more wireless device using one or more antennas 1616 and in accordance with an IEEE 802.11 protocol, such as IEEE 802.11be. In one implantation, the wireless transceiver 1614 may operate according to a multiple input multiple output (MIMO) mode.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

In one or more examples, the processor 1604 may include an OFDMA modulation circuit 1640, an OFDMA demodulation circuit 1642, and a Long Training Field for Punctured Null Data Packet (NDP) Generator circuit 1644. In one example, the Long Training Field Generator circuit 1644 may serve to obtain an EHT-LTF sequence for a 320 MHz bandwidth channel. The OFDMA modulation circuit 1640 may serve to modulate the EHT-LTF sequence and a data field into an OFDM signal for transmission. The OFDMA demodulation circuit 1642 may serve to demodulate a received OFDM signal.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. The computer-readable medium 1606 may be a non-transitory computer-readable medium. A non-transitory computer-readable medium includes, by way of example, a magnetic storage device (such as, hard disk, floppy disk, magnetic strip), an optical disk (such as, a compact disc (CD) or a digital versatile disc (DVD)), a smart card, a flash memory device (such as, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1606 may include OFDMA modulation instructions 1650, OFDMA demodulation instructions 1652, or Long Training Fields for Punctured NDP instructions 1654. Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the processes or algorithms described herein.

In one mode of operation, it is contemplated that the wireless device 1600 generates and transmits the punctured NDP with an LTF sequence and receives channel feedback information. In another mode of operation, the wireless device 1600 may receive the punctured NDP with an LTF sequence and then estimates and transmits channel state information based on the received LTF.

Aspect 1: A method for wireless communication by a wireless communication device, comprising: obtaining a long training field (LTF) sequence for a null data packet (NDP) for transmission over a channel having a bandwidth that is an integer multiple of 80 MHz; modulating the LTF sequence onto a plurality of tones of the channel excluding tones within a punctured subchannel of a plurality of sub-channels of the channel, the modulation being based on a size and a location of the punctured subchannel and a symbol duration associated with transmitting the LTF sequence; and transmitting the NDP including the LTF sequence to a second wireless communication device via the channel Aspect 2: The method of aspect 1, further comprising: generating a null data packet announcement (NDPA) for transmission over the channel, the NDPA including a partial bandwidth information subfield that includes an 8-bit subfield for identifying a 242-tone resource unit (RU) start index and an end index, the partial bandwidth information subfield identifying an indexed range of feedback tones for channel state information (CSI); and transmitting the NDPA to the second wireless communication device via the channel.

Aspect 3: The method of any one of aspects 1 or 2, wherein the modulation of the LTF sequence onto the plurality of tones is based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz.

Aspect 4: The method of any one of aspects 1, 2, or 3, wherein the symbol duration associated with the LTF sequence is one of: 12.8 µs plus a guard interval, 6.4 µs plus the guard interval, or 3.2 µs plus the guard interval, and wherein the guard interval is one of 0.8 µs, 1.6 µs, or 3.2 µs.

Aspect 5: The method of any one of aspects 1, 2, 3, or 4, wherein the symbol duration associated with the LTF sequence is 12.8 µs plus the guard interval, and wherein the LTF sequence is modulated onto each tone within a plurality of tone ranges of the OFDMA data tone plan, and the channel includes an 80 MHz bandwidth portion that includes the punctured subchannel; the punctured subchannel has a 20 MHz bandwidth within the 80 MHz bandwidth portion; the 80 MHz bandwidth portion comprises 1001 tones; and the plurality of tone ranges include: tones [−253:−12, 12:253, 259:500] based on the punctured subchannel being a first 20 MHz subchannel; tones [−500:−259, 12:253, 259:500] based on the punctured subchannel being a second 20 MHz subchannel adjacent the first 20 MHz subchannel; tones [−500:−259, −253:−12, 259:500] based on the punctured subchannel being a third 20 MHz subchannel adjacent the second 20 MHz subchannel; or tones [−500:−259, −253:−12, 12:253] based on the punctured subchannel being a fourth 20 MHz subchannel adjacent the third 20 MHz subchannel.

Aspect 6: The method of any one of aspects 1, 2, 3, or 4, wherein the symbol duration associated with the LTF sequence is 12.8 µs plus the guard interval, and wherein the LTF sequence is modulated onto each tone within a plurality of tone ranges of the OFDMA data tone plan, the channel includes an 80 MHz bandwidth portion that includes the punctured subchannel; the punctured subchannel has a 40 MHz bandwidth within the 80 MHz bandwidth portion; the 80 MHz bandwidth portion comprises 1001 tones; and the plurality of tone ranges include: tones [12:253, 259:500] based on the punctured subchannel being a first 40 MHz subchannel; or tones [−500:−259, −253:42] based on the punctured subchannel being a second 40 MHz subchannel adjacent the first 40 MHz subchannel Aspect 7: The method of any one of aspects 1, 2, 3, or 4, wherein the symbol duration associated with the LTF sequence is 6.4 µs plus the guard interval, and the LTF sequence is modulated onto every other tone within a plurality of tones ranges of the OFDMA data tone plan, and the channel includes an 80 MHz bandwidth portion that includes the punctured subchannel; the punctured subchannel has a 20 MHz bandwidth within the 80 MHz bandwidth portion; the 80 MHz bandwidth portion comprises 1001 tones; and the plurality of tone ranges include: tones [−252: 2:−12, 12:2:252, 260:2:500] based on the punctured subchannel being a first 20 MHz subchannel; tones [−500:2:−260, 12:2:252, 260:2:500] based on the punctured subchannel being a second 20 MHz subchannel adjacent the first 20 MHz subchannel; tones [−500:2:−260, −252:2:−12, 260:2:500] based on the punctured subchannel being a third 20 MHz subchannel adjacent the second 20 MHz subchannel; or tones [−500:2:−260, −252:2:−12, 12:2:252] based on the punctured subchannel being a fourth 20 MHz subchannel adjacent the third 20 MHz subchannel Aspect 8: The method of any one of aspects 1, 2, 3, or 4, wherein the symbol duration associated with the LTF sequence is 6.4 µs plus the guard interval, and the LTF sequence is modulated onto every other tone within a plurality of tones ranges of the OFDMA data tone plan, and the channel includes an 80 MHz bandwidth portion that includes the punctured subchannel; the punctured subchannel has a 40 MHz bandwidth within the 80 MHz bandwidth portion; the 80 MHz bandwidth portion comprises 1001 tones; and the plurality of tone ranges include: tones [12:2: 252, 260:2:500] based on the punctured subchannel being a first 40 MHz subchannel; or tones [−500:2:−260, −252:2:−12] based on the punctured subchannel being a second 40 MHz subchannel adjacent the first 40 MHz subchannel.

Aspect 9: The method of any one of aspects 1, 2, 3, or 4, wherein the symbol duration associated with the LTF sequence is 3.2 µs plus a guard interval, and the LTF sequence is modulated onto every fourth tone within a plurality of tones ranges of the OFDMA data tone plan is, and the channel includes an 80 MHz bandwidth portion that includes the punctured subchannel; the punctured subchannel has a 20 MHz bandwidth within the 80 MHz bandwidth portion; the 80 MHz bandwidth portion comprises 1001 tones; and the plurality of tone ranges include: tones [−252: 4:−12, 12:4:252, 260:4:500] based on the punctured subchannel being a first 20 MHz subchannel; tones [−500:4:−260, 12:4:252, 260:4:500] based on the punctured subchannel being a second 20 MHz subchannel adjacent the first 20 MHz subchannel; tones [−500:4:−260, −252:4:−12, 260:4:500] based on the punctured subchannel being a third 20 MHz subchannel adjacent the second 20 MHz subchannel; or tones [−500:4:−260, −252:4:−12, 12:4:252] based on the punctured subchannel being a fourth 20 MHz subchannel adjacent the third 20 MHz subchannel Aspect 10: The method of any one of aspects 1, 2, 3, or 4, wherein the symbol duration associated with the LTF sequence is 3.2 µs plus a guard interval, and the LTF sequence is modulated onto every fourth tone within a plurality of tones ranges of the OFDMA data tone plan is, and the channel includes an 80 MHz bandwidth portion that includes the punctured subchannel; the punctured subchannel has a 40 MHz bandwidth within the 80 MHz bandwidth portion; the 80 MHz bandwidth portion comprises 1001 tones; and the plurality of tone ranges include: tones [12:4: 252, 260:4:500] based on the punctured subchannel being a first 40 MHz subchannel; or tones [−500:4:−260, −252:4:−12] based on the punctured subchannel being a second 40 MHz subchannel adjacent the first 20 MHz subchannel.

Aspect 11: The method of any one of aspects 1, 2, or 3, further comprising: receiving channel state information (CSI) for the channel in response to transmitting the NDP with a partial feedback request, the partial feedback request covering less than an 80 MHz bandwidth channel or less than an 80 MHz bandwidth portion of a 160 MHz bandwidth channel or a 320 MHz bandwidth channel, the CSI including one feedback tone for every n grouped tones of the plurality of tones of the channel where n=4 or 16, and wherein the CSI is received in an indexed range of feedback tones within a 242-tone resource unit (RU).

Aspect 12: The method of aspect 11, wherein for the 242-tone RU of n=4 or n=16 feedback tone spacing, the feedback start/end tone indices for the 80 MHz bandwidth channel include the start/end tone indices: (a) indexed tones [−500, −260] that provide feedback for a first 20 MHz subchannel of the 80 MHz bandwidth channel, (b) indexed tones [252, −12] that provide feedback for a second 20 MHz subchannel of the 80 MHz bandwidth channel, (c) indexed tones [12, 252] that provide feedback for a third 20 MHz subchannel of the 80 MHz bandwidth channel, and (d) indexed tones [260, 500] that provide feedback for a fourth 20 MHz subchannel of the 80 MHz bandwidth channel.

Aspect 13: The method of aspect 11, wherein for the 242-tone RU of n=4 or n=16 feedback tone spacing, the feedback start/end tone indices for the 80 MHz bandwidth portion of the 160 MHz bandwidth channel include the start/end tone indices: [−1012, −772] for a 1st indexed RU, [−764, −524] for a 2nd indexed RU, [−500, −260] for a 3rd indexed RU, [−252, −12] for a 4th indexed RU, [12, 252] for a 5th indexed RU, [260, 500] for a 6th indexed RU, [524, 764] for a 7th indexed RU, and [772, 1012] for an 8th indexed RU.

Aspect 14: The method of aspect 11, wherein for the 242-tone RU of n=4 or n=16 feedback tone spacing, the feedback start/end tone indices for the 80 MHz bandwidth portion of the 320 MHz bandwidth channel includes the start/end tone indices: [−2036, −1796] for a 1st indexed RU, [−1788, −1548] for a 2nd indexed RU, [−1524, −1284] for a 3rd indexed RU, [−1276, −1036] for a 4th indexed RU, [−1012, −772] for a 5th indexed RU, [−764, −524] for a 6th indexed RU, [−500, −260] for a 7th indexed RU, [−252, −12] for an 8th indexed RU, [12, 252] for an 9th indexed RU, [260, 500] for a 10th indexed RU, [524, 764] for a 11th indexed RU, [772, 1012] for a 12th indexed RU, [1036, 1276] for a 13th indexed RU, [1284, 1524] for a 14th indexed RU, [1548, 1788] for a 15th indexed RU, and [1796, 2036] for a 16th indexed RU.

Aspect 15: The method of aspect 1, further comprising: receiving channel state information (CSI) for the channel in response to the transmitting the NDP with a feedback request for the entire channel bandwidth, the feedback request covering an entire 80 MHz bandwidth channel or an entire 80 MHz bandwidth portion of a 160 MHz bandwidth channel or a 320 MHz bandwidth channel, the CSI including one feedback tone for every n grouped tones of the plurality of tones of the channel, where n=4 or 16, and the CSI is received in an indexed range of feedback tones within a 996-tone resource unit (RU).

Aspect 16: The method of anyone of aspects 1 or 15, wherein a feedback tone set for the entire 80 MHz bandwidth channel within the 996-tone RU for n=4 feedback tone spacing is defined as [−500:4:−4, 4:4:500], spanning a region of 1001 tones [−500 to +500], every 4 tones, and with a DC tone region between (−4,4).

Aspect 17: The method of anyone of aspects 1 or 15, wherein a feedback tone set for the entire 160 MHz bandwidth channel within the 996-tone RU for n=4 feedback tone spacing is indicated by feedback start and end tone indices tables for each 996-tone RU that include: (a) indexed tones [−1012:4:−516, −508:4:−12] that provide feedback for a first 80 MHz subchannel of the 160 MHz bandwidth channel, and (b) indexed tones [12:4:508, 516:4:1012] that provide feedback for a second 80 MHz subchannel of the 160 MHz bandwidth channel.

Aspect 18: The method anyone of aspects 1 or 15, wherein a feedback tone set for the entire 320 MHz bandwidth channel within the 996-tone RU for n=4 feedback tone spacing is indicated by feedback start and end tone indices tables for each 996-tone RU that include: (a) indexed tones [−2036:4:−1540,−1532:4:−1036] that provide feedback for a first 80 MHz subchannel of the 320 MHz bandwidth channel, (b) indexed tones [−1012:4:−516, −508:4:−12] that provide feedback for a second 80 MHz subchannel of the 320 MHz bandwidth channel, (c) indexed tones [12:4:508, 516:4:1012] that provide feedback for a first 80 MHz subchannel of the 320 MHz bandwidth channel, and (d) indexed tones[1036:4:1532, 1540:4:2036] that provide feedback for a second 80 MHz subchannel of the 320 MHz bandwidth channel.

Aspect 19: The method of anyone of aspects 1 or 15, wherein a feedback tone set for the entire 80 MHz bandwidth channel within the 996-tone RU for n=16 feedback tone spacing is indicated by feedback start and end tone indices tables for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4).

Aspect 20: The method of anyone of aspects 1 or 15, wherein a feedback tone set for the entire 160 MHz bandwidth channel within the 996-tone RU for n=16 feedback tone spacing is indicated by feedback start and end tone indices tables for each 996-tone RU that include: (a) indexed tones [−1012:16:−772, −764:16:−524, −516, −508, −500:16:−260, −252:16:42] that provide feedback for a first 80 MHz subchannel of the 160 MHz bandwidth channel, and (b) indexed tones [12:16:252, 260:16:500, 508, 516, 524:16:764, 772:16:1012] that provide feedback for a second 80 MHz subchannel of the 160 MHz bandwidth channel Aspect 21: The method of anyone of aspects 1 or 15, wherein a feedback tone set for the entire 320 MHz bandwidth channel within the 996-tone RU for n=16 feedback tone spacing is indicated by feedback start and end tone indices tables for each 996-tone RU that include: (a) indexed tones [−2036:16:4796, −1788:16:−1548, −1540, −1532, −1524:16:−1284, −1276:16:1036] that provide feedback for a first 80 MHz subchannel of the 320 MHz bandwidth channel, (b) indexed tones [−1012:16:−772, −764:16:−524, −516, −508, −500:16:−260, −252:16:−12] that provide feedback for a second 80 MHz subchannel of the 320 MHz bandwidth channel, (c) indexed tones [12:16:252, 260:Ng=16:500, 508, 516, 524:16:764, 772:16:1012] that provide feedback for a first 80 MHz subchannel of the 320 MHz bandwidth channel, and (d) indexed tones [1036:16:1276, 1284:16:1524, 1532, 1540, 1548:16:1788, 1796:16:2036] that provide feedback for a second 80 MHz subchannel of the 320 MHz bandwidth channel.

Aspect 22: A wireless communication device, comprising: at least one processor; and at least one memory communicatively coupled with the at least one processor and storing processor-readable code that, when executed by the at least one processor, is configured to: obtain a long training field (LTF) sequence for a null data packet (NDP) for transmission over a channel having a bandwidth that is an integer multiple of 80 MHz; modulate the LTF sequence onto a plurality of tones of the channel excluding tones within a punctured subchannel of a plurality of subchannels of the channel, the modulation being based on a size and a location of the punctured subchannel and a symbol duration associated with transmitting the LTF sequence; and transmit the NDP including the LTF sequence to a second wireless communication device via the channel Aspect 23: The wireless communication device of aspect 22, wherein the at least one processor further configured to: generate a null data packet announcement (NDPA) for transmission over the channel, the NDPA including a partial bandwidth information subfield that includes an 8-bit subfield for identifying a 242-tone resource unit (RU) start index and an end index, the partial bandwidth information subfield identifying an indexed range of feedback tones for channel state information (CSI); and transmit the NDPA to the second wireless communication device via the channel.

Aspect 24: The wireless communication device of anyone of aspects 22 or 23, wherein the modulation of the LTF sequence onto the plurality of tones is based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz.

Aspect 25: A method for wireless communication by a wireless communication device, comprising: receiving, from a first wireless device, a null data packet (NDP) over a channel having a bandwidth that is an integer multiple of 80 MHz, the NDP including a long training field (LTF) that is modulated onto a plurality of tones of the channel excluding tones within a punctured subchannel of a plurality of subchannels of the channel, the modulation being based on a size and a location of the punctured subchannel and a symbol duration associated with transmission of the LTF sequence; generating channel state information (CSI) for the channel in response to receiving the NDP with a feedback request for at least a portion of the channel bandwidth, the feedback request covering at least part of an 80 MHz bandwidth channel or at least part of an 80 MHz bandwidth portion of a 160 MHz bandwidth channel or a 320 MHz bandwidth channel, the CSI including one feedback tone for every n grouped tones of the plurality of tones of the channel, where n=4 or 16, and the CSI is modulated in an indexed range of feedback tones within a 242-tone resource unit (RU) or a 996-tone resource unit (RU); and transmitting the CSI to the first wireless device.

Aspect 26: The method of aspect 25, further comprising: receiving, from the first wireless device, a null data packet announcement (NDPA) over the channel, the NDPA including a partial bandwidth information subfield that includes an 8-bit subfield for identifying a 242-tone resource unit (RU) start index and an end index, the partial bandwidth information subfield identifying an indexed range of feedback tones for the channel state information (CSI).

Aspect 27: The method of anyone of aspects 25 or 26, wherein the LTF sequence is modulated onto the plurality of tones based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz.

Aspect 28: The method of anyone of aspects 25, 26, or 27, wherein the feedback request is a partial feedback request for less than the 80 MHz bandwidth channel or less than the 80 MHz bandwidth portion of the 160 MHz bandwidth channel or the 320 MHz bandwidth channel, the CSI including one feedback tone for every n grouped tones of the plurality of tones of the channel where n=4 or 16, and wherein the CSI is modulated in an indexed range of feedback tones within the 242-tone resource unit (RU).

Aspect 29: The method of anyone of aspects 25, 26, 27, or 28, wherein for the 242-tone RU of n=4 or n=16 feedback tone spacing, the feedback start/end tone indices for the 80 MHz bandwidth channel include the start/end tone indices: (a) indexed tones [−500, −260] that provide feedback for a first 20 MHz subchannel of the 80 MHz bandwidth channel, (b) indexed tones [252, −12] that provide feedback for a second 20 MHz subchannel of the 80 MHz bandwidth channel, (c) indexed tones [12, 252] that provide feedback for a third 20 MHz subchannel of the 80 MHz bandwidth channel, and (d) indexed tones [260, 500] that provide feedback for a fourth 20 MHz subchannel of the 80 MHz bandwidth channel.

Aspect 30: The method of anyone of aspects 25, 26, 27, or 28, wherein for the 242-tone RU of n=4 or n=16 feedback tone spacing, the feedback start/end tone indices for the 80 MHz bandwidth portion of the 160 MHz bandwidth channel include the start/end tone indices: [−1012, −772] for a 1st indexed RU, [−764, −524] for a 2nd indexed RU, [−500, −260] for a 3rd indexed RU, [−252, −12] for a 4th indexed RU, [12,252] for a 5th indexed RU, [260, 500] for a 6th indexed RU, [524, 764] for a 7th indexed RU, and [772, 1012] for an 8th indexed RU.

Aspect 31: The method of anyone of aspects 25, 26, 27, or 28, wherein for the 242-tone RU of n=4 or n=16 feedback tone spacing, the feedback start/end tone indices for the 80 MHz bandwidth portion of the 320 MHz bandwidth channel includes the start/end tone indices: [−2036, −1796] for a 1st indexed RU, [−1788, −1548] for a 2nd indexed RU, [−1524, −1284] for a 3rd indexed RU, [−1276, −1036] for a 4th indexed RU, [−1012, −772] for a 5th indexed RU, [−764, −524] for a 6th indexed RU, [−500, −260] for a 7th indexed RU, [−252, −12] for an 8th indexed RU, [12, 252] for an 9th indexed RU, [260, 500] for a 10th indexed RU, [524, 764] for a 11th indexed RU, [772, 1012] for a 12th indexed RU, [1036, 1276] for a 13th indexed RU, [1284, 1524] for a 14th indexed RU, [1548, 1788] for a 15th indexed RU, and [1796, 2036] for a 16th indexed RU.

Aspect 32: The method of anyone of aspects 25, 26, or 27, wherein the feedback request is an entire feedback request covering the entire 80 MHz bandwidth channel or the entire 80 MHz bandwidth portion of the 160 MHz bandwidth channel or the 320 MHz bandwidth channel, the CSI including one feedback tone for every n grouped tones of the plurality of tones of the channel where n=4 or 16, and wherein the CSI is modulated in an indexed range of feedback tones within the 996-tone resource unit (RU).

Aspect 33: The method of anyone of aspects 25, 26, 27, or 32, wherein a feedback tone set for the entire 80 MHz bandwidth channel within the 996-tone RU for n=4 feedback tone spacing is defined as [−500:4:−4, 4:4:500], spanning a region of 1001 tones [−500 to +500], every 4 tones, and with a DC tone region between (−4, 4).

Aspect 34: The method of anyone of aspects 25, 26, 27, or 32, wherein a feedback tone set for the entire 160 MHz bandwidth channel within the 996-tone RU for n=4 feedback tone spacing is indicated by feedback start and end tone indices tables for each 996-tone RU that include: (a) indexed tones [−1012:4:−516, −508:4:42] that provide feedback for a first 80 MHz subchannel of the 160 MHz bandwidth channel, and (b) indexed tones [12:4:508, 516:4:1012] that provide feedback for a second 80 MHz subchannel of the 160 MHz bandwidth channel.

Aspect 35: The method of anyone of aspects 25, 26, 27, or 32, wherein a feedback tone set for the entire 320 MHz bandwidth channel within the 996-tone RU for n=4 feedback tone spacing is indicated by feedback start and end tone indices tables for each 996-tone RU that include: (a) indexed tones [−2036:4:4540,−1532:4:4036] that provide feedback for a first 80 MHz subchannel of the 320 MHz bandwidth channel, (b) indexed tones [−1012:4:−516, −508:4:42] that provide feedback for a second 80 MHz subchannel of the 320 MHz bandwidth channel, (c) indexed tones [12:4:508, 516:4:1012] that provide feedback for a first 80 MHz subchannel of the 320 MHz bandwidth channel, and (d) indexed tones[1036:4:1532, 1540:4:2036] that provide feedback for a second 80 MHz subchannel of the 320 MHz bandwidth channel.

Aspect 36: The method of anyone of aspects 25, 26, 27, or 32, wherein a feedback tone set for the entire 80 MHz bandwidth channel within the 996-tone RU for n=16 feedback tone spacing is indicated by feedback start and end tone indices tables for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4).

Aspect 37: The method of anyone of aspects 25, 26, 27, or 32, wherein a feedback tone set for the entire 160 MHz bandwidth channel within the 996-tone RU for n=16 feedback tone spacing is indicated by feedback start and end tone indices tables for each 996-tone RU that include: (a) indexed tones [−1012:16:−772, −764:16:−524, −516, −508, −500: 16:−260, −252:16:42] that provide feedback for a first 80 MHz subchannel of the 160 MHz bandwidth channel, and (b) indexed tones [12:16:252, 260:16:500, 508, 516, 524: 16:764, 772:16:1012] that provide feedback for a second 80 MHz subchannel of the 160 MHz bandwidth channel.

Aspect 38: The method of anyone of aspects 25, 26, or 27, wherein a feedback tone set for the entire 320 MHz bandwidth channel within the 996-tone RU for n=16 feedback tone spacing is indicated by feedback start and end tone indices tables for each 996-tone RU that include: (a) indexed tones [−2036:16:−1796, −1788:16:−1548, −1540, −1532, −1524:16:−1284, −1276:16:1036] that provide feedback for a first 80 MHz subchannel of the 320 MHz bandwidth channel, (b) indexed tones [−1012:16:−772, −764:16:−524, −516, −508, −500:16:−260, −252:16:42] that provide feedback for a second 80 MHz subchannel of the 320 MHz bandwidth channel, (c) indexed tones [12:16:252, 260: Ng=16:500, 508, 516, 524:16:764, 772:16:1012] that provide feedback for a first 80 MHz subchannel of the 320 MHz bandwidth channel, and (d) indexed tones [1036:16:1276, 1284:16:1524, 1532, 1540, 1548:16:1788, 1796:16:2036] that provide feedback for a second 80 MHz subchannel of the 320 MHz bandwidth channel.

Aspect 39: A wireless communication device, comprising: at least one processor; and at least one memory communicatively coupled with the at least one processor and storing processor-readable code that, when executed by the at least one processor, is configured to: receive, from a first wireless device, a null data packet (NDP) over a channel having a bandwidth that is an integer multiple of 80 MHz, the NDP including a long training field (LTF) that is modulated onto a plurality of tones of the channel excluding tones within a punctured subchannel of a plurality of subchannels of the channel, the modulation being based on a size and a location of the punctured subchannel and a symbol duration associated with transmission of the LTF sequence; generate channel state information (CSI) for the channel in response to receiving the NDP with a feedback request for at least a portion of the channel bandwidth, the feedback request covering at least part of an 80 MHz bandwidth channel or at least part of an 80 MHz bandwidth portion of a 160 MHz bandwidth channel or a 320 MHz bandwidth channel, the CSI including one feedback tone for every n grouped tones of the plurality of tones of the channel, where n=4 or 16, and the CSI is modulated in an indexed range of feedback tones within a 242-tone resource unit (RU) or a 996-tone resource unit (RU); and transmit the CSI to the first wireless device.

Aspect 40: The wireless communication device of aspect 39, wherein the at least one processor is further configured to: receiving, from the first wireless device, a null data packet announcement (NDPA) over the channel, the NDPA including a partial bandwidth information subfield that includes an 8-bit subfield for identifying a 242-tone resource unit (RU) start index and an end index, the partial bandwidth information subfield identifying an indexed range of feedback tones for the channel state information (CSI).

Aspect 41: The wireless communication device of anyone of aspects 39 or 40, wherein the LTF sequence is modulated onto the plurality of tones based on an orthogonal frequency division multiple access (OFDMA) data tone plan for an 80 MHz bandwidth channel or an OFDMA data tone plan for each 80 MHz segment of a channel having a bandwidth that is an integer multiple of 80 MHz.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
  modulating a long training field (LTF) sequence for a null data packet (NDP) onto a plurality of tones of a wireless channel that includes one or more 80 MHz bandwidth segments, the modulation excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmitting the LTF sequence, wherein:
    (a) the symbol duration associated with the LTF sequence is 12.8 μs plus a guard interval, the LTF sequence is modulated onto each tone within a plurality of tone ranges of the OFDMA data tone plan, the punctured subchannel has a 20 MHz bandwidth within the 80 MHz bandwidth segment, the 80 MHz bandwidth segment comprises 1001 tones, and the plurality of tone ranges include:
      tones [−253:42, 12:253, 259:500] based on the punctured subchannel being a first 20 MHz subchannel;
      tones [−500:−259, 12:253, 259:500] based on the punctured subchannel being a second 20 MHz subchannel adjacent the first 20 MHz subchannel;
      tones [−500:−259, −253:−12, 259:500] based on the punctured subchannel being a third 20 MHz subchannel adjacent the second 20 MHz subchannel; or
      tones [−500:−259, −253:−12, 12:253] based on the punctured subchannel being a fourth 20 MHz subchannel adjacent the third 20 MHz subchannel,
    (b) the symbol duration associated with the LTF sequence is 12.8 μs plus the guard interval, the LTF sequence is modulated onto each tone within a plurality of tone ranges of the OFDMA data tone plan, the punctured subchannel has a 40 MHz bandwidth within the 80 MHz bandwidth segment, the 80 MHz bandwidth segment comprises 1001 tones, and the plurality of tone ranges include:
      tones [12:253, 259:500] based on the punctured subchannel being a first 40 MHz subchannel; or tones [−500:−259, −253:−12] based on the punctured subchannel being a second 40 MHz subchannel adjacent the first 40 MHz subchannel,
   (c) the symbol duration associated with the LTF sequence is 6.4 µs plus the guard interval, the LTF sequence is modulated onto every other tone within a plurality of tones ranges of the OFDMA data tone plan, the punctured subchannel has a 20 MHz bandwidth within the 80 MHz bandwidth segment, the 80 MHz bandwidth segment comprises 1001 tones, and the plurality of tone ranges include:
      tones [−252:2:−12, 12:2:252, 260:2:500] based on the punctured subchannel being a first 20 MHz subchannel;
      tones [−500:2:−260, 12:2:252, 260:2:500] based on the punctured subchannel being a second 20 MHz subchannel adjacent the first 20 MHz subchannel;
      tones [−500:2:−260, −252:2:−12, 260:2:500] based on the punctured subchannel being a third 20 MHz subchannel adjacent the second 20 MHz subchannel; or
      tones [−500:2:−260, −252:2:−12, 12:2:252] based on the punctured subchannel being a fourth 20 MHz subchannel adjacent the third 20 MHz subchannel, or
   (d) the symbol duration associated with the LTF sequence is 6.4 µs plus the guard interval, the LTF sequence is modulated onto every other tone within a plurality of tones ranges of the OFDMA data tone plan, the punctured subchannel has a 40 MHz bandwidth within the 80 MHz bandwidth segment, the 80 MHz bandwidth segment comprises 1001 tones, and the plurality of tone ranges include:
      tones [12:2:252, 260:2:500] based on the punctured subchannel being a first 40 MHz subchannel; or
      tones [−500:2:−260, −252:2:−12] based on the punctured subchannel being a second 40 MHz subchannel adjacent the first 40 MHz subchannel; and
   transmitting the NDP including the modulated LTF sequence to a second wireless communication device via the wireless channel.

2. The method of claim 1, wherein the guard interval is one of 0.8 µs, 1.6 us, or 3.2 µs.

3. A method for wireless communication by a wireless communication device, comprising:
   modulating a long training field (LTF) sequence for a null data packet (NDP) onto a plurality of tones of a wireless channel that includes one or more 80 MHz bandwidth segments, the modulation excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmitting the LTF sequence;
   transmitting the NDP including the modulated LTF sequence to a second wireless communication device via the wireless channel, the NDP including a feedback request; and
   receiving channel state information (CSI) for the wireless channel in response to transmitting the NDP,
   wherein the CSI for one or more 242-tone resource units (RUs) includes one feedback tone for every n grouped tones of the plurality of tones of the wireless channel, the CSI is included in an indexed range of feedback tones within a feedback 242-tone resource unit (RU) having n=4 or 16 feedback tone spacing, and for each feedback 242-tone RU further one of:
      (1) the wireless channel is a 80 MHz bandwidth channel and start/end tone indices for the indexed range of feedback tones include:
         [−500, −260] for a 1st indexed RU,
         [−252, −12] for a 2nd indexed RU,
         [12, 252] for a 3rd indexed RU, and
         [260, 500] for a 4th indexed RU,
      (2) the wireless channel is a 160 MHz bandwidth channel, and start/end tone indices for the indexed range of feedback tones include:
         [−1012, −772] for a 1st indexed RU,
         [−764, −524] for a 2nd indexed RU,
         [−500, −260] for a 3rd indexed RU,
         [−252, −12] for a 4th indexed RU,
         [12, 252] for a 5th indexed RU,
         [260, 500] for a 6th indexed RU,
         [524, 764] for a 7th indexed RU, and
         [772, 1012 ] for an 8th indexed RU, or
      (3) the wireless channel is a 320 MHz bandwidth channel and start/end tone indices for the indexed range of feedback tones include:
         [−2036, −1796] for a 1st indexed RU,
         [−1788, −1548] for a 2nd indexed RU,
         [−1524, −1284] for a 3rd indexed RU,
         [−1276, −1036] for a 4th indexed RU,
         [−1012, −772] for a 5th indexed RU,
         [−764, −524] for a 6th indexed RU,
         [−500, −260] for a 7th indexed RU,
         [−252, −12] for an 8th indexed RU,
         [12, 252] for an 9th indexed RU,
         [260, 500] for a 10th indexed RU,
         [524, 764] for a 11th indexed RU,
         [772, 1012] for a 12th indexed RU,
         [1036, 1276] for a 13th indexed RU,
         [1284, 1524] for a 14th indexed RU,
         [1548, 1788] for a 15th indexed RU, and
         [1796, 2036] for a 16th indexed RU.

4. A method for wireless communication by a wireless communication device, comprising:
   modulating a long training field (LTF) sequence for a null data packet (NDP) onto a plurality of tones of a wireless channel that includes one or more 80 MHz bandwidth segments, the modulation excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmitting the LTF sequence;
   transmitting the NDP including the modulated LTF sequence to a second wireless communication device via the wireless channel, the NDP including a feedback request; and
   receiving channel state information (CSI) for the wireless channel in response to transmitting the NDP, wherein the CSI includes one feedback tone for every n grouped tones of the plurality of tones of the wireless channel, the CSI for one or more 996-tone resource units (RUs) is included in an indexed range of feedback tones within a 996-tone resource unit (RU) having n=4 or 16 feedback tone spacing, and further one of:

(1) the wireless channel is an 80 MHz bandwidth channel, a feedback tone set for n=4 feedback tone spacing is defined as [−500:4:−4, 4:4:500], spanning a region of 1001 tones [−500 to +500], every 4 tones, and with a DC tone region between (−4, 4),
(2) the wireless channel is a 160 MHz bandwidth channel, a feedback tone set for n=4 feedback tone spacing is indicated by feedback start and end tone indices for each 996-tone RU that include:
  (i) indexed tones [−1012:4:−516, −508:4:−12] that provide feedback for a first 80 MHz subchannel of the 160 MHz bandwidth channel, and
  (ii) indexed tones [12:4:508, 516:4:1012] that provide feedback for a second 80 MHz subchannel of the 160 MHz bandwidth channel,
(3) the wireless channel is a 320 MHz bandwidth channel, a feedback tone set for n=4 feedback tone spacing is indicated by feedback start and end tone indices for each 996-tone RU that include:
  (i) indexed tones [−2036:4:−1540,−1532:4:−1036] that provide feedback for a first 80 MHz subchannel of the 320 MHz bandwidth channel,
  (ii) indexed tones [−1012:4:−516, −508:4:−12] that provide feedback for a second 80 MHz subchannel of the 320 MHz bandwidth channel,
  (iii) indexed tones [12:4:508, 516:4:1012] that provide feedback for a third 80 MHz subchannel of the 320 MHz bandwidth channel, and
  (iv) indexed tones [1036:4:1532, 1540:4:2036] that provide feedback for a fourth 80 MHz subchannel of the 320 MHz bandwidth channel,
(4) the wireless channel is a 80 MHz bandwidth channel, a feedback tone set for n=16 feedback tone spacing is indicated by feedback start and end tone indices for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4),
(5) the wireless channel is a 160 MHz bandwidth channel, a feedback tone set for n=16 feedback tone spacing is indicated by feedback start and end tone indices for each 996-tone RU that include:
  (i) indexed tones [−1012:16:−772, −764:16:−524, −516, −508, −500:16:−260, −252:16:−12] that provide feedback for a first 80 MHz subchannel of the 160 MHz bandwidth channel, and
  (ii) indexed tones [12:16:252, 260:16:500, 508, 516, 524:16:764, 772:16:1012] that provide feedback for a second 80 MHz subchannel of the 160 MHz bandwidth channel, or
(6) the wireless channel is a 320 MHz bandwidth channel, a feedback tone set for n=16 feedback tone spacing is indicated by feedback start and end tone indices for each 996-tone RU that include:
  (i) indexed tones [−2036:16:−1796, −1788:16:−1548, −1540, −1532, −1524:16:−1284, −1276:16:−1036] that provide feedback for a first 80 MHz subchannel of the 320 MHz bandwidth channel,
  (ii) indexed tones [−1012:16:−772, −764:16:−524, −516, −508, −500:16:−260, −252:16:42] that provide feedback for a second 80 MHz subchannel of the 320 MHz bandwidth channel,
  (iii) indexed tones [12:16:252, 260:16:500, 508, 516, 524:16:764, 772:16:1012] that provide feedback for a third 80 MHz subchannel of the 320 MHz bandwidth channel, and
  (iv) indexed tones [1036:16:1276, 1284:16:1524, 1532, 1540, 1548:16:1788, 1796:16:2036] that provide feedback for a fourth 80 MHz subchannel of the 320 MHz bandwidth channel.

5. A wireless communication device, comprising:
at least one processor; and
at least one memory communicatively coupled with the at least one processor and storing processor-readable code that, when executed by the at least one processor, is configured to:
modulate a long training field (LTF) sequence for a null data packet (NDP) onto a plurality of tones of a wireless channel that includes one or more 80 MHz bandwidth segments, the modulation excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmitting the LTF sequence, wherein:
  (a) the symbol duration associated with the LTF sequence is 12.8 µs plus the guard interval, the LTF sequence is modulated onto each tone within a plurality of tone ranges of the OFDMA data tone plan, the punctured subchannel has a 20 MHz bandwidth within the 80 MHz bandwidth segment, the 80 MHz bandwidth segment comprises 1001 tones, and the plurality of tone ranges include:
    (i) tones [−253:42, 12:253, 259:500] based on the punctured subchannel being a first 20 MHz subchannel;
    (ii) tones [−500:−259, 12:253, 259:500] based on the punctured subchannel being a second 20 MHz subchannel adjacent the first 20 MHz subchannel;
    (iii) tones [−500:−259, −253:−12, 259:500] based on the punctured subchannel being a third 20 MHz subchannel adjacent the second 20 MHz subchannel; or
    (iv) tones [−500:−259, −253:−12, 12:253] based on the punctured subchannel being a fourth 20 MHz subchannel adjacent the third 20 MHz subchannel,
  (b) the symbol duration associated with the LTF sequence is 12.8 µs plus the guard interval, the LTF sequence is modulated onto each tone within a plurality of tone ranges of the OFDMA data tone plan, the punctured subchannel has a 40 MHz bandwidth within the 80 MHz bandwidth segment, the 80 MHz bandwidth segment comprises 1001 tones, and the plurality of tone ranges include:
    (i) tones [12:253, 259:500] based on the punctured subchannel being a first 40 MHz subchannel; or
    (ii) tones [−500:−259, −253:−12] based on the punctured subchannel being a second 40 MHz subchannel adjacent the first 40 MHz subchannel,
  (c) the symbol duration associated with the LTF sequence is 6.4 µs plus the guard interval, the LTF sequence is modulated onto every other tone within a plurality of tones ranges of the OFDMA data tone plan, the punctured subchannel has a 20 MHz bandwidth within the 80 MHz bandwidth segment, the 80

MHz bandwidth segment comprises 1001 tones, and the plurality of tone ranges include:
(i) tones [−252:2:−12, 12:2:252, 260:2:500] based on the punctured subchannel being a first 20 MHz subchannel;
(ii) tones [−500:2:−260, 12:2:252, 260:2:500] based on the punctured subchannel being a second 20 MHz subchannel adjacent the first 20 MHz subchannel;
(iii) tones [−500:2:−260, −252:2:−12, 260:2:500] based on the punctured subchannel being a third 20 MHz subchannel adjacent the second 20 MHz subchannel; or
(iv) tones [−500:2:−260, −252:2:−12, 12:2:252] based on the punctured subchannel being a fourth 20 MHz subchannel adjacent the third 20 MHz subchannel, or
(d) the symbol duration associated with the LTF sequence is 6.4 μs plus the guard interval, the LTF sequence is modulated onto every other tone within a plurality of tones ranges of the OFDMA data tone plan, the punctured subchannel has a 40 MHz bandwidth within the 80 MHz bandwidth segment, the 80 MHz bandwidth segment comprises 1001 tones, and the plurality of tone ranges include:
(i) tones [12:2:252, 260:2:500] based on the punctured subchannel being a first 40 MHz subchannel; or
(ii) tones [−500:2:−260, −252:2:−12] based on the punctured subchannel being a second 40 MHz subchannel adjacent the first 40 MHz subchannel; and transmit the NDP including the modulated LTF sequence to a second wireless communication device via the wireless channel.

6. A method for wireless communication by a wireless communication device, comprising:
receiving, from a first wireless device, a null data packet (NDP) over a wireless channel having a bandwidth that is an integer multiple of 80 MHz, the NDP including a long training field (LTF) that is modulated onto a plurality of tones of the wireless channel excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmission of the LTF sequence;
generating channel state information (CSI) for the wireless channel in response to receiving the NDP with a feedback request for at least a segment of the channel bandwidth, the feedback request covering at least part of an 80 MHz bandwidth channel or at least part of an 80 MHz bandwidth segment of a 160 MHz bandwidth channel or a 320 MHz bandwidth channel, the CSI includes one feedback tone for every n grouped tones of the plurality of tones of the channel, where n=4 or 16, and the CSI for one or more 242-tone resource units (RUs) is included in an indexed range of feedback tones within a 242-tone resource unit (RU) of n=4 or n=16 feedback tone spacing, and further one of:
(1) for the wireless channel being an 80 MHz bandwidth channel, start/end tone indices for the indexed range of feedback tones include:
[−500, −260] for a 1st indexed RU,
[−252, −12] for a 2nd indexed RU,
[12, 252] for a 3rd indexed RU, and
[260, 500] for a 4th indexed RU,
(2) for the wireless channel being a 160 MHz bandwidth channel, start/end tone indices for the indexed range of feedback tones include:
[−1012, −772] for a 1st indexed RU,
[−764, −524] for a 2nd indexed RU,
[−500, −260] for a 3rd indexed RU,
[−252, −12] for a 4th indexed RU,
[12, 252] for a 5th indexed RU,
[260, 500] for a 6th indexed RU,
[524, 764] for a 7th indexed RU, and
[772, 1012] for an 8th indexed RU, or
(3) for the wireless channel being a 320 MHz bandwidth channel, start/end tone indices for the indexed range of feedback tones include:
[−2036, −1796] for a 1st indexed RU,
[−1788, −1548] for a 2nd indexed RU,
[−1524, −1284] for a 3rd indexed RU,
[−1276, −1036] for a 4th indexed RU,
[−1012, −772] for a 5th indexed RU,
[−764, −524] for a 6th indexed RU,
[−500, −260] for a 7th indexed RU,
[−252, −12] for an 8th indexed RU,
[12, 252] for an 9th indexed RU,
[260, 500] for a 10th indexed RU,
[524, 764] for a 11th indexed RU,
[772, 1012] for a 12th indexed RU,
[1036, 1276] for a 13th indexed RU,
[1284, 1524] for a 14th indexed RU,
[1548, 1788] for a 15th indexed RU, and
[1796, 2036] for a 16th indexed RU; and
transmitting the CSI to the first wireless device.

7. A method for wireless communication by a wireless communication device, comprising:
receiving, from a first wireless device, a null data packet (NDP) over a wireless channel having a bandwidth that is an integer multiple of 80 MHz, the NDP including a long training field (LTF) that is modulated onto a plurality of tones of the wireless channel excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmission of the LTF sequence;
generating channel state information (CSI) for the wireless channel in response to receiving the NDP with a feedback request for at least a segment of the channel bandwidth, the feedback request covering at least part of an 80 MHz bandwidth channel or at least part of an 80 MHz bandwidth segment of a 160 MHz bandwidth channel or a 320 MHz bandwidth channel, the CSI includes one feedback tone for every n grouped tones of the plurality of tones of the channel, where n=4 or 16, and the CSI for one or more 996-tone resource units (RUs) is included in an indexed range of feedback tones within a feedback 996-tone resource unit (RU), and wherein for each feedback 996-tone RU:
(1) a feedback tone set for the 80 MHz bandwidth channel n=4 feedback tone spacing is defined as [−500:4:−4, 4:4:500], spanning a region of 1001 tones [−500 to +500], every 4 tones, and with a DC tone region between (−4, 4), (2) a feedback tone set for a 160 MHz bandwidth channel for n=4 feedback tone spacing is indicated by feedback start and end tone indices for each 996-tone RU that include:
  (i) indexed tones [−1012:4:−516, −508:4:−12] that provide feedback for a first 80 MHz subchannel of the 160 MHz bandwidth channel, and
  (ii) indexed tones [12:4:508, 516:4:1012] that provide feedback for a second 80 MHz subchannel of the 160 MHz bandwidth channel, (3) a feedback tone set for a 320 MHz bandwidth channel for n=4 feedback tone spacing is indicated by feedback start and end tone indices for each 996-tone RU that include:
  (i) indexed tones [−2036:4:−1540,−1532:4:−1036] that provide feedback for a first 80 MHz subchannel of the 320 MHz bandwidth channel,
  (ii) indexed tones [−1012:4:−516, −508:4:−12] that provide feedback for a second 80 MHz subchannel of the 320 MHz bandwidth channel,
  (iii) indexed tones [12:4:508, 516:4:1012] that provide feedback for a third 80 MHz subchannel of the 320 MHz bandwidth channel, and
  (iv) indexed tones [1036:4:1532, 1540:4:2036] that provide feedback for a fourth 80 MHz subchannel of the 320 MHz bandwidth channel, (4) a feedback tone set for the entire 80 MHz bandwidth channel for n=16 feedback tone spacing is indicated by feedback start and end tone indices for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4), (5) a feedback tone set for a 160 MHz bandwidth channel for n=16 feedback tone spacing is indicated by feedback start and end tone indices for each 996-tone RU that include:
  (i) indexed tones [−1012:16:−772, −764:16:−524, −516, −508, −500:16:−260, −252:16:−12] that provide feedback for a first 80 MHz subchannel of the 160 MHz bandwidth channel, and
  (ii) indexed tones [12:16:252, 260:16:500, 508, 516, 524:16:764, 772:16:1012] that provide feedback for a second 80 MHz subchannel of the 160 MHz bandwidth channel, (6) a feedback tone set for a 320 MHz bandwidth channel for n=16 feedback tone spacing is indicated by feedback start and end tone indices for each 996-tone RU that include:
  (i) indexed tones [−2036:16:−1796, −1788:16:−1548, −1540, −1532, −1524:16:−1284, −1276:16:−1036] that provide feedback for a first 80 MHz subchannel of the 320 MHz bandwidth channel,
  (ii) indexed tones [−1012:16:−772, −764:16:−524, −516, −508, −500:16:−260, −252:16:42] that provide feedback for a second 80 MHz subchannel of the 320 MHz bandwidth channel,
  (iii) indexed tones [12:16:252, 260:16:500, 508, 516, 524:16:764, 772:16:1012] that provide feedback for a third 80 MHz subchannel of the 320 MHz bandwidth channel, and
  (iv) indexed tones [1036:16:1276, 1284:16:1524, 1532, 1540, 1548:16:1788, 1796:16:2036] that provide feedback for a fourth 80 MHz subchannel of the 320 MHz bandwidth channel.

8. A wireless communication device, comprising:
at least one processor; and
at least one memory communicatively coupled with the at least one processor and storing processor-readable code that, when executed by the at least one processor, is configured to:
receive, from a first wireless device, a null data packet (NDP) over a wireless channel having a bandwidth that is an integer multiple of 80 MHz, the NDP including a long training field (LTF) that is modulated onto a plurality of tones of the channel excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmission of the LTF sequence, the NDP including a feedback request covering
at least part of an 80 MHz bandwidth channel or at least part of an 80 MHz bandwidth segment of a 160 MHz bandwidth channel or a 320 MHz bandwidth channel, the CSI includes one feedback tone for every n grouped tones of the plurality of tones of the channel, where n=4 or 16, and the CSI for one or more 996-tone resource units (RUs) is included in an indexed range of feedback tones within a feedback 242-tone resource unit (RU), and for each feedback 242-tone RU further one of:
  (1) for the wireless channel being an 80 MHz bandwidth channel, start/end tone indices for the indexed range of feedback tones include:
    [−500, −260] for a 1st indexed RU,
    [−252, −12] for a 2nd indexed RU,
    [12, 252] for a 3rd indexed RU, and
    [260, 500] for a 4th indexed RU,
  (2) for the wireless channel being an 80 MHz bandwidth segment of a 160 MHz bandwidth channel, start/end tone indices for the indexed range of feedback tones include:
    [−1012, −772] for a 1st indexed RU,
    [−764, −524] for a 2nd indexed RU,
    [−500, −260] for a 3rd indexed RU,
    [−252, −12] for a 4th indexed RU,
    [12, 252] for a 5th indexed RU,
    [260, 500] for a 6th indexed RU,
    [524, 764] for a 7th indexed RU, and
    [772, 1012] for an 8th indexed RU, or
  (3) for the wireless channel being a 160 MHz bandwidth segment of the 320 MHz bandwidth channel, start/end tone indices for the indexed range of feedback tones include:
    [−2036, −1796] for a 1st indexed RU,
    [−1788, −1548] for a 2nd indexed RU,
    [−1524, −1284] for a 3rd indexed RU,
    [−1276, −1036] for a 4th indexed RU,
    [−1012, −772] for a 5th indexed RU,
    [−764, −524] for a 6th indexed RU,
    [−500, −260] for a 7th indexed RU,
    [−252, −12] for an 8th indexed RU,
    [12, 252] for an 9th indexed RU,
    [260, 500] for a 10th indexed RU,
    [524, 764] for a 11th indexed RU,
    [772, 1012] for a 12th indexed RU,
    [1036, 1276] for a 13th indexed RU,

[1284, 1524] for a 14th indexed RU,
[1548, 1788] for a 15th indexed RU, and
[1796, 2036] for a 16th indexed RU; and
transmit the CSI to the first wireless device.

9. A method for wireless communication by a wireless communication device, comprising:
  modulating a long training field (LTF) sequence for a null data packet (NDP) onto a plurality of tones of a wireless channel that includes a plurality of 80 MHz bandwidth segments, the modulation excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmitting the LTF sequence;
  transmitting the NDP including the LTF sequence to a second wireless communication device via the wireless channel, the NDP including a feedback request covering:
    (a) one or more subchannels each having a bandwidth of less than 80 MHz within the wireless channel,
    (b) one or more subchannels each having a bandwidth of 80 MHz within the wireless channel, or
    (c) a combination of one or more bandwidth segments less than 80 MHz each and one or more bandwidth segments of 80 MHz each within a bandwidth channel; and
  receiving channel state information (CSI) for the wireless channel, the CSI includes one feedback tone for every n grouped tones of the plurality of tones of the channel where n=4 or 16, and wherein the CSI is included in an indexed range of feedback tones within one or more resource units (RUs),
  wherein relative indexed tones at +/−4, +/−8, and +/−256 for n=4, and feedback tones at +/−4 for n=16 in an 80 MHz bandwidth segment, are not sent for each of the one or more 80 MHz bandwidth segments if bandwidth segments of less than 80 MHz are requested in the feedback request, but are sent for each of the one or more 80 MHz bandwidth segments if entire bandwidth segments of 80 MHz are requested in the feedback request.

10. A method for wireless communication by a wireless communication device, comprising:
  receiving, from a first wireless device, a null data packet (NDP) over a wireless channel having a bandwidth that is an integer multiple of 80 MHz, the NDP including a long training field (LTF) that is modulated onto a plurality of tones of the wireless channel excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmission of the LTF sequence;
  generating channel state information (CSI) for the channel in response to receiving the NDP with a feedback request for at least a segment of the channel bandwidth, the feedback request covering at least part of an 80 MHz bandwidth channel or at least part of an 80 MHz bandwidth segment of a 160 MHz bandwidth channel or a 320 MHz bandwidth channel, the CSI includes one feedback tone for every n grouped tones of the plurality of tones of the channel, where n=4 or 16, and the CSI is included in an indexed range of feedback tones within a feedback 242-tone resource unit (RU) or a feedback 996-tone resource unit (RU),
  wherein relative indexed tones at +/−4, +/−8, and +/−256 for n=4, and feedback tones at +/−4 for n=16 in an 80 MHz bandwidth segment, are not sent for each of the one or more bandwidth segments if bandwidth segments of less than 80 MHz are requested in the feedback request, but are sent for each of the one or more bandwidth segments if entire bandwidth segments of 80 MHz are requested in the feedback request.

11. A wireless communication device, comprising:
  at least one processor; and
  at least one memory communicatively coupled with the at least one processor and storing processor-readable code that, when executed by the at least one processor, is configured to:
  receiving, from a first wireless device, a null data packet (NDP) over a wireless channel having a bandwidth that is an integer multiple of 80 MHz, the NDP including a long training field (LTF) that is modulated onto a plurality of tones of the wireless channel excluding tones within a punctured subchannel of a plurality of subchannels of an 80 MHz bandwidth segment of the wireless channel, the modulation being based on a size and a location of the punctured subchannel within the 80 MHz bandwidth segment, an 80 MHz orthogonal frequency division multiple access (OFDMA) tone plan, and a symbol duration associated with transmission of the LTF sequence;
  generating channel state information (CSI) for the wireless channel in response to receiving the NDP with a feedback request for at least a segment of the channel bandwidth, the feedback request covering at least part of an 80 MHz bandwidth channel or at least part of an 80 MHz bandwidth segment of a 160 MHz bandwidth channel or a 320 MHz bandwidth channel, the CSI includes one feedback tone for every n grouped tones of the plurality of tones of the channel, where n=4 or 16, and the CSI is modulated in an indexed range of feedback tones within a feedback 996-tone resource unit (RU), and for each feedback 996-tone RU further one of:
    (1) a feedback tone set for the 80 MHz bandwidth channel within a 996-tone RU for n=4 feedback tone spacing is defined as [−500:4:−4, 4:4:500], spanning a region of 1001 tones [−500 to +500], every 4 tones, and with a DC tone region between (−4, 4),
    (2) a feedback tone set for a 160 MHz bandwidth channel within a 996-tone RU for n=4 feedback tone spacing is indicated by feedback start and end tone indices for each 996-tone RU that include:
      (i) indexed tones [−1012:4:−516, −508:4:−12] that provide feedback for a first 80 MHz subchannel of the 160 MHz bandwidth channel, and
      (ii) indexed tones [12:4:508, 516:4:1012] that provide feedback for a second 80 MHz subchannel of the 160 MHz bandwidth channel,
    (3) a feedback tone set for a 320 MHz bandwidth channel within a 996-tone RU for n=4 feedback tone spacing is indicated by feedback start and end tone indices for each 996-tone RU that include:
      (i) indexed tones [−2036:4:−1540,−1532:4:−1036] that provide feedback for a first 80 MHz subchannel of the 320 MHz bandwidth channel, (ii) indexed tones [−1012:4:−516, −508:4:−12] that provide feedback for a second 80 MHz subchannel of the 320 MHz bandwidth channel, (iii) indexed tones [12:4:508, 516:4:1012] that provide feedback for a third 80 MHz subchannel of the 320 MHz bandwidth channel, and (iv) indexed tones[1036:4:1532, 1540:4:2036] that provide feedback for a fourth 80 MHz subchannel of the 320 MHz bandwidth channel, (4) a feedback tone set for the entire 80 MHz bandwidth channel within a 996-tone RU for n=16 feedback tone spacing is indicated by feedback start and end tone indices for each 996-tone RU that include indexed tones [−500:16:−260, −252:16:−12, −4, 4, 12:16:252, 260:16:500], spanning a region of 1001 tones [−500:500], every 16 tones, and with a DC tone region between (−4, 4), (5) a feedback tone set for 160 MHz bandwidth channel within a 996-tone RU for n=16 feedback tone spacing is indicated by feedback start and end tone indices for each 996-tone RU that include:

(i) indexed tones [−1012:16:−772, −764:16:−524, −516, −508, −500:16:−260, −252:16:−12] that provide feedback for a first 80 MHz subchannel of the 160 MHz bandwidth channel, and (ii) indexed tones [12:16:252, 260:16:500, 508, 516, 524:16:764, 772:16:1012] that provide feedback for a second 80 MHz subchannel of the 160 MHz bandwidth channel, (6) a feedback tone set for a 320 MHz bandwidth channel within a 996-tone RU for n=16 feedback tone spacing is indicated by feedback start and end tone indices for each 996-tone RU that include:

(i) indexed tones [−2036:16:−1796, −1788:16:−1548, −1540, −1532, −1524:16:−1284, −1276:16:−1036] that provide feedback for a first 80 MHz subchannel of the 320 MHz bandwidth channel, (ii) indexed tones [−1012:16:−772, −764:16:−524, −516, −508, −500:16:−260, −252:16:−12] that provide feedback for a second 80 MHz subchannel of the 320 MHz bandwidth channel, (iii) indexed tones [12:16:252, 260:16:500, 508, 516, 524:16:764, 772:16:1012] that provide feedback for a third 80 MHz subchannel of the 320 MHz bandwidth channel, and (iv) indexed tones [1036:16:1276, 1284:16:1524, 1532, 1540, 1548:16:1788, 1796:16:2036] that provide feedback for a fourth 80 MHz subchannel of the 320 MHz bandwidth channel.

* * * * *